United States Patent
Kim

(10) Patent No.: US 12,395,882 B2
(45) Date of Patent: Aug. 19, 2025

(54) METHOD AND APPARATUS FOR MEASURING FREQUENCY IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/514,754

(22) Filed: Nov. 20, 2023

(65) Prior Publication Data

US 2024/0098547 A1 Mar. 21, 2024

Related U.S. Application Data

(62) Division of application No. 16/856,777, filed on Apr. 23, 2020, now abandoned.

(30) Foreign Application Priority Data

Apr. 26, 2019 (KR) ......... 10-2019-0049302
May 21, 2019 (KR) ......... 10-2019-0059707

(51) Int. Cl.
*H04W 24/10* (2009.01)
*H04W 52/02* (2009.01)
*H04W 76/27* (2018.01)

(52) U.S. Cl.
CPC ....... *H04W 24/10* (2013.01); *H04W 52/0209* (2013.01); *H04W 76/27* (2018.02)

(58) Field of Classification Search
CPC ..... H04W 24/10; H04W 36/08; H04W 48/16; H04W 52/0209; H04W 76/27; H04W 76/15; H04W 76/16; H04W 88/06; H04W 36/083; H04W 36/085; H04W 36/087; H04W 36/13; Y02D 30/70
See application file for complete search history.

(56) References Cited

U.S. PATENT DOCUMENTS 10,531,326 B2   1/2020   Hong et al.
10,863,393 B2   12/2020  Jiang
(Continued)

FOREIGN PATENT DOCUMENTS

CN   106658758 A   5/2017
CN   108156638 A   6/2018
(Continued)

OTHER PUBLICATIONS

3GPP TS 38.331 ("3GPP; TSG-RAN; NR; RRC; Protocol specification (Release 15)", V15.5.1, Apr. 16, 2019) (Year: 2019).*
(Continued)

*Primary Examiner* — Ji-Hae Yea

(57) ABSTRACT

A method, performed by a user equipment (UE), of performing measurement includes receiving measurement configuration information for measurement in an idle mode or an inactive mode from a base station, starting a timer based on the measurement configuration information, and performing measurement in the idle mode or the inactive mode while the timer running, wherein, when the timer expires in the idle mode or the inactive mode, the measurement configuration information is deleted.

16 Claims, 25 Drawing Sheets

(56) References Cited

U.S. PATENT DOCUMENTS

| | | | |
|---|---|---|---|
| 10,869,209 B2 | 12/2020 | Hahn et al. | |
| 2015/0373573 A1 | 12/2015 | Lee et al. | |
| 2016/0135092 A1 | 5/2016 | Park et al. | |
| 2019/0037425 A1 | 1/2019 | Hong et al. | |
| 2021/0235300 A1 | 7/2021 | Teyeb et al. | |
| 2022/0061113 A1* | 2/2022 | Kim | H04W 24/08 |
| 2022/0150741 A1* | 5/2022 | Teyeb | H04L 5/001 |
| 2022/0182893 A1* | 6/2022 | da Silva | H04W 36/0058 |

FOREIGN PATENT DOCUMENTS

| | | | |
|---|---|---|---|
| CN | 108370593 A | | 8/2018 |
| CN | 109309969 A | | 2/2019 |
| KR | 20160055543 A | | 5/2016 |
| WO | WO-2020202101 A1 | * | 10/2020 |

OTHER PUBLICATIONS

62821184,Specification,Mar. 20, 2019 (Year: 2019).*

62821184, Drawings-only_black_and_white_line_drawings,Mar. 20, 2019 (Year: 2019).*

3GPP TS 36.331 ("3GPP; TSG-RAN; E-UTRA; RRC; Protocol specification (Release 15)", V15.5.1, Apr. 22, 2019) (Year: 2019).*

62825430,Specification,Mar. 28, 2019 (Year: 2019).*

62805914,Specification,Feb. 14, 2019 (Year: 2019).*

62830015,Specification,Apr. 5, 2019 (Year: 2019).*

Office Action issued Dec. 19, 2023, in connection with Chinese Patent Application No. 202080031414.4, 10 pages.

Oppo, "Delete the RRCReject for RRC resume procedure," 3GPP TSG-RAN WG2 NR AH1807, R2-1810696, Montreal, Canada, Jul. 2018, 11 pages.

International Search Report and Written Opinion of the International Searching Authority in connection with International Application No. PCT/KR2020/005307 dated Jul. 27, 2020, 10 pages.

"Connection control TP," Tdoc R2-1808961, 3GPP TSG-RAN WG2 #102, Busan, Korea, May 21-25, 2018, 311 pages.

CMCC, "Discussion on power saving in intra-band RRM measurements," R1-1902341, 3GPP TSG RAN WG1 #96, Athens, Greece, Feb. 25-Mar. 1, 2019, 3 pages.

LG Electronics, "Discussion on UE power consumption reduction in RRM measurements," R1-1902054, 3GPP TSG RAN WG1 #96, Athens, Greece, Feb. 25-Mar. 1, 2019, 3 pages.

Qualcomm Incorporated, "US behaviours in NR early measurements," R2-1905543, 3GPP TSG RAN WG2 Meeting #106, Reno, Nevada, US, May 13-17, 2019, 7 pages.

Qualcomm Incorporated, "Summary of email discussion [105#54] [NR/eCA-DC]: measurement configuration," R2-1903237, 3GPP TSG-RAN WG2 Meeting #105bis, Xian, China, Apr. 8-12, 2019, 38 pages.

Supplementary European Search Report dated Mar. 30, 2022, in connection with European Application No. 20794842.3, 14 pages.

U.S. Appl. No. 62/825,430, Specification ,Mar. 28, 2019 (Year: 2019).

U.S. Appl. No. 62/830,015, Specification ,Apr. 5, 2019 (Year: 2019).

Notice of Allowance issued Aug. 26, 2024, in connection with Chinese Patent Application No. 202080031414.4, 8 pages.

Communication pursuant to Article 94(3) EPC dated Jun. 25, 2024, in connection with European Patent Application No. 20794842.3, 7 pages.

Office Action issued Feb. 24, 2025, in connection with Korean Patent Application No. 10-2019-0059707, 11 pages.

Qualcomm Incorporated, "MR-DC in RRC_INACTIVE State," 3GPP TSG-RAN2#103bis, R2-1813600 (revision of R2-1811860), Chengdu, China, Oct. 2018, 7 pages.

* cited by examiner

METHOD AND APPARATUS FOR MEASURING FREQUENCY IN WIRELESS COMMUNICATION SYSTEM

CROSS-REFERENCE TO RELATED APPLICATIONS

This application is a divisional of application Ser. No. 16/856,777 filed on Apr. 23, 2020, which is based on and claims priority under 35 U.S.C. § 119 to Korean Patent Application No. 10-2019-0049302 filed on Apr. 26, 2019, and Korean Patent Application No. 10-2019-0059707 filed on May 21, 2019, in the Korean Intellectual Property Office, the disclosures of which are herein incorporated by reference in their entirety.

BACKGROUND

1. Field

The disclosure relates to a method and apparatus for measuring and reporting a frequency in a wireless communication system.

2. Description of Related Art

In order to meet the increasing demand for wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'. 5G communication systems defined in the $3^{rd}$ Generation Partnership Project (3GPP) are called new radio (NR) systems. In order to achieve a high data rate, consideration is given to implementing 5G communication systems in ultra-high frequency millimeter wave (mmW) bands (e.g., 60 GHz bands). In order to reduce propagation path loss and increase a propagation distance in ultra-high frequency millimeter wave bands, in 5G communication systems, technologies such as beamforming, massive multiple-input multiple-output (MIMO), full dimensional MIMO (FD-MIMO), array antenna, analog beamforming, and large scale antenna are being studied and applied to NR systems. Also, in order to improve networks of systems, in 5G communication systems, development of technologies such as evolved small cell, advanced small cell, cloud radio access network (cloud RAN), ultra-dense network, device-to-device communication (D2D), wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA) is underway.

The Internet is evolving from a human-centered connection network through which humans create and consume information to the Internet of Things (IoT) through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may be an example of convergence of 5G technology and IoT technology.

Because various services may be provided due to the development of wireless communication systems, there is a demand for methods of effectively providing these services.

SUMMARY

Provided are an apparatus and method which may effectively provide services in a mobile communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), of performing measurement includes: receiving measurement configuration information for measurement in an idle mode or an inactive mode from a base station; starting a timer based on the measurement configuration information; and performing measurement in the idle mode or the inactive mode while the timer runs, wherein, when the timer expires in the idle mode or the inactive mode, the measurement configuration information is deleted.

The method may further include: transmitting a radio resource control (RRC) resume request message to the base station; receiving a response message to the RRC resume request message; and determining whether to keep performing measurement based on the response message.

The determining whether to keep performing measurement in the idle mode based on the response message may include, when the response message is an RRC setup message or an RRC resume message, stopping the timer that is running and deleting the measurement configuration information.

The determining whether to keep performing measurement in the idle mode based on the response message may include, when the response message is an RRC reject message, keeping performing measurement in the idle mode or the inactive mode.

The method may further include: receiving a UE information request message for requesting a measurement result; transmitting a UE information response message including the measurement result; and discarding the measurement result.

The method may further include maintaining configuration information of master cell group (MCG) Scell or secondary cell group (SCG), wherein the response message includes information indicating whether to reconstruct the configuration information of Scell or SCG, wherein the configuration information of Scell or SCG is released or reconstructed based on the information indicating whether to reconstruct the configuration information of Scell or SCG.

The method may further include: performing a cell reselection procedure; and when a cell selected based on the cell reselection procedure is not a validity area, stopping the timer and discarding the measurement configuration information.

The method may further include: performing a cell reselection procedure; and when a cell selected based on the cell reselection procedure is a cell using another radio access technology (RAT), stopping the timer that is running and discarding the measurement configuration information.

The method may further include, when the UE transitions from the inactive mode to the idle mode, maintaining the timer that is running and maintaining the measurement configuration information.

The method may further include, when the UE fails to find a cell to be camped on or fails to select a cell, not stopping the timer that is running or not deleting the measurement configuration information.

According to another embodiment of the disclosure, a user equipment (UE) for performing measurement in an idle mode or an inactive mode includes: a transceiver; and a processor coupled with the transceiver and configured to receive measurement configuration information for measurement in the idle mode or the inactive mode from a base station, start a timer based on the measurement configuration information, perform measurement in the idle mode or the inactive mode while the timer runs, and remove the measurement configuration information when the timer expires in the idle mode or the inactive mode.

The processor may be further configured to transmit a radio resource control (RRC) resume request message to the base station, receive a response message to the RRC resume request message, and determine whether to keep performing measurement based on the response message.

The processor may be further configured to, when the response message is an RRC setup message or an RRC resume message, stop the timer that is running and discard the measurement configuration information.

The processor may be further configured to, when the response message is an RRC reject message, keep performing measurement in the idle mode or the inactive mode.

The processor may be further configured to receive a UE information request message for requesting a measurement result, transmit a UE information response message including the measurement result, and discard the measurement result.

The processor may be further configured to maintain master cell group (MCG) Scell or secondary cell group (SCG) configuration information, wherein the response message includes information indicating whether to reconstruct the Scell or SCG configuration information, wherein the Scell configuration information is released or reconstructed based on the information indicating whether to reconstruct the Scell or SCG configuration information.

The processor may be further configured to: perform a cell reselection procedure; and when a cell selected based on the cell reselection procedure is not a validity area, stop the timer and discard the measurement configuration information.

The processor may be further configured to: perform a cell reselection procedure; and when a cell selected based on the cell reselection procedure is a cell using another radio access technology (RAT), stop the timer that is running and discard the measurement configuration information.

The processor may be further configured to, when the UE transitions from the inactive mode to the idle mode, maintain the timer that is running and maintain the measurement configuration information.

The processor may be further configured to, when the UE fails to find a cell to be camped on or fails to select a cell, not stop the timer that is running or not remove the measurement configuration information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
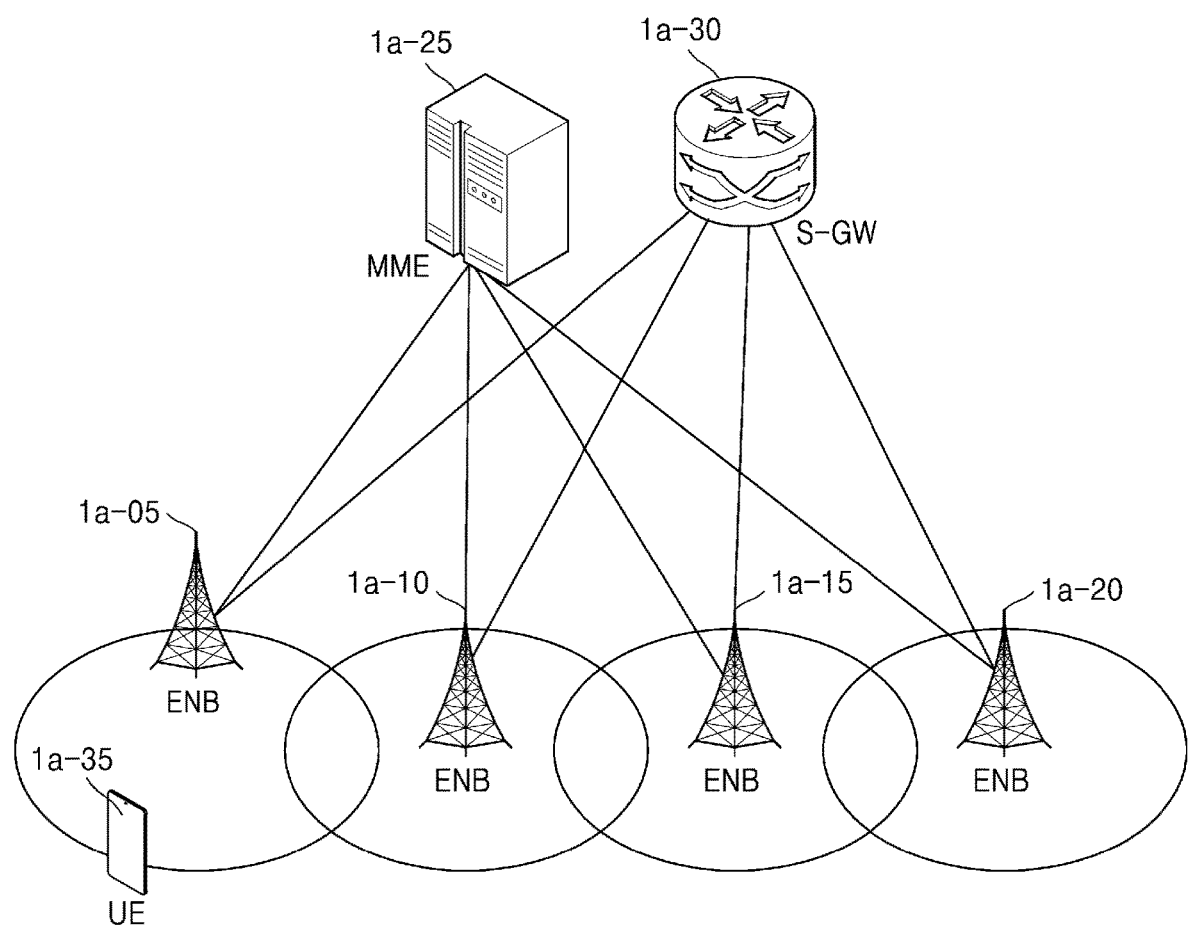
FIG. 1A is a diagram illustrating a structure of a long term evolution (LTE) system according to an embodiment of the disclosure.

FIGS. 1A through 2L, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, and a multimedia system capable of performing a communication function.

In the disclosure, a controller may also be referred to as a processor.

Throughout the specification, a layer may also be referred to as an entity.

The operation principle of the disclosure will be described in detail with reference to the attached drawings. While describing the disclosure, detailed descriptions about related well known functions or configurations that may blur the points of the disclosure are omitted. The terms used herein are those defined in consideration of functions in the disclosure, but the terms may vary according to the intention of users or operators, precedents, etc. Therefore, the terms used herein have to be defined based on the meaning of the terms together with the description throughout the specification.

Hereinafter, terms indicating a connection node, terms indicating network entities, terms indicating messages, terms indicating an interface between network entities, and terms indicating various pieces of identification information, as used in the following description, are exemplified for convenience of explanation. Accordingly, the disclosure is not limited to the terms to be described later, but other terms indicating objects having equal technical meanings may be used.

Hereinafter, for convenience of explanation, the disclosure uses terms and names defined in the 3rd generation partnership project long term evolution (3GPP LTE) standard. However, the disclosure is not limited to the above terms and names, and may also be applied to systems following other standards.

Hereinafter, embodiments of the disclosure will be described in detail with reference to the attached drawings. While describing the disclosure, detailed descriptions about related well known functions or configurations that may blur the points of the disclosure are omitted. The terms used herein are those defined in consideration of functions in the disclosure, but the terms may vary according to the intention of users or operators, precedents, etc. Therefore, the terms used herein have to be defined based on the meaning of the terms together with the description throughout the specification. Hereinafter, a base station that is an entity for allocating resources for a terminal may include at least one of an eNode B, a Node B, a base station (BS), a radio access unit, a base station controller, or a node on a network. In the disclosure, an eNB may be interchangeably used with a gNB for convenience of explanation. That is, a base station described as an eNB may refer to a gNB. A terminal may include a user equipment (UE), a mobile station (MS), a cellular phone, a smartphone, a computer, or a multimedia system capable of performing a communication function. In the disclosure, a downlink (DL) refers to a radio link for transmitting signals from a base station to a terminal, and an uplink (UL) refers to a radio link for transmitting signals from a terminal to a base station. In addition, although LTE/LTE-advanced (LTE-A) systems area described as examples below, embodiments of the disclosure may also be applied to other communication systems having similar technical backgrounds or channel types. For example, the embodiments of the disclosure may be applied to $5^{th}$ generation (5G) mobile communication technology (e.g., 5G new radio (NR)) developed after LTE-A. Further, the embodiments of the disclosure may also be applied to other communication systems by making some changes or modifications therein without departing from the spirit and scope of the disclosure.

In order to support service having a high data rate and a low latency in a next-generation mobile communication system, a base station needs to rapidly configure carrier aggregation (CA) or dual connectivity (DC) in a terminal. However, in order to configure such technology in a terminal, a frequency measurement result of the terminal may be required. Accordingly, a method of receiving a fast frequency measurement result report of the terminal may be required.

When a radio resource control (RRC) idle mode terminal in which fast frequency measurement is configured and performed in an RRC idle mode transitions to an RRC inactive mode for a certain reason, or when an RRC inactive mode terminal in which fast frequency measurement is configured and performed in an RRC inactive mode transitions to an RRC idle mode, an efficient method for determining whether to keep performing frequency measurement, stop the frequency measurement, or perform a different procedure according to a reason of state transition may be required.

An embodiment of the disclosure provides a method in which an RRC idle mode or RRC inactive mode terminal may rapidly report a frequency measurement result to a base station in a next-generation mobile communication system. The base station according to an embodiment of the disclosure may rapidly configure carrier aggregation or dual connectivity in the terminal. In detail, according to an embodiment of the disclosure, the terminal may perform frequency measurement based on frequency configuration information that is pre-configured before a connection to a network is configured. The terminal according to an embodiment of the disclosure may report a frequency measurement result as soon as the connection to the network is configured. Accordingly, the base station according to an embodiment of the disclosure may rapidly configure carrier aggregation (CA) or dual connectivity (DC) in the terminal. Also, an embodiment of the disclosure may provide a method of efficiently measuring a frequency or a method of processing frequency configuration information and a frequency measurement result, when an RRC idle mode terminal in which early frequency measurement is configured and performed in an RRC idle mode transitions to an RRC inactive mode for a certain reason, or when an RRC inactive mode terminal in which early frequency measurement is configured and performed in an RRC inactive mode transitions to an RRC idle mode.

The disclosure may provide a method in which an RRC inactive mode terminal may perform frequency measurement before an RRC connection to a network is configured and may make a fast frequency measurement result report when or right after the RRC connection is configured, so that a base station may rapidly configure carrier aggregation (CA) or dual connectivity (DC) in a terminal.

Specific methods provided by the disclosure may be summarized as follows.

In an embodiment of the disclosure, a terminal that is in an RRC connected mode may receive an RRCRelease message from a base station and may release an RRC connection. In this case, when the terminal receives frequency measurement configuration information along with an indication to transition to an RRC idle mode or an RRC inactive mode, the terminal may perform frequency measurement for a configured duration or time in the RRC idle mode or the RRC inactive mode. However, information about a list of frequencies to be measured may not be included in the frequency measurement configuration information. In this case, while a cell reselection procedure is performed, when frequency measurement configuration information for frequency measurement of an RRC idle mode or RRC inactive mode terminal is broadcast in a camped-on cell, the terminal may receive the information and may perform frequency measurement. A value of a first timer indicating a time for which the terminal is to perform frequency measurement may be configured based on the configured duration or time. When a duration or time for which frequency measurement is to be performed is configured in the RRCRelease message, the terminal may start the timer based on the value of the first timer. Because a time of the first timer for which the terminal may perform frequency measurement from a point of time when the RRCRelease message is received is limited, battery power of the terminal may be saved.

In another method, when the terminal receives a list of frequencies to be measured in frequency configuration information, the terminal may start the first timer. For example, when the terminal receives the RRCRelease message and the frequency configuration information includes a value of the first timer but does not include a frequency measurement list, the terminal may receive the frequency measurement list from system information. In this case, the terminal may start the first timer when the terminal receives the frequency measurement list from the system information. In this case, because the terminal has to restart the first timer whenever the terminal receives new system information, it may not be good in saving battery power of the terminal. However, even when the terminal moves and connects to another cell, the terminal may make a fast frequency measurement result report. When the first timer expires, the terminal may release or discard the frequency configuration information received from the RRCRelease message or the system information and may stop a frequency measurement result.

Also, the base station may define and configure a value of a second timer by using the RRCRelease message, to indicate how long a frequency measurement result value measured by the terminal is valid. For example, when the terminal receives the RRCRelease message, for the second timer running based on the value of the second timer, the terminal may store and use the timer value. The second timer may start when the terminal receives the RRCRelease message, and the terminal may determine that a frequency measurement result measured when the second timer expires is invalid and may discard the frequency measurement result. That is, the terminal may not report the frequency measurement result to the base station. In another method, the second timer may start when the first timer expires or stops. This is because, because a frequency measurement result may be continuously updated while frequency measurement is performed, the terminal may start the second timer from a point of time when the first timer expires or stops and frequency measurement stops, to indicate a validity duration of a latest frequency measurement result. The terminal may determine that a frequency measurement result measured when the second timer expires is invalid and may discard the frequency measurement result. That is, the terminal may not report the frequency measurement result to the base station. In another embodiment, the terminal may define and use a function of the second timer to be performed by the first timer.

A terminal that is in an RRC idle mode or an RRC inactive mode and receives an RRCRelease message may perform frequency measurement, based on frequency configuration information received from the RRCRelease message or frequency configuration information received from system information. When a connection to a network is necessary due to the generation of uplink data or the reception of a paging message, the terminal may determine whether a fast frequency measurement result may be reported in system information of a camped-on cell, and may complete a random access procedure. Also, the terminal may transmit a message 3 (RRCSetupRequest or RRCResumeRequest) to a base station, and may receive a message 4 (RRCSetup or RRCResume) from the base station in response to the message 3. When the terminal transmits a message 5 (RRCSetupComplete or RRCResumeComplete) to the base station, the terminal may notify, through an indicator, that there is a fast frequency measurement result in the message 5. In this case, the base station may transmit a separate message for requesting a frequency measurement result to the terminal, and the terminal may configure a separate message including a frequency measurement result in response to the message of the base station and may transmit the separate message to the base station, and may release and discard a stored frequency measurement result and frequency measurement configuration information.

The disclosure may also provide a method of more rapidly measuring and reporting a frequency for an RRC inactive mode. When the terminal performs frequency measurement in an RRC inactive mode and needs to connect to a network for a certain reason, the terminal may perform and complete a random access procedure, and then may transmit the message 3 (e.g., RRCResumeRequest) to the base station. When the base station transmits the message 4 (e.g., RRCResume) to the terminal, the base station may cause an indicator indicating that the terminal is to report a frequency measurement result to be included in the message 4 (e.g., RRCResume). In another method, because the message 4 itself may indicate that the terminal is to report a frequency measurement result, the indicator may be omitted. In this case, the terminal may identify an indicator of the message 4, may cause a frequency measurement result to be included in the message 5 (e.g., RRCResumeComplete), and may transmit the message 5. Because an RRC inactive mode terminal may resume or activate a security procedure (ciphering and deciphering or integrity protection and verification) for a signaling radio bearer SRB1 when transmitting the RRCResumeRequest message, the RRC inactive mode terminal may increase a security level and receive the message 4 when receiving the message 4, and may increase a security level and report a frequency measurement result of the message 5 when reporting the frequency measurement result of the message 5. Also, the base station may cause carrier aggregation configuration or dual connectivity configuration information to be included in the RRC message by using the above information and may transmit the RRC message, so that the terminal may rapidly restart, change, or newly configure carrier aggregation or dual connectivity.

Also, the disclosure may provide an efficient signaling method in which a network or a base station may more efficiently configure or update frequency measurement configuration information in a terminal having mobility in an RRC inactive mode.

A most significant difference between an RRC idle mode terminal and an RRC inactive mode terminal is that the RRC inactive mode terminal may store terminal context in a base station and a terminal and may rapidly configure a connection by reusing the terminal context, and that the RRC inactive mode terminal may update an area where an RRC inactive mode has to be maintained from a network by periodically updating a RAN notification area.

In an embodiment of the disclosure, when an RRC connected mode terminal receives frequency measurement configuration information along with an indication to release an RRC connection and transition to an RRC inactive mode from a base station, the terminal may perform frequency measurement for a configured duration or time in the RRC inactive mode. When the RRC inactive mode terminal moves out of a configured RAN notification area, the RRC inactive mode terminal may configure a connection to a network, to perform a RAN notification area update (RNAU) procedure.

In such a case, according to an embodiment of the disclosure, for a terminal performing a connection to a network to update a RAN notification area, a base station may configure or update new frequency measurement configuration or may indicate the terminal to maintain frequency measurement. The base station may retrieve terminal context from a source base station through a connection resume identifier indicated by the terminal in the message 3 (RRC Resume Request), and may determine whether the terminal is to perform a frequency measurement configuration in an RRC inactive mode. In another method, when the terminal transmits the message 3 to update a RAN notification area, the terminal may cause an indicator indicating that frequency measurement is to be performed in an RRC inactive mode, a timer T331 expires or is running, or new frequency configuration information is required to be included in the message 3 and may transmit the message 3 to the base station to indicate the information to the base station. When the base station determines whether the terminal may perform frequency measurement in an RRC inactive mode and then transmits an RRC message (e.g., an RRCRelease message) including information for updating the RAN notification area to the terminal, the base station may cause new frequency measurement configuration information to be included in the RRC message and may transmit and configure the RRC message. The new frequency measurement configuration information may include configuration information such as a list of frequencies to be measured, a list of physical cell identifiers, a measurement duration, or a validity area for measurement (e.g., a cell identifier list).

When the terminal receives the RRCRelease message in the RAN notification area update procedure, when fast frequency measurement configuration information is included in the message, the terminal may release or discard (remove or delete) a stored frequency measurement configuration information or a frequency measurement result, and may perform frequency measurement by storing, updating, and applying new fast frequency measurement configuration information. In another method, when only a frequency measurement duration or a value of a timer is configured in the fast frequency measurement configuration information, the terminal may restart (or start) the timer based on the value, and may keep perform a frequency measurement configuration while maintaining existing frequency configuration information. Alternatively, the terminal may start the timer based on the value, may release or delete the existing frequency configuration information, may receive system information from a camped-on cell through a cell reselection procedure, and when frequency configuration information is included in the received information, may perform frequency measurement by applying the frequency configuration information. In another method, the base station may define a new indicator in the RRCRelease message and may indicate whether to keep performing frequency measurement by using the existing frequency measurement configuration information, to stop the frequency measurement, or to release the frequency measurement configuration information. In another method, only when frequency measurement configuration information is included in the RRCRelease message, the terminal may release the existing frequency configuration information, and when the frequency configuration information is not included in the RRCRelease message, the terminal may maintain and apply the existing frequency configuration information.

Also, according to embodiments of the disclosure, when a base station or a cell to which a terminal connects may support RRC idle mode or inactive mode frequency measurement, or when system information may indicate that RRC idle mode or inactive mode frequency measurement is supported, and when a frequency measurement result may be reported to the base station, the terminal may stop the timer (i.e., T331) for RRC idle mode or inactive mode frequency measurement and may discard or release frequency measurement configuration information or discard a frequency measurement result.

Also, according to an embodiment of the disclosure, an RRC inactive mode or RRC idle mode terminal may configure a separate area (e.g., a validity area) for performing frequency measurement. That is, according to an embodiment of the disclosure, the terminal may perform frequency measurement in an RRC inactive mode or an RRC idle mode only within the validity area, and when being out of the validity area, the terminal may stop a timer, may release frequency measurement configuration information, may discard a frequency measurement result, or may stop frequency measurement. The validity area may be indicated by a list of physical cell identifiers or a list of RAN notification area indicators. An embodiment of the disclosure may provide a method of separately configuring a validity area and a RAN notification area in an RRC inactive mode terminal, and a method of allowing an RRC inactive mode terminal to use a RAN notification area instead of a validity area (or use a validity area instead of a RAN notification area) by using an indicator in order to reduce the burden on the terminal and reduce signaling overhead. This is because, when a separate validity area is indicated to the terminal, the terminal may have a burden of maintaining and updating a tracking area, maintaining and updating a RAN notification area, and also maintaining and managing the validity area.

Also, according to an embodiment of the disclosure, when frequency measurement configuration information is indicated to an RRC inactive mode or RRC idle mode terminal, a base station may configure a separate timer, according to frequency configuration group or radio access technology, or for each frequency, cell, or beam. That is, according to an embodiment of the disclosure, a duration or a timer value indicating how long frequency measurement is to be performed for an LTE frequency (per frequency or cell) may be configured, a duration or a timer value indicating how long frequency measurement is to be performed for an NR frequency (per frequency, cell, or beam) may be separately configured, and a separate timer may be configured and a separate duration may be configured for each frequency configuration group.

Also, an embodiment of the disclosure may provide a method of processing frequency measurement configuration information or a frequency measurement result according to a state change of an RRC inactive mode and determining whether to keep performing a frequency measurement operation. That is, also, an embodiment of the disclosure may specifically provide a terminal operation when a terminal transitions from an RRC inactive mode to an RRC idle mode.

FIG. 1A is a diagram illustrating a structure of an LTE system according to an embodiment of the disclosure.

Referring to FIG. 1A, a radio access network of an LTE system may include evolved nodes B (ENBs) (nodes B or base stations) 1a-05, 1a-10, 1a-15, and 1a-20, a mobility management entity (MME) 1a-25, and a serving-gateway (S-GW) 1a-30. A user equipment (UE) 1a-35 may connect to an external network through the ENBs 1a-05, 1a-10, 1a-15, and 1a-20 and the S-GW 1a-30.

In FIG. 1A, each of the ENBs 1a-05, 1a-10, 1a-15, and 1a-20 may correspond to an existing node B of a universal mobile telecommunication system (UMTS). Each ENB may be connected through a radio channel to the UE 1a-35 and may perform a more complex function than the existing node B. Because all user traffic data including real-time services such as voice over Internet protocol (VoIP) are serviced through a shared channel in the LTE system, an entity for collecting and scheduling buffer state information of UEs, available transmission power state information, and channel state information may be required, and each of the ENBs 1a-05 through 1a-20 may serve as such an entity. One ENB may generally control a plurality of cells. For example, in order to achieve a data rate of 100 Mbps, the LTE system may use orthogonal frequency division multiplexing (OFDM) at a bandwidth of 20 MHz as radio access technology. Also, adaptive modulation and coding (AMC) for determining a modulation scheme and a channel coding rate in accordance with a channel state of the UE 1A-35 may be applied. The S-GW 1a-30 is an entity for providing a data bearer, and may generate or remove the data bearer under the control of the MME 1a-25. The MME 1a-25 that is an entity for performing various control functions as well as a mobility management function on the UE 1a-35 may be connected to a plurality of ENBs.

Figure 1B:
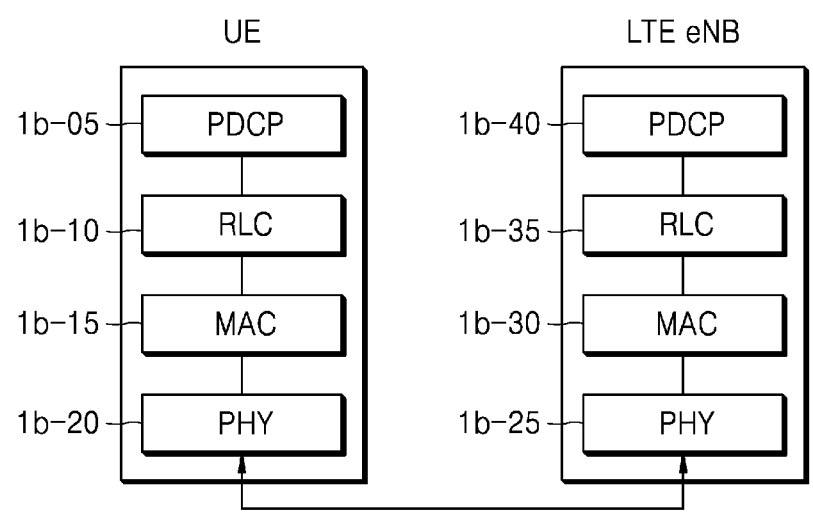
FIG. 1B is a diagram illustrating a radio protocol architecture in an LTE system according to an embodiment of the disclosure.

FIG. 1B is a diagram illustrating a radio protocol architecture in an LTE system according to an embodiment of the disclosure.

Referring to FIG. 1B, a radio protocol architecture of an LTE system includes packet data convergence protocol (PDCP) layers 1b-05 and 1b-40, radio link control (RLC) layers 1b-10 and 1b-35, and medium access control (MAC) layers 1b-15 and 1b-30 respectively for a UE and an ENB. The PDCP layers 1b-05 and 1b-40 may be in charge of, for example, IP header compression/decompression. Main functions of each PDCP layer may be summarized as follows.

Header compression and decompression: robust header compression (ROHC) only
    Transfer of user data
    In-sequence delivery of upper layer packet data units (PDUs) at PDCP re-establishment procedure for RLC acknowledged mode (AM)
    For split bearers in DC (only support for RLC AM): PDCP PDU routing for transmission and PDCP PDU reordering for reception
    Duplicate detection of lower layer service data units (SDUs) at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink Each of the RLC layers 1b-10 and 1b-35 may perform an automatic repeat request (ARQ) operation by reconfiguring a PDCP packet data unit (PDU) to an appropriate size. Main functions of each RLC layer may be summarized as follows.

Transfer of upper layer PDUs
    Error correction through ARQ (only for AM data transfer)
    Concatenation, segmentation and reassembly of RLC SDUs (only for unacknowledged mode (UM) and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC layers 1b-15 and 1b-30 are connected to various RLC layers configured in one UE, and may multiplex RLC PDUs into a MAC PDU and demultiplex the RLC PDUs from the MAC PDU. Main functions of each MAC layer may be summarized as follows.

Mapping between logical channels and transport channels
    Multiplexing/demultiplexing of MAC SDUs belonging to one or different logical channels into/from transport blocks (TBs) delivered to/from the physical layer on transport channels
    Scheduling information reporting
    Error correction through hybrid ARQ (HARQ)
    Priority handling between logical channels of one UE
    Priority handling between UEs by means of dynamic scheduling
    Multimedia broadcast/multicast service (MBMS) identification
    Transport format selection
    Padding Each of physical (PHY) layers 1b-20 and 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1C:
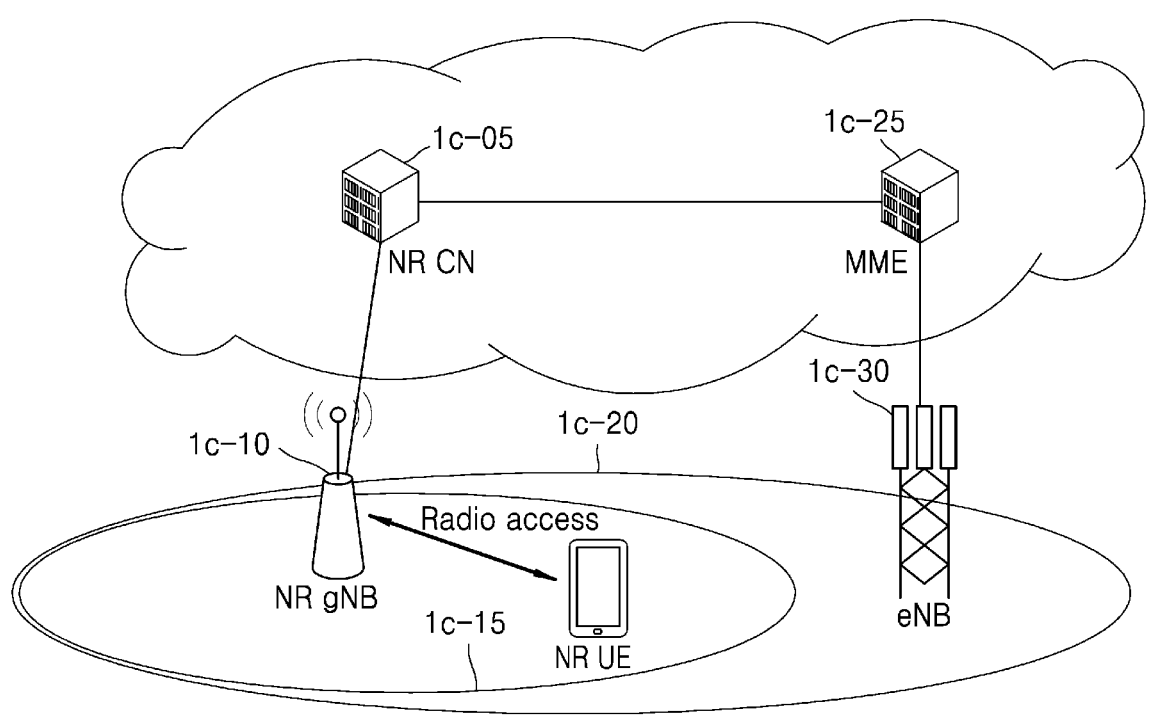
FIG. 1C is a diagram illustrating a structure of a next-generation mobile communication system according to an embodiment of the disclosure.

FIG. 1C is a diagram illustrating a structure of a next-generation mobile communication system, e.g., an NR system or a 5G communication system, according to an embodiment of the disclosure.

Referring to FIG. 1C, a radio access network of a next-generation mobile communication system (e.g., an NR or 5G system) may include a new radio node B (NR gNB or an NR base station) 1c-10 and a new radio core network (NR CN) 1c-05. A new radio user equipment (NR UE) 1c-15 may connect to an external network through the NR gNB 1c-10 and the NR CN 1c-05.

In FIG. 1C, the NR gNB 1c-10 corresponds to an evolved node B (eNB) of an existing LTE system. The NR gNB 1c-10 may be connected to the NR UE 1c-15 through a radio channel and may provide a better service than an existing node B. Because all user traffic data are serviced through a shared channel in a next-generation mobile communication system, an entity for collecting and scheduling buffer state information of UEs, available transmission power state information, and channel state information may be required, and the NR gNB 1c-10 may serve as such an entity. One NR gNB may generally control a plurality of cells. The next-generation mobile communication system may currently have a bandwidth greater than a maximum bandwidth of existing LTE to achieve an ultrahigh data rate, may use orthogonal frequency division multiplexing (OFDM) as radio access technology, and may additionally use beamforming technology. Also, adaptive modulation and coding (AMC) for determining a modulation scheme and a channel coding rate in accordance with a channel state of the NR UE 1c-15 may be applied. The NR CN 1c-05 may perform functions such as mobility support, bearer configuration, and quality of service (QoS) configuration. The NR CN 1c-05 that is an entity for performing various control functions as well as a mobility management function on the NR UE 1c-15 may be connected to a plurality of base stations. Also, the next-generation mobile communication system may cooperate with the existing LTE system, and the NR CN 1c-05 may be connected through a network interface to an MME 1c-25. The MME 1c-25 may be connected to an eNB 1c-30 that is an existing base station.

Figure 1D:
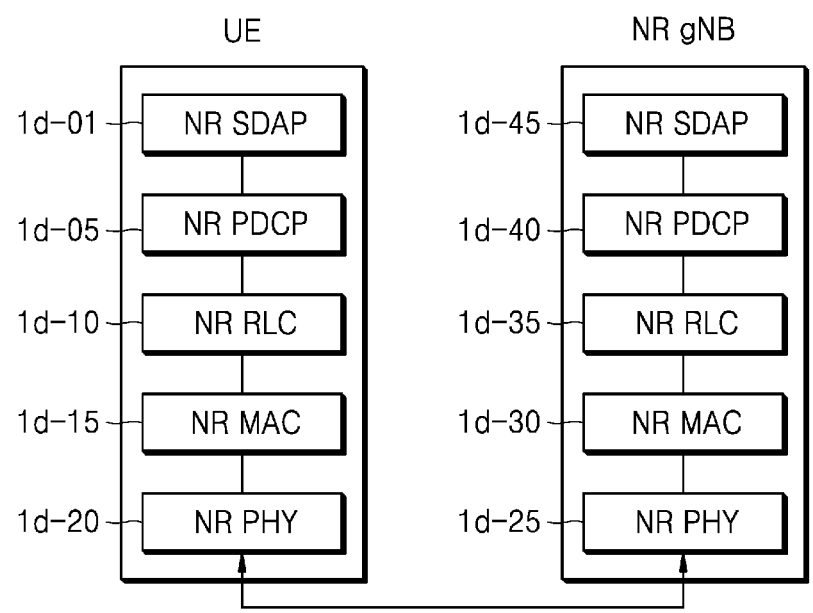
FIG. 1D is a diagram illustrating a radio protocol architecture of a next-generation mobile communication system according to an embodiment of the disclosure.

FIG. 1D is a diagram illustrating a radio protocol architecture of a next-generation mobile communication system according to an embodiment of the disclosure.

Referring to FIG. 1D, a radio protocol architecture of a next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 for a UE and an NR gNB.

Main functions of each of the NR SDAP layers 1d-01 and 1d-45 may include some of the following functions.

Transfer of user plane data
    Mapping between a QoS flow and a data radio bearer (DRB) for both DL and UL
    Marking QoS flow identifier (ID) in both DL and UL packets
    Reflective QoS flow to DRB mapping for the UL SDAP PDUs For an SDAP layer, information indicating whether to use a header of the SDAP layer or to use functions of the SDAP layer may be configured for the UE by using a radio resource control (RRC) message per PDCP layer, per bearer, or per logical channel. When the SDAP header is configured, the SDAP layer may indicate the UE to update or reconfigure uplink and downlink QoS flow and data bearer mapping information by using a 1-bit non access stratum (NAS)

reflective QoS indicator and a 1-bit access stratum (AS) reflective QoS indicator of the SDAP header. The SDAP header may include QoS flow ID information indicating QoS. QoS information may be used as data processing priority information or scheduling information for smoothly supporting a service.

Main functions of each of the NR PDCP layers 1*d*-05 and 1*d*-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink In the above description, a reordering function of the NR PDCP layer may refer to a function of reordering PDCP PDUs received from a lower layer based on PDCP sequence numbers (SNs), and may include a function of delivering the reordered data to an upper layer in order or out of order, a function of recording missing PDCP PDUs by reordering the received PDCP PDUs, a function of reporting state information of the missing PDCP PDUs to a transmitter, and a function of requesting to retransmit the missing PDCP PDUs.

Main functions of each of the NR RLC layers 1*d*-10 and 1*d*-35 may include some of the following functions.

Transfer of upper layer PDUs
    In-sequence delivery of upper layer PDUs
    Out-of-sequence delivery of upper layer PDUs
    Error correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment In the above description, an in-sequence delivery function of the NR RLC layer may refer to a function of sequentially delivering RLC SDUs received from a lower layer to an upper layer in order, and may include at least one of a function of reassembling a plurality of RLC SDUs segmented from one RLC SDU and delivering the reassembled RLC SDU when the segmented RLC SDUs are received, a function of reordering received RLC PDUs on a RLC SN or PDCP SN basis, a function of recording missing RLC PDUs by reordering the received RLC PDUs, a function of reporting state information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order although a missing RLC SDU exists when a certain timer expires. Also, the NR RLC layer may process RLC PDUs in order of reception (in order of arrival regardless of SNs) and deliver the RLC PDUs to a PDCP layer out of order (out of sequence delivery), or reassemble segmented RLC PDUs received or stored in a buffer into a whole RLC PDU and process and deliver the RLC PDU to the PDCP layer. The NR RLC layer may not have a concatenation function, and the concatenation function may be performed by an NR MAC layer or may be replaced with a multiplexing function of the NR MAC layer.

In the above description, an out-of-sequence delivery function of the NR RLC layer refers to a function of directly delivering RLC SDUs received from a lower layer to an upper layer out of order, and may include a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

Each of the NR MAC layers 1*d*-15 and 1*d*-30 may be connected to a plurality of NR RLC layers configured for one UE, and main functions of each NR MAC layer may include some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding Each of NR PHY layers 1*d*-20 and 1*d*-25 may channel-code and modulate upper layer data into OFDM symbols and transmit the OFDM symbols through a radio channel, or may demodulate OFDM symbols received through a radio channel and channel-decode and deliver the OFDM symbols to an upper layer.

In a next-generation mobile communication system, a UE may perform frequency measurement while performing a cell reselection procedure in an RRC idle mode. The frequency measurement performed by the UE while performing the cell reselection procedure may refer to intra-frequency measurement or serving cell or primary cell (Pcell) measurement of frequencies that are broadcast in a camped-on cell or configured by a gNB. However, the UE may not perform inter-frequency measurement except for the intra-frequency measurement or the serving cell measurement, and may not separately report a frequency measurement result to a network.

That is, when the UE finds a suitable cell by performing the cell reselection procedure, camps on the suitable cell, and then transitions to an RRC connected mode by performing an RRC connection configuration procedure, the gNB may perform a configuration regarding measurement of an RRC connected mode UE. In this case, the gNB may configure, for the UE, at least one of which frequencies (e.g., a frequency list) or which frequency bands are to be measured, which order is to be used to perform measurement by configuring a priority of each frequency, which beam is to be measured, which filtering method is to be used to measure an intensity of a frequency (e.g., L1 filtering, L2 filtering, L3 filtering, or a calculation method using a coefficient) when a frequency is measured, which event or condition is to be used to start measurement when a frequency is measured, which criterion is to be used to perform measurement when compared to a current serving cell (or currently camped on frequency), which event or condition is to be used to report a measured frequency result, which criterion or condition is be satisfied to report a frequency when compared to a current serving cell (or currently camped on frequency), or which period is to be used to report a frequency measurement result. The UE may measure corresponding frequencies according to a frequency configuration configured by the gNB, and may report frequency measurement results to the gNB according to a corresponding event or condition. The gNB may determine whether to apply frequency carrier aggregation or dual connectivity to the UE by using the frequency measurement results received from the UE.

An embodiment of the disclosure may provide a method in which a UE may perform frequency measurement in an RRC idle mode or an RRC inactive mode before transitioning to an RRC connected mode, indicates a measurement result to a gNB when the UE may configure a connection to a network, and may rapidly report a frequency measurement result by entering the RRC connected mode in a next-generation mobile communication system. Based on the method, the gNB may rapidly configure frequency carrier aggregation or dual connectivity in the UE based on a result measured by the UE in an RRC idle mode or an RRC inactive mode.

In detail, when the gNB transition an RRC connected mode UE in which a connection to a network is configured to an RRC idle mode or an RRC inactive mode, the gNB may configure, in an RRC message, frequency information of frequencies to be measured in the RRC idle mode or the RRC inactive mode, time (or duration) information for which the UE is to measure the frequencies in the RRC idle mode or the RRC inactive mode, or area information (or a cell list) of an area where the UE is to measure the frequencies in the RRC idle mode or the RRC inactive mode, and may indicate the UE to perform frequency measurement in the RRC idle mode or the RRC inactive mode. Also, the UE may read system information of a newly camped-on cell by performing a cell reselection operation whenever the UE moves. The UE may perform a procedure of determining whether to continue or end frequency measurement in the RRC idle mode or the RRC inactive mode, to extend a measurement duration (e.g., restart a timer), to report a frequency measurement result, or to discard a frequency measurement result according to the system information. The next-generation mobile communication system according to an embodiment of the disclosure may provide an efficient UE operation through the above operation.

Examples of a bearer of the disclosure may include a signaling radio bearer (SRB) and a data radio bearer (DRB). A UM DRB may refer to a DRB using an RLC layer that operates in an unacknowledged mode (UM), and an AM DRB may refer to a DRB using an RLC layer that operates in an acknowledged mode (AM).

Figure 1E:
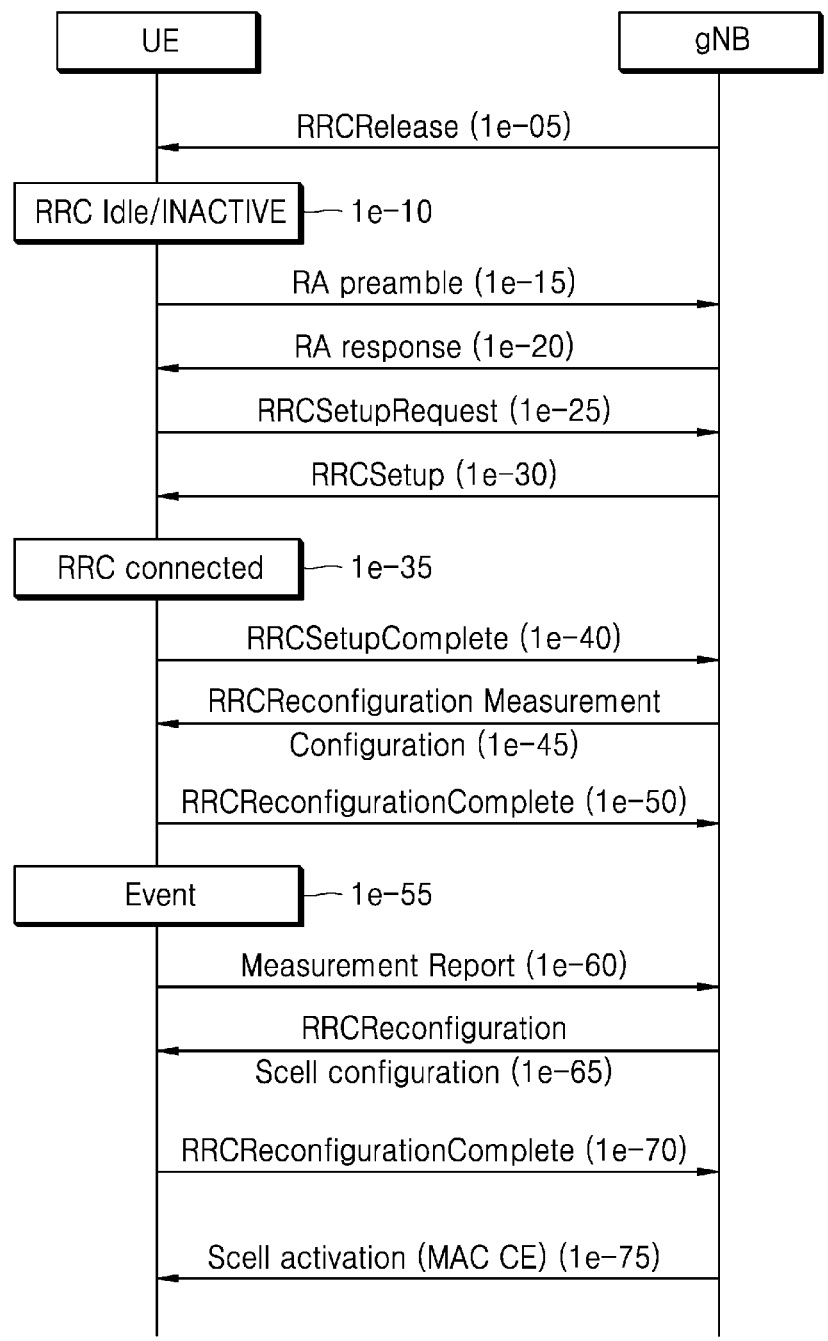
FIG. 1E is a diagram for describing a procedure in which a user equipment (UE) configures carrier integration in a next-generation mobile communication system according to an embodiment of the disclosure.

FIG. 1E is a diagram for describing a procedure in which a UE configures carrier aggregation in a next-generation mobile communication system according to an embodiment of the disclosure.

Referring to FIG. 1E, in a next-generation mobile communication system, a procedure in which a UE switches from an RRC idle model or an RRC inactive mode to an RRC connected mode and carrier aggregation is configured will be described.

A gNB may transition an RRC connected mode UE in which a connection to a network is configured to an RRC idle mode or an RRC inactive mode for a certain reason. In an embodiment of the disclosure, the certain reason may include a lack of scheduling resources of the gNB, or a suspension of data transmission/reception to/from the UE for a certain period of time.

In operation 1e-05, a gNB may transmit an RRCRelease message to a UE and may indicate the UE to an RRC idle mode or an RRC inactive mode. The gNB may indicate, in the RRCRelease message, the UE to transition to the RRC inactive mode by using an indicator (suspend-config), and when the indicator (suspend-config) is not included in the RRCRelease message, the UE may be transitioned to the RRC idle mode. Accordingly, the UE may transition to the RRC idle mode or the RRC inactive mode in operation 1e-10.

When a connection to a network is required for a certain reason, the UE transitioning to the RRC idle mode or the RRC inactive mode may perform a random access procedure and may receive a random access response, in operations 1e-15 and 1e-20. Also, in operations 1e-25 through 1e-40, the UE may request an RRC connection configuration, and may perform the RRC connection configuration by receiving an RRC message.

In more detail, in operation 1e-25, the UE may establish backward transmission synchronization with the gNB through a random access process and may transmit an RRCSetupRequest message to the gNB. The RRCSetupRequest message may include a cause (establishmentCause) for configuring a connection to an identifier of the UE.

In operation 1e-30, the gNB may transmit an RCSetup message so that the UE configures an RRC connection. The RRCSetup message may include at least one of configuration information for each logical channel, configuration information for each bearer, configuration information of a PDCP layer, configuration information of an RLC layer, or configuration information of a MAC layer.

The gNB may allocate a bearer identifier (e.g., an SRB identifier or a DRB identifier) to each bearer by using the RRCSetup message, and may indicate a PDCP layer configuration, an RLC layer configuration, a MAC layer configuration, and a PHY layer configuration for each bearer. Also, the gNB may configure a length (e.g., 12 bits or 18 bits) of a PDCP sequence number used in the PDCP layer for each bearer and may configure a length (e.g., 16 bits, 12 bits, or 18 bits) of an RLC sequence number used in the RLC layer in an RRCConnectionSetup message. Also, the gNB may indicate whether to use a header compression and decompression protocol in an uplink or a downlink to the PDCP layer for each bearer and may indicate whether to perform an integrity protection or verification procedure in the RRCConnectionSetup message. Also, the gNB may indicate whether to perform an out-of-order delivery function in the PDCP layer.

In operation 1e-40, the UE configuring the RRC connection may transmit an RRCSetupComplete message to the gNB. The RRCSetupComplete message may include a SERVICE REQUEST message that is a control message through which the UE requests an access and mobility management function (AMF) or mobility management entity (MME) for a bearer configuration for a service. The gNB may transmit the SERVICE REQUEST message included in the RRCConnetionSetupComplete message to the AMF or the MME, and the AMF or the MME may determine whether to provide the service requested by the UE.

When the AMF or the MME determines to provide the service requested by the UE, the AMF or the MME may transmit an INITIAL CONTEXT SETUP REQUEST message to the gNB. The INITIAL CONTEXT SETUP REQUEST message may include information such as quality of service (QoS) information to be applied when a data radio bearer (DRB) is configured and security-related information (e.g., a security key or a security algorithm) to be applied to a DRB.

In operation 1e-45, the gNB may transmit/receive a SecurityModeCommand message and a SecurityModeComplete message to configure security with the UE, and when a security configuration is completed, the gNB may transmit an RRCConnectionReconfiguration message to the UE.

The gNB may allocate a bearer identifier (e.g., an SRB identifier or a DRB identifier) to each bearer by using the RRCConnectionReconfiguration message, and may indicate a PDCP layer configuration, an RLC layer configuration, a MAC layer configuration, and a PHY layer configuration for each bearer. Also, the gNB may configure a length (e.g., 12 bits or 18 bits) of a PDCP sequence number used in the PDCP layer for each bearer and may configure a length (e.g., 6 bits, 12 bits, or 18 bits) of an RLC sequence number used in the RLC layer in the RRCConnectionReconfiguration message. Also, the gNB may indicate whether to use a header compression and decompression protocol in an uplink or a downlink to the PDCP layer for each bearer and may indicate whether to perform an integrity protection or verification procedure in the RRCConnectionSetup message. Also, the gNB may indicate whether to perform an out-of-order delivery function in the PDCP layer.

Also, the RRCConnectionReconfiguration message may include configuration information of a DRB in which user data is to be processed. In operation 1e-45, the UE may configure a DRB by applying the information and may transmit an RRCConnectionReconfigurationComplete message to the gNB.

In operation 1e-50, the gNB completing a DRB configuration with the UE may transmit an INITIAL CONTEXT SETUP COMPLETE message to the AMF or the MME and may complete a connection.

When the above process is completed, the UE may transmit/receive data through a core network to/from the gNB. According to some embodiments of the disclosure, a data transmission process roughly includes three steps of the RRC connection configuration, the security configuration, and the DRB configuration.

Also, in operation 1e-65, the gNB may transmit an RRCConnectionReconfiguration message to newly add or change a configuration to the UE for a certain reason. The gNB may configure frequency configuration information (e.g., a list of frequencies to be measured, a duration for measuring frequencies, a condition for measuring frequencies, a condition for measuring and reporting frequencies, and a cell identifier for reporting frequencies) of frequencies to be measured by the UE by using the RRCConnectionReconfiguration message.

The UE may perform frequency measurement according to the frequency measurement configuration information. In operation 1e-60, when a certain condition is satisfied (e.g., when a strength of a signal of a specific frequency is greater than a given value (e.g., a threshold value) or when a strength of a signal of a current serving cell (frequency) is less than a given value (e.g., a threshold value), the UE may report a frequency measurement result to the gNB.

In operation 1e-65, when the gNB receives the frequency measurement result, the gNB may cause Scell configuration information to be included in an RRCReconfiguration message based on the frequency measurement result, may transmit the RRCReconfiguration message to the UE, may configure additional Scells, and may configure carrier aggregation in the UE. Also, the gNB may cause secondary cell group configuration information to be included in the RRCReconfiguration message, may transmit the RRCReconfiguration message to the UE, and may configure dual connectivity in the UE. When the gNB configures carrier aggregation in the UE, in operations 1e-70 through 1e-75, the gNB may transition the configured Scells by using a MAC control element (CE) to an active or inactive or idle state.

A procedure in which a gNB configures carrier aggregation or dual connectivity in a UE according to an embodiment of the disclosure may be summarized as follows. First, when the UE configures a connection to the gNB and the gNB configures frequency measurement configuration information in an RRC connected mode UE, the UE may perform frequency measurement based on the frequency measurement configuration information and may report a measurement result to the gNB. The gNB may configure, in an RRC message, configuration information for additional Scells to configure carrier aggregation in the UE based on the frequency measurement result of the UE, and may activate, make idle, or inactivate the Scells by sending a MAC CE. Also, the gNB may configure additional cell group configuration information to configure dual connectivity in the UE based on the frequency measurement result of the UE.

When the gNB configures carrier aggregation or dual connectivity in the UE as described above, when the UE first enters an RRC connected mode, receives frequency configuration information, performs frequency measurement, and needs to report a frequency measurement, measurement reporting may be performed very late and carrier aggregation or dual connectivity may be configured late. Accordingly, in order to solve the problem, an embodiment of the disclosure may enable the UE to effectively perform frequency measurement in an RRC idle mode or an RRC inactive mode and report a frequency measurement result as soon as a connection to a network is configured.

Figure 1F:
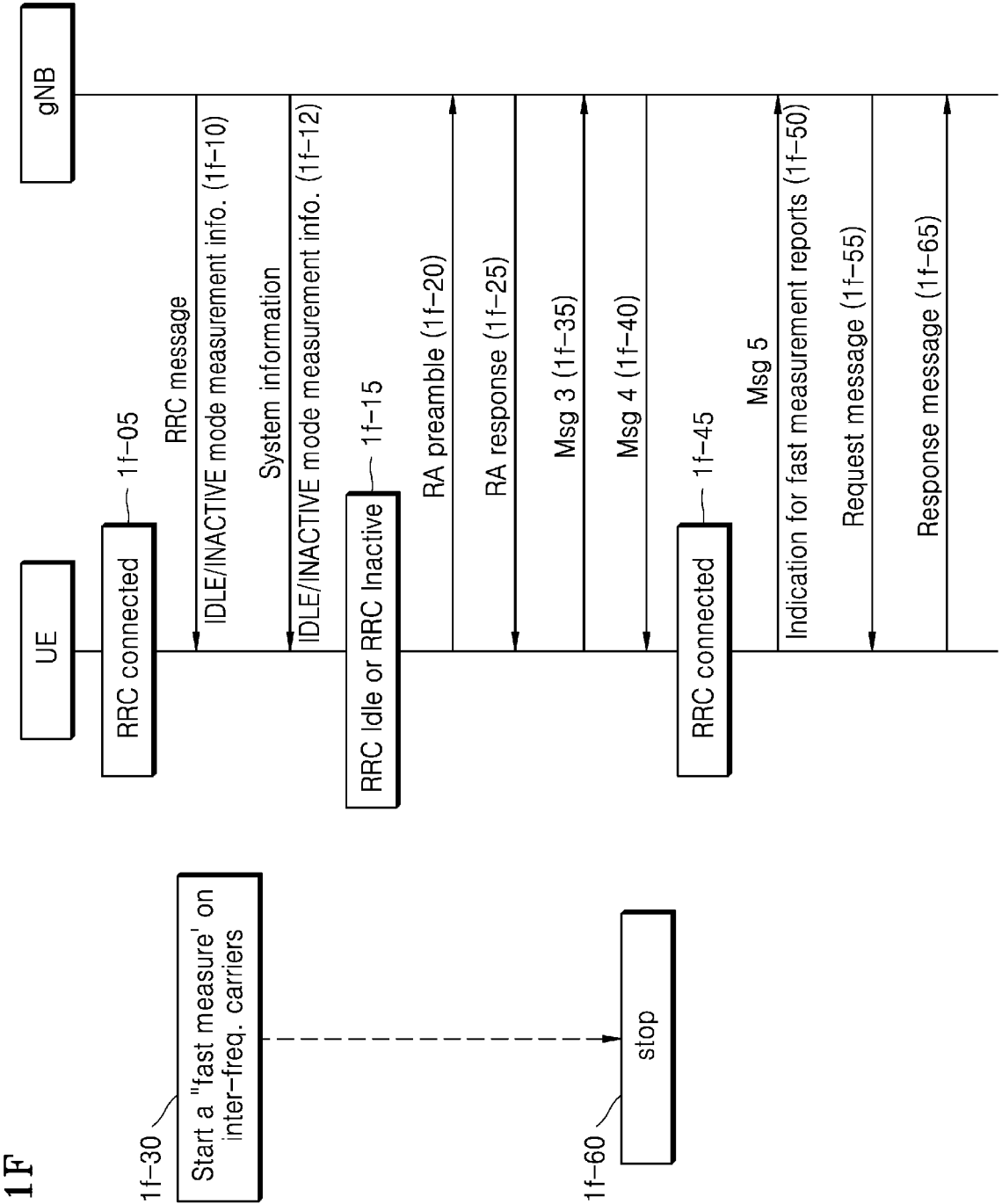
FIG. 1F is a diagram for describing a method in which a UE performs early frequency measurement and makes a fast frequency measurement result report in a next-generation mobile communication system according to an embodiment of the disclosure.

FIG. 1F is a diagram for describing a method in which a UE performs early frequency measurement and makes a fast frequency measurement result report in a next-generation mobile communication system according to an embodiment of the disclosure.

In more detail, referring to FIG. 1F, a UE according to an embodiment of the disclosure may perform early frequency measurement in an RRC idle mode or an RRC inactive mode, and may make a fast frequency measurement result report.

In a first embodiment of the disclosure, when a gNB configures frequency measurement configuration information for enabling a UE to perform frequency measurement in an RRC idle mode or an RRC inactive mode through an RRCRelease message in the UE, the gNB may configure a plurality of frequency measurement groups and the UE may perform frequency measurement in the RRC idle mode or the RRC inactive mode.

Also, an embodiment of the disclosure may provide a method in which when a gNB indicates frequency measurement configuration information to an RRC inactive mode or RRC idle mode UE, the gNB may configure a separate frequency measurement list or a separate timer according to a frequency configuration group or radio access technology (or for each cell or each beam). That is, an embodiment of the disclosure may provide a method in which a separate timer may be configured and a separate duration may be configured according to each frequency configuration group, by configuring a duration or a timer value for which frequency measurement is to be performed for an LTE frequency (for each frequency or each cell), and separately configuring a duration or a timer value for which frequency measurement is to be performed for an NR frequency (for each frequency, each cell, or each beam). That is, according to an embodiment of the disclosure, a timer may run for each frequency group, and frequency measurement may be performed until the timer expires. When a separate timer may be configured for each radio access technology, each cell, or each cell beam, a frequency measurement duration may vary depending on frequency characteristics, beam characteristics, or cell characteristics, thereby optimizing battery consumption of the UE.

In the first embodiment of the disclosure, a UE capable of performing frequency measurement in an RRC idle mode or an RRC inactive mode and making a fast frequency measurement result report may correspond to one or more of the following UEs.

1. All UEs having capability supporting a method of performing early frequency measurement and making a fast frequency measurement result report in an RRC idle mode or an RRC inactive mode
2. A UE belonging to RRC idle mode or inactive mode UEs and receiving configuration information indicating to perform frequency measurement in an RRC idle mode or an RRC inactive mode when the UE is transitioned by a gNB from an RRC connected mode to the RRC idle mode or the RRC inactive mode through an RRC message. For example, a UE in which frequency configuration information for performing frequency measurement in an RRC idle mode or an RRC inactive mode, a measurement duration (e.g., a timer value), or area configuration information (e.g., a list of cell identifiers) for performing the frequency measurement is configured Referring to FIG. 1F, a UE in an RRC connected mode in operation 1*f*-05 may be transitioned to an RRC idle mode or an RRC inactive mode by a gNB for a certain reason (e.g., no data transmission/reception for a certain period of time) in operation 1*f*-15.

In operation 1*f*-10, when the gNB transitions a mode of the UE, the gNB may transmit an RRC message. For example, the gNB may transmit an RRCRelease message (indicating to transition to the RRC idle mode) or an RRCRelease message (indicating to transition to the RRC inactive mode) including suspend-config. The RRC message may include the following pieces of information or some of the information to be applied when the UE performs fast (early) frequency measurement in the RRC idle mode or the RRC inactive mode.

Frequency configuration information of frequencies to be measured in the RRC idle mode or the RRC inactive mode
1. Frequency configuration information
A. LTE frequency measurement information group or list (evolved universal terrestrial radio access (EUTRA) frequency configuration information/list/group)
 i. The LTE frequency measurement information group or list may include frequency measurement configuration information (early measurement setup) such as which frequencies or which frequency bands are to be measured (e.g., a frequency list), which order is to be used to perform measurement by configuring a priority of each frequency, which filtering method is to be used to measure an intensity of a frequency (e.g., L1 filtering, L2 filtering, L3 filtering methods, or a calculation method using a coefficient) when a frequency is measured, which event or condition is to be used to start measurement when a frequency is measured, which criterion (e.g., when a strength of a signal is equal to or greater than an indicated threshold value) is to be used to perform and report measurement when compared to a current serving cell (or a currently camped on frequency), which event or condition is to be used to report a measured frequency result, which criterion or condition is to be satisfied to report a frequency when compared to a current serving cell (or a currently camped on frequency), or which period is to be used to report a frequency measurement result.
B. NR frequency measurement information group or list (NR frequency configuration information/list/group)
 i. The NR frequency measurement information group or list may include frequency measurement configuration information (early measurement setup) such as which frequencies or which frequency bands are to be measured (e.g., a frequency list), which order is to be used to perform measurement by configuring a priority of each frequency (each synchronization signal block (SSB)), SSB transmission resource (frequency and time resource, beam identifier, or beam indicator), or SSB identifier information of each frequency, which filtering method is to be used to measure an intensity of a frequency (e.g., L1 filtering, L2 filtering, L3 filtering methods, or a calculation method using a coefficient) when a frequency is measured, which event or condition is to be used to start measurement when a frequency is measured, which criterion (e.g., when a strength of a signal is equal to or greater than an indicated threshold value) is to be used to perform and report measurement when compared to a current serving cell (or a currently camped on frequency), which event or condition is to be used to report a measured frequency result, which criterion or condition is to be satisfied to report a frequency when compared to a current serving cell (or a currently camped on frequency), or which period is to be used to report a frequency measurement result.
2. A timer value (e.g., T331) for performing frequency measurement or a duration for measuring frequency measurement in an RRC idle mode or an RRC inactive mode, or a timer for an LTE frequency and a timer for an NR frequency may be separately configured. Because LTE frequency characteristics (low frequency band) and NR frequency characteristics (high frequency band) are different from each other, battery power of a UE may be saved by separately adjusting a frequency measurement time of the UE. For example, when frequency measurement is indicated in the RRC idle mode or the RRC inactive mode in RRCRelease, frequency measurement may be performed while a timer starts and runs, and the frequency measurement may be stopped when the timer expires.
3. Validity area information for performing frequency measurement in an RRC idle mode or an RRC inactive mode. For example, when a list of physical cell identifiers (PCIDs) is indicated and a UE is in a cell indicated in the validity area information, frequency measurement may be performed, whereas when the UE is out of the validity area information, the frequency measurement may be stopped. For example, when the UE is out of the validity area information, a timer may be stopped and frequency measurement may be stopped. Also, in another method, when the UE transitions to an RRC inactive mode, a gNB may determine whether to use a RAN notification area as the validity area by using an indicator. For example, when the gNB indicates to the UE transitioning to the RRC inactive mode through an indicator to use the RAN notification area as the validity area, the UE may perform frequency measurement within the RAN notification area while maintaining the RRC inactive mode within the RAN notification area. In another method, the gNB may indicate through an indicator to use the validity area as the RAN notification area. In another method, even when there is no indicator in the RRC inactive mode, the UE may operate by considering the RAN notification area as the validity area, and in an RRC valid mode, the gNB may configure a separate validity area in the UE. Because both the RAN notification area and the validity area are indicated by using a list of cell identifiers in the RRC message, signaling overhead may be reduced through the above method, and because the UE does not need to separately manage the validity area, the burden on the UE may be reduced.

4. A measurement report threshold value may be configured, and a plurality of frequencies having a greater signal strength than a threshold value in a configured frequency group may be reported.

Also, a gNB may define and configure a value of a second timer in an RRCRelease message and may indicate how long a frequency measurement result value measured by a UE is valid. For example, for the second timer running based on the value of the second timer, the UE may store and use the timer value when receiving the RRCRelease message. The second timer may start when the UE receives the RRCRelease message, and when the second timer expires, the UE may determine that a measured frequency measurement result is not valid and may discard the measured frequency measurement result. That is, the UE may not make a report to the gNB. In another method, the second timer may start when a first timer expires or stops. This is because, because a frequency measurement result may be updated while frequency measurement is performed, a validity duration of a latest frequency measurement result may be indicated by starting the second timer from a point of time when the first timer expires or stops to stop the frequency measurement. When the second timer expires, the UE may determine that a measured frequency measurement result is not valid and may discard the measured frequency measurement result. That is, the UE may not make a report to the gNB. In another method, the UE or the gNB may define and use the first timer to perform a function of the second timer.

When the RRCRelease message is received and fast frequency measurement configuration information is included, the UE may release or discard stored frequency measurement configuration information or a frequency measurement result, and may perform frequency measurement by storing, updating, and applying the new fast frequency measurement configuration information. In another method, when only a frequency measurement duration or a timer value is configured in the fast frequency measurement configuration information, the UE may restart a timer based on the value, and may continue a frequency measurement configuration while maintaining existing frequency configuration information. Alternatively, the UE may start the timer based on the value, may release the existing frequency configuration information, may receive system information in a camped-on cell through a cell reselection procedure, and when there is frequency configuration information, may perform frequency measurement by applying the frequency configuration information. In another method, the gNB may define a new indicator in the RRCRelease message, and may indicate whether to continue frequency measurement by using the existing frequency measurement configuration information, to stop the frequency measurement, or to release frequency measurement configuration information. In another method, only when frequency measurement configuration information is included in the RRCRelease message, the UE may release the existing frequency configuration information, and when there is no frequency configuration information, the UE may maintain and apply the existing frequency configuration information.

In operation 1f-30, a condition for starting frequency measurement when the UE performs early frequency measurement in the RRC idle mode or the RRC inactive mode may satisfy at least one of the following conditions.

1. When a UE receives an RRCRelease message, an indicator to perform frequency measurement in an RRC idle mode or an RRC inactive mode is included, and a duration (e.g., a timer value) for measuring a frequency and frequency information of frequencies to be measured are configured, the UE may start a timer and may perform frequency measurement according to the frequency information.

2. When a UE receives an RRCRelease message, an indicator to perform frequency measurement in an RRC idle mode or an RRC inactive mode is included, and a duration (e.g., a timer value) for measuring a frequency is configured but frequency information of frequencies to be measured is not included, the UE may start a timer, and when frequency information of frequencies to be measured in the RRC idle mode or the RRC inactive mode is broadcast in system information, the UE may perform frequency measurement according to the frequency information. When the UE may move to another cell, when frequency information of frequencies to be measured in the RRC idle mode or the RRC inactive mode is broadcast in system information of a newly camped cell, the UE may perform frequency measurement according to the new frequency information.

That is, when frequency measurement configuration information for performing frequency measurement in the RRC idle mode or the RRC inactive mode is not configured in the RRCRelease message, when frequency configuration information for RRC idle mode or RRC inactive mode frequency measurement is broadcast in system information, the UE may perform frequency measurement in the RRC idle mode or the RRC inactive mode based on the frequency configuration information.

Referring to operation 1f-12, when the UE moves and is camped on a new cell, the UE may update frequency measurement information to frequency configuration information for RRC idle mode or RRC inactive mode frequency measurement broadcast in the new cell, and may perform again frequency measurement.

However, when frequency measurement configuration information for performing frequency measurement in the RRC idle mode or the RRC inactive mode is configured in the RRCRelease message, the UE may perform frequency measurement by preferentially applying the frequency measurement configuration information configured in the RRCRelase message to RRC idle mode or RRC inactive mode frequency measurement information broadcast in system information. That is, when frequency measurement configuration information for performing frequency measurement in the RRC idle mode or the RRC inactive mode is configured in the RRCRelease message, the UE may not reflect or consider, or may discard frequency configuration information broadcast in system information.

As described above, the UE may start fast (early) frequency measurement according to at least one of the above conditions. In operation 1f-35, the UE may transmit the message 3 (RRCSetupRequest or RRCResumeRequest) to the gNB while performing frequency measurement. In operation 1f-40, the UE may receive the message 4 (e.g., RRCSetup or RRCResume) from the gNB in response to the message 3 and may determine that a random access procedure has succeeded. In operation 1f-45, the UE may transition to the RRC connected mode.

When an indicator indicating that RRC idle mode or RRC inactive mode frequency measurement is supported or an indicator indicating that an RRC idle mode or RRC inactive mode frequency measurement result may be received is broadcast in system information (e.g., SIB2) received before a connection is configured in a current cell, the UE may notify the gNB that there is a frequency measurement result measured in the RRC idle mode or the RRC inactive mode in the message 5 (e.g., RRCSetupComplete or RRCResumeComplete) through an indicator.

In operation 1f-50, when the UE transmits the message 5 (e.g., RRC Setup Complete or RRC Resume Complete), the UE may cause an indicator indicating that early frequency measurement has been performed in the RRC idle mode or the RRC inactive mode and there is a frequency measurement result to be reported to be included in the message 5 and may transmit the message 5. In the message 5, a new indicator may be defined in the message 5 to indicate that there is a fast frequency measurement result, or an indicator indicating that there is UE information previously defined in the RRC message (RRC Setup Complete or RRC Resume Complete) may be re-used. In another method, in the system information, the indicator may be defined and used as an indicator indicating LTE frequency measurement support or NR frequency measurement support. Also, when the message 5 indicates that there is a frequency measurement result measured in the RRC idle mode or the RRC inactive mode, an indicator for a measurement result of an LTE frequency and an indicator for a measurement result of an NR frequency may be respectively defined and indicated.

In operation 1f-55, when the gNB determines through an indicator in the message 5 that the UE has performed early frequency measurement in the RRC idle mode or the RRC inactive mode and there is a measurement result to be reported, the gNB may transmit to the UE a message to report the measurement result in order to rapidly receive a frequency measurement result report. For example, the gNB may request the UE for frequency measurement result information by newly defining and using a UEInformationRequest message as a DL-dedicated control channel (DCCH) message.

In operation 1f-65, when the UE receives the message, the UE may rapidly report a fast (early) frequency measurement result to the gNB. For example, when the UE receives the message, the UE may report a frequency measurement result by newly defining and using a UEInformationResponse message as a UL-DCCH message. The frequency measurement result may include a serving cell/frequency measurement result (e.g., NR-SS Reference Signal Received Power/ Reference Signal Received Quality (RSRP/RSRQ)), a serving cell/frequency neighboring cell/frequency measurement result, a neighboring cell/frequency measurement result measurable by the UE, and a cell/frequency measurement result indicated to be measured. In another method, the gNB may request the UE for frequency measurement result information by defining and using an indicator in an RRCReconfiguration message. When the UE receives the message, the UE may rapidly report an early frequency measurement (early measurement) result to the gNB. For example, when the UE receives the message, the UE may report a frequency measurement result by using an RRCReconfigurationComplete message, and in another method, the UE may report a frequency measurement result by defining and using new fields for reporting the frequency measurement result in the UL-DCCH message.

Conditions for causing the UE to stop early frequency measurement in the RRC idle mode or inactive mode may include at least one of the following conditions.

1. After or when it is notified to a gNB that system information of a current cell supports a fast frequency measurement result report and there is a measurement result report in an RRC message (e.g., the message 5)
2. When a UE configures a connection to a network while performing RRC idle mode or RRCinactive mode frequency measurement, stops a timer and stops measurement when receiving an RRCSetup message or an RRCResume message as the message 4, and is to notify a gNB that system information of a current cell supports a fast frequency measurement result report and there is a measurement result report in an RRC message (e.g., the message 5)
3. When a measurement report timer (e.g., T331) expires
4. When a UE is out of an area indicated in RRC idle mode or RRC inactive mode frequency measurement area information configured in an RRCRelease message In operation 1f-60, the UE may stop RRC idle mode or RRC inactive mode frequency measurement (IDLE mode/INACTIVE mode measurement) according to at least one of the above conditions.

The UE may perform measurement on frequencies measurable by the UE, that is, supported in fast frequency configuration related information, and in this case, the UE may select a frequency to be preferentially measured according to a configured priority.

An embodiment of the disclosure may provide a detailed UE operation of reporting a frequency measurement result of the first embodiment in which early frequency measurement is performed and reported in an RRC idle mode or an RRC inactive mode as follows.

A UE may perform the following operations when receiving an RRCSetup message or an RRCResume message as the message 4.

1. When system information (e.g., SIB2) broadcasts or includes an indicator (IDLE or INACTIVE Mode Measurement) indicating that RRC idle mode or RRC inactive mode frequency measurement may be supported, and the UE has a frequency measurement result measured in the RRC idle mode or the RRC inactive mode,
A. the UE may cause an indicator (idle or INACTIVE Measavailable) indicating that there is an RRC idle mode or RRC inactive mode frequency measurement result to be included in an RRCSetupComplete message or an RRCResumeComplete message as the message 5 as the message 5. Accordingly, the UE may indicate that there is RRC idle mode or RRC inactive mode frequency measurement information to be reported to a gNB through the message.
B. Because a frequency measurement result is to be reported, the UE may stop a timer (e.g., T331) for RRC idle mode or RRC inactive mode frequency measurement. The UE may stop frequency measurement and may discard frequency measurement configuration information.

Figure 1H:
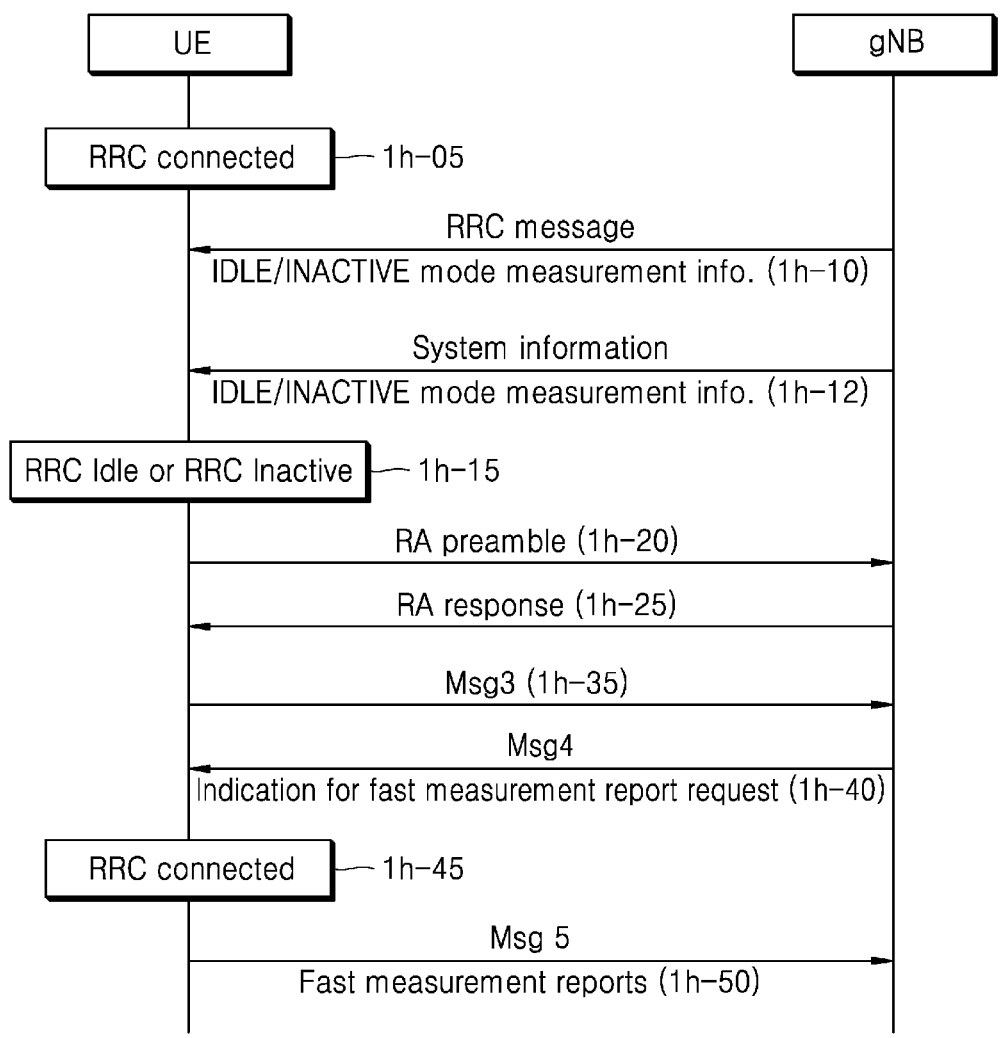
FIG. 1H is a diagram for describing a method in which a UE performs early frequency measurement and makes a fast frequency measurement result report in a next-generation mobile communication system according to an embodiment of the disclosure.

FIG. 1H is a diagram for describing a method in which a UE performs early frequency measurement and makes a fast frequency measurement result report in a next-generation mobile communication system according to an embodiment of the disclosure. In more detail, FIG. 1H is a diagram illustrating a second embodiment in which a UE may perform early frequency measurement (early measurement) in an RRC idle mode or an RRC inactive mode and may make a fast frequency measurement result report (fast measurement report).

Descriptions of the first embodiment may be applied to the second embodiment of the disclosure. Also, when a gNB configures frequency measurement configuration information for enabling a UE to perform frequency measurement in an RRC idle mode or an RRC inactive mode through an RRCRelease message in the UE, the gNB may configure a plurality of frequency measurement groups. In the method of the present embodiment of the disclosure, the UE may perform frequency measurement in the RRC idle mode or the RRC inactive mode and may transmit the message 3 to the gNB when configuring a connection to a network, the gNB may perform a measurement report indication in the message 4 (e.g., RRCResume) when transmitting the message 4 in response to the message 3, and a frequency measurement result report may be made in the message 5 (e.g., RRCResumeComplete). Accordingly, a frequency measurement result report may be rapidly made and a measurement result after increasing a security level may be reported, when compared to the first embodiment. This is because an RRC inactive mode UE activates security algorithms for SRB1 from a point of time when the message 3 is transmitted. That is, the message 4 and the message 5 may be encrypted and integrity protected with a new security key in a PDCP layer, and may be transmitted.

In the RRC idle mode or the RRC inactive mode, the UE may perform frequency measurement, may store a measurement result, may perform random access, and then may transmit the message 3 (e.g., RRCSetupRequest or RRCResumeRequest). When the gNB transmits the message 4 (e.g., RRCSetup or RRCResume) to the UE, the gNB may cause an indicator to report a frequency measurement result to be included in the message 4 and may transmit the message 4. In another method, because the message 4 itself may indicate that the UE is to report a frequency measurement result, the indicator may be omitted.

The UE may report a frequency measurement result in the message 5 (e.g., RRCSetupComplete or RRCResumeComplete). Because an RRC inactive mode UE may resume or activate a security procedure (ciphering and deciphering or integrity protection and verification) for a signaling radio bearer SRB1 when transmitting the RRCResumeRequest message, the RRC inactive mode UE may increase a security level and receive the message 4 when receiving the message 4, and may increase a security level and report a frequency measurement result of the message 5 when reporting the frequency measurement result of the message 5. Also, the gNB may cause carrier aggregation configuration or dual connectivity configuration information to be included in the RRC message by using the above information and may transmit the RRC message, so that the UE may rapidly restart, change, or newly configure carrier aggregation or dual connectivity.

Referring to FIG. 1H, an RRC connected mode UE may receive frequency measurement configuration information along with an indication to release an RRC connection and transition to an RRC idle mode or an RRC inactive mode from a gNB. In this case, the UE may perform frequency measurement for a configured duration or time in the RRC idle mode or the RRC inactive mode. However, when there is no information about a list of frequencies to be measured in the frequency measurement configuration information, when frequency measurement configuration information for frequency measurement of the RRC idle mode or RRC inactive mode UE is broadcast in a camped-on cell while a cell reselection procedure is performed, the UE may receive the information and may perform frequency measurement.

When the UE receives an RRCRelease message and transitions to the RRC inactive mode, in order to efficiently handle secondary cells (Scells) configured for carrier aggregation and secondary cell groups (SCGs) configured for dual connectivity, the UE may perform at least one of the following methods.

Method 1: The UE may release both configuration information for SCells and configuration information for SCGs. When a connection is configured later, the gNB may rapidly configure information about Scells for carrier aggregation or SCGs for dual connectivity in the UE through an RRCResume message or an RRCReconfiguration message based on a fast frequency measurement result report. According to the method 1, because the UE does not need to maintain configuration information for SCells or configuration information for SCGs, it may be advantageous when considering a memory, and because the gNB does not need to retrieve existing configuration information for Scells or SCGs from a source gNB, implementation may be facilitated.

Method 2: The UE may store configuration information for SCells or configuration information for SCGs, and may suspend a bearer configuration or transmission of Scells or SCGs. When a connection is configured later, through the RRCResume message or the RRCReconfiguration message based on a fast frequency measurement result report, the gNB allow the UE to resume a re-use of information about Scells for carrier aggregation or SCGs for dual connectivity, may update only some configuration information (delta configuration), or may perform a completely new configuration. According to the method 2, because the UE maintains configuration information for SCells or configuration information for SCGs, the gNB may use existing configuration information for Scells or SCGs, thereby reducing signaling overhead. Also, the UE may rapidly apply and start carrier aggregation or dual connectivity. Configuration information for SCells or configuration information for CGs may not be released or discarded even when an RRC inactive mode UE resumes a connection, and the gNB may indicate to maintain or discard the configuration information for Scells or the configuration information for SCGs by defining an indicator in the RRCResume message. In another method, the gNB may indicate to maintain or discard the configuration information for Scells or the configuration information for SCGs by using a full configuration information indicator (fullConfig). In another method, when the gNB transmits the RRCRelease message to the UE to transition an RRC connected mode UE to the RRC inactive mode, the gNB may indicate that SCell (master cell group (MCG) or SCG) or SCG configuration information is to be maintained or discarded in the RRCRelease message. Accordingly, the UE may maintain the Scell or SCG configuration information according to an indicator of the RRCRelease message, may maintain the Scell or SCG configuration information even when an RRC connection resume procedure starts, and may apply configuration information according to an indication (e.g., RRC message) of the gNB. For example, when there is no indication of the SCell or SCG configuration information in the RRCRelease message, the UE may release the Scell or SCG configuration information. When there is an indicator to maintain, store, or discard MCG SCell configuration information or SCG PScell or SCell configuration information, the UE may accordingly store and maintain configuration information, may apply the configuration information even in an RRC connection resume procedure, and may apply the configuration according to an indication (RRC message) of the gNB. Configuration information for Scells or configuration information for SCGs may refer to PDCP layer configuration information, SDAP layer configuration information, RLC layer information, MAC layer information, or PHY layer configuration information, and may indicate some or all of the information. In another method, because an RRC inactive mode UE moves while performing a RAN notification area update procedure, it may be indicated in the RRCRelease message received in the RAN notification area update procedure to maintain or discard the Scell or SCG configuration information. This is because the gNB may receive context of a Resume identifier when the RAN notification area update procedure is performed, and thus may detect UE configuration information. In another method, when an RRC inactive UE performs an RRC connection resume procedure with the gNB, when the UE transmits the RRCResumeRequest message but the gNB indicates fallback in response in the RRCSetup message for a certain reason (e.g., fails to retrieve UE context), the UE may discard the configuration information for Scells or the configuration information SCGs. This is because the gNB may not retrieve UE context, and thus the gNB may not determine the configuration information for Scells or the configuration information for SCGs stored in the UE. The configuration information for Scells or the configuration information for SCGs may refer to PDCP layer configuration information, SDAP layer configuration information, RLC layer information, MAC layer information, or PHY layer configuration information, and may indicate some or all of the information. The gNB may rapidly configure carrier aggregation or dual connectivity in the UE through the RRCResume message or the RRCReconfiguration message in an RRC connection resume procedure, by using existing SCell information or SCG information stored in the UE, by applying the above methods. When dual connectivity is configured, the gNB may cause preamble information and frequency information necessary for random access to an SCG to be included and may notify the preamble information and the frequency information to the UE. Also, the gNB may indicate to activate an Scell or an SCG in the RRCResume message or the RRCReconfiguration message, and may also indicate fast channel measurement information (short channel state information (CSI) reporting or aperiodic CSI reporting).

When there is a need to configure an RRC connection to a network, the UE may indicate that there is a result of frequency measurement in the RRC idle mode or the RRC inactive mode while configuring a connection to the gNB.

When a connection to a network is re-configured in the RRC idle mode or the RRC inactive mode, when the UE supports an early report of a frequency measurement result in a cell for configuring a current connection, the UE may prepare a frequency measurement result. Referring to operation 1h-35, the UE may perform random access as in operations 1h-20 through 1h-25 and then may transmit the message 3 (e.g., RRCSetupRequest or RRCResumeRequest) to the gNB.

In operation 1h-40, the gNB may cause an indicator to report a frequency measurement result to be included in the message 4 (e.g., RRCSetup or RRCResume) in order to rapidly configure carrier aggregation or dual connectivity and may transmit the message 4 to the UE. In this case, in another method, because the message 4 itself transmitted by the gNB may indicate that a frequency measurement result is to be reported, the indicator may be omitted.

In operation 1h-50, when the UE receives the message 4, the UE may transmit and report the frequency measurement result along with the message 5 (e.g., RRCSetupComplete or RRCResumeComplete). A connection configuration to a network may be performed, and when the gNB transmits the message 4 (e.g., RRCSetup or RRCResume) or the RRCReconfiguration message to the UE, the gNB may cause carrier aggregation configuration information or dual connectivity configuration information to be included in the message 4 or the RRCReconfiguration message, so that the UE may rapidly restart, change, or newly configure carrier aggregation or dual connectivity. In another method, when the gNB transmits a plurality of frequency configuration information, information for Scells, or information for SCGs in the RRCResume message, the UE may select a better frequency or SCG based on a frequency measurement result (e.g., may select a better frequency or SCG based on a condition configured by the gNB (e.g., whether a strength of a signal is equal to or greater than a given value)), and may report information about a frequency, Scell, or SCG satisfying a given condition in the RRCResumeComplete message. Alternatively, the UE may directly perform a connection by performing a random access procedure on the frequency, Scell, or SCG satisfying the given condition. When a connection to the gNB or a cell to which the UE connects is completed, the gNB may notify a source gNB that the UE has connected. The source gNB may request a plurality of different target gNBs for connection authorization, and when a timer runs and the UE does not access for a certain period of time, each target gNB may determine that a connection fails, or the source gNB may indicate that the UE configures a connection to another target gNB or may directly indicate to cancel connection authorization.

Conditions for causing the UE to stop early frequency measurement in the RRC idle mode or the inactive mode may include at least one of the following conditions.
1. After or when it is notified to a gNB that system information of a current cell supports a fast frequency measurement result report in the message 3
2. When a UE stops a timer and stops measurement when receiving a frequency measurement result report indication in the message 4 in a random access procedure for configuring a connection to a network while performing RRC idle mode or RRC inactive mode frequency measurement, and is to notify a gNB that system information of a current cell supports a fast frequency measurement result report and there is a measurement result report in an RRC message (e.g., the message 5)
3. When a measurement result report is to be made through the message 5
4. When a measurement report timer (e.g., T331) expires 5. When a UE is out of an area indicated in RRC idle mode or RRC inactive mode frequency measurement area information configured in an RRCRelease message The UE may stop RRC idle mode or RRC inactive mode frequency measurement (IDLE mode/INACTIVE mode measurement) according to at least one of the above conditions.

In an embodiment of the disclosure, the UE may perform measurement on frequencies measurable by the UE, that is, supported in fast frequency configuration related information, and in this case, the UE may select a frequency to be preferentially measured according to a configured priority.

According to the second method of a method of rapidly performing and reporting frequency measurement in the RRC idle mode or the RRC inactive mode, a detailed UE operation of reporting a frequency measurement result may be provided as follows.

A UE may perform the following operations when receiving a random access response and receiving the message 4 from a gNB.
1. When system information (e.g., SIB2) broadcasts or includes an indicator (IDLE or INACTIVE Mode Measurement) indicating that RRC idle mode or RRC inactive mode frequency measurement may be supported, and the UE has a frequency measurement result measured in the RRC idle mode or the RRC inactive mode,
A. the UE may cause an RRC idle mode or RRC inactive mode frequency measurement result to be included in the message 5 (RRCSetupRequest message or RRCResumeRequest message). In another method, the UE may multiplex the RRC message (e.g., the message 5) and a frequency measurement result in a MAC layer and may transmit the RRC message and the frequency measurement result. Accordingly, the UE may report RRC idle mode or RRC inactive mode frequency measurement information to the gNB through the message.
B. Because a frequency measurement result is to be reported, the UE may stop a timer (e.g., T331) for RRC idle mode or RRC inactive mode frequency measurement. The UE may stop frequency measurement and may discard frequency measurement configuration information and a frequency measurement result.

An embodiment of the disclosure may provide an efficient signaling method in which a network or a gNB may more efficiently configure or update frequency measurement configuration information in a UE having mobility in an RRC inactive mode.

A most significant difference between an RRC idle mode UE and an RRC inactive mode UE is that the RRC inactive mode UE may store UE context in a gNB and a UE and may rapidly configure a connection by reusing the UE context, and that the RRC inactive mode UE may update an area where an RRC inactive mode has to be maintained from a network by periodically updating a RAN notification area.

According to an embodiment of the disclosure, when an RRC connected mode UE receives frequency measurement configuration information along with an indication to release an RRC connection and transition to an RRC inactive mode from a gNB, the UE may perform frequency measurement for a configured duration or time in the RRC inactive mode. When the RRC inactive mode UE moves out of a configured RAN notification area, the RRC inactive mode UE may configure a connection to a network, to perform a RAN notification area update (RNAU) procedure. In this case, according to an embodiment of the disclosure, for a UE performing a connection to a network to update a RAN notification area, a gNB may configure or update new frequency measurement configuration or may indicate the UE to maintain frequency measurement.

In detail, the disclosure may provide two procedures of updating a RAN notification area.

Figure 1I:
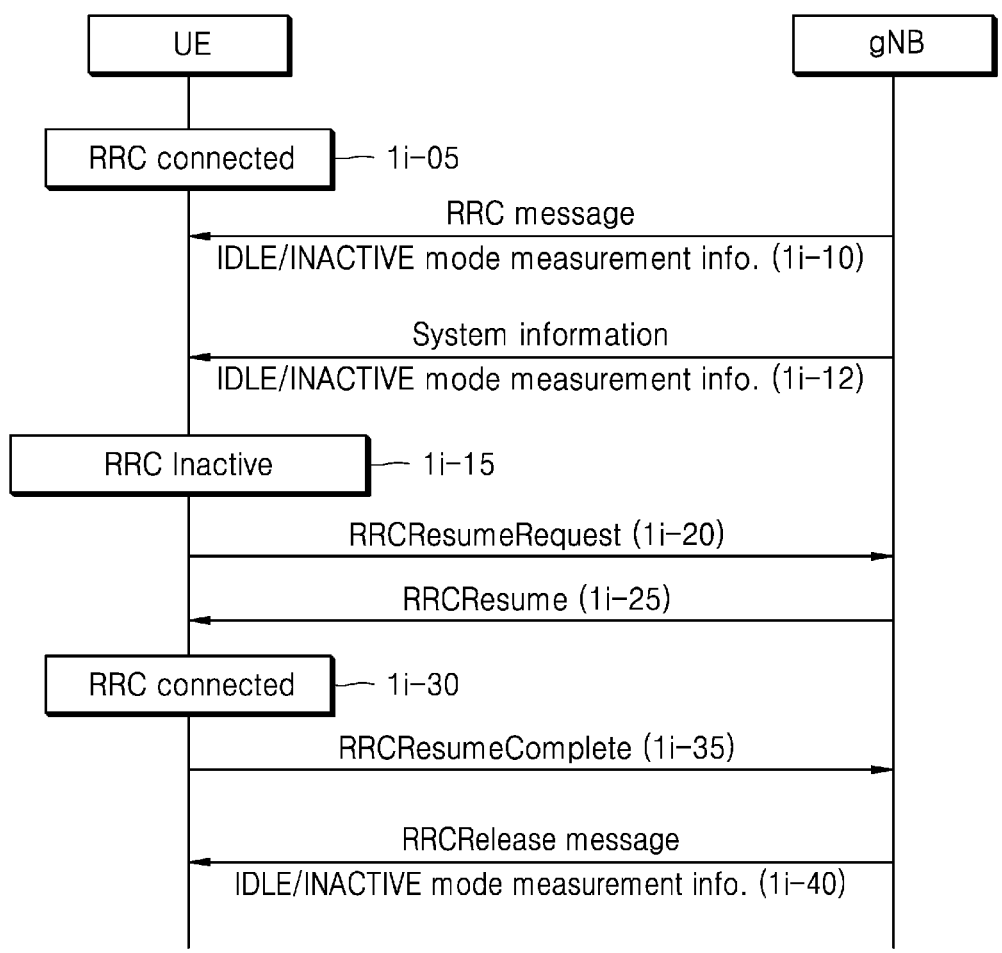
FIG. 1I is a diagram for describing a radio access network (RAN) notification area update procedure according to an embodiment of the disclosure.

FIG. 1I is a diagram for describing a RAN notification area update procedure according to an embodiment of the disclosure.

In operation 1i-20, when an RRC inactive mode UE moves out of a RAN notification area, the RRC inactive mode UE may perform a random access procedure to perform a RAN notification area update procedure and may transmit the message 3 (e.g., RRCResumeRequest) to a gNB to connect to a network.

The gNB may identify a connection resume identifier of the UE in the message 3 to retrieve UE context from a source gNB, and may identify a connection resume cause in the message 3 to determine that the UE needs to update the RAN notification area.

In operation 1i-25, the gNB may transmit to the UE the message 4 (e.g., RRCResume) to update the RAN notification area so that the UE may transition to an RRC connected mode.

In operation 1i-35, the UE may transmit the message 5 and may indicate that a connection has been properly established. In operation 1i-40, the gNB may cause a new RAN notification area to be included in an RRCRelease message to update the RAN notification area, may transmit the RRCRelease message to the UE, and may indicate the UE to re-transition to an RRC inactive mode. When the UE receives the RRCRelease message, the UE may identify and reflect new RAN notification area information, may maintain mobility, and may transition to the RRC inactive mode.

Figure 1J:
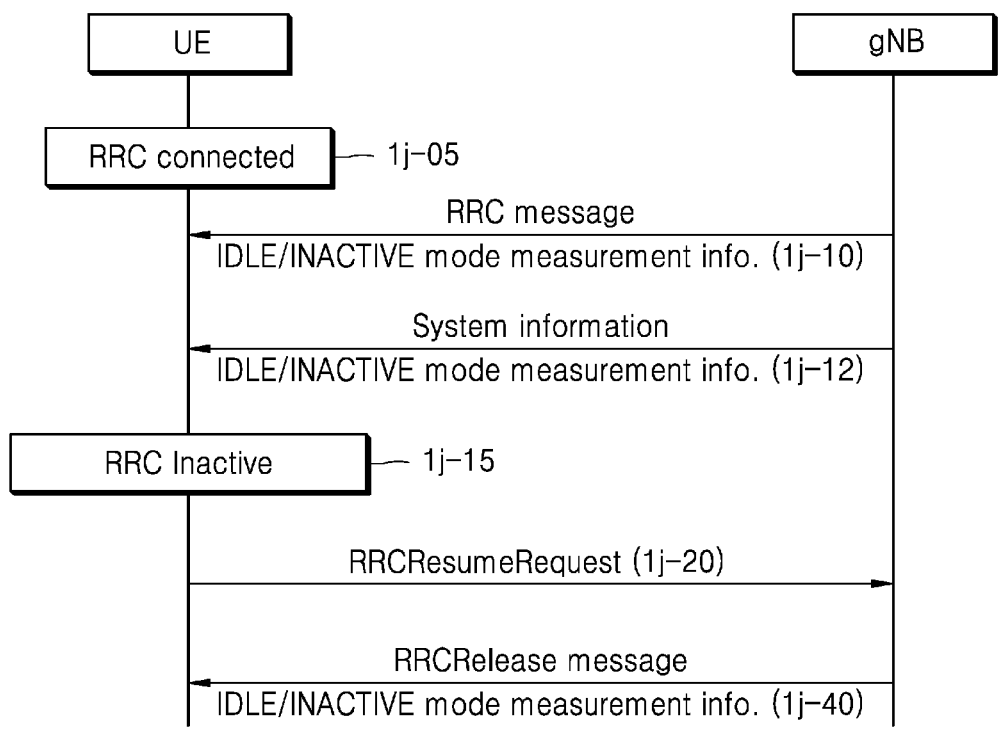
FIG. 1J is a diagram for describing a RAN notification area update procedure according to an embodiment of the disclosure.

FIG. 1J is a diagram for describing a RAN notification area update procedure according to an embodiment of the disclosure.

In operation 1j-20, when an RRC inactive mode UE moves out of a RAN notification area, the RRC inactive mode UE may perform a random access procedure to perform a RAN notification area update procedure, and may transmit the message 3 (e.g., RRCResumeRequest) to a gNB to perform a connection to a network.

The gNB may identify a connection resume identifier of the UE in the message 3 to retrieve UE context from a source gNB, and may identify a connection resume cause in the message 3 to determine that the UE needs to update the RAN notification area.

In operation 1j-40, the gNB may cause a new RAN notification area to be included in an RRCRelease message to update the RAN notification area, may transmit the RRCRelease message to the UE, and may indicate the UE to maintain an RRC inactive mode. When the UE receives the RRCRelease message, the UE may identify and reflect new RAN notification area information, may maintain mobility, and may maintain the RRC inactive mode. The RAN notification area update procedure may reduce signaling overhead and may not require a state transition of the UE, when compared to the RAN notification area update method of FIG. 1I. That is, the UE may perform the RAN notification area update procedure while maintaining an RRC inactive mode.

In the above RAN notification area update procedures, a gNB may retrieve UE context from a source gNB through a connection resume identifier indicated by a UE in the message 3 (RRC Resume Request), and may determine whether the UE is to perform a frequency measurement configuration in an RRC inactive mode. Also, the UE may indicate that a connection resume cause (resumeCause) is to update a RAN notification area in the message 3. In another method, when the UE transmits the message 3 to update the RAN notification area, the UE may cause an indicator indicating that frequency measurement is to be performed in an RRC inactive mode, a timer T331 expires or is running, or new frequency configuration information is required to be included in the message 3 and may transmit the message 3 to the gNB to indicate the information to the gNB.

As described with reference to operations 1*i*-40 and 1*j*-40, when a gNB determines whether a UE may perform frequency measurement in an RRC inactive mode and then transmits an RRC message (e.g., an RRCRelease message) including information for updating the RAN notification area to the UE, the gNB may cause new frequency measurement configuration information to be included in the RRC message and may transmit and configure the RRC message. The new frequency measurement configuration information may include configuration information such as a list of frequencies to be measured, a list of physical cell identifiers, or a measurement duration, or a validity area for measurement (e.g., a cell identifier list). Accordingly, when an RRC inactive mode UE moves and passes through coverage supported by another cell or gNB, a UE and a gNB according to an embodiment of the disclosure may newly update or change frequency measurement configuration information in an RRC inactive mode through a RAN notification area update procedure, the UE having mobility may rapidly report frequency measurement configuration information when configuring a connection to a network later, and dual connectivity or carrier aggregation may be rapidly configured.

Also, embodiments of the disclosure may provide a procedure in which when a gNB or a cell to which a UE connects may support RRC idle mode or inactive mode frequency measurement, when information may indicate that RRC idle mode or inactive mode frequency measurement is supported, and when a frequency measurement result may be reported to the gNB, the UE may stop the timer T331 for RRC idle mode or inactive mode frequency measurement and may discard or release frequency measurement configuration information or discard a frequency measurement result.

Also, in an embodiment of the disclosure, an RRC inactive mode or RRC idle mode UE may configure, in an RRCRelease message, a separate area (e.g., a validity area) for performing frequency measurement. That is, the UE may perform frequency measurement in an RRC inactive mode or an RRC idle mode only within the validity area, and when being out of the validity area, the UE may stop a timer, may release frequency measurement configuration information, may discard a frequency measurement result, or may stop frequency measurement. The validity area may be indicated by a list of physical cell identifiers or a list of RAN notification area indicators. An embodiment of the disclosure may provide a method of separately configuring a validity area and a RAN notification area in an RRC inactive mode UE, and a method of allowing an RRC inactive mode UE to use a RAN notification area instead of a validity area (or use a validity area instead of a RAN notification area) by using an indicator in order to reduce the burden on the UE and reduce signaling overhead. This is because when a separate validity area is indicated to the UE, the UE may have a burden of maintaining and updating a tracking area, maintaining and updating a RAN notification area, and also maintaining and managing a validity area. That is, when a UE receives an RRCRelease message and receives information for transitioning the UE to an RRC inactive mode, when there is frequency measurement configuration information and there is an indicator or when a RAN notification area is indicated to be used, the UE may transition to the RRC inactive mode and may perform frequency measurement by considering the RAN notification area as a validity area. When a UE receives an RRCRelease message and receives information for transitioning the UE to an RRC inactive mode, when there is frequency measurement configuration information and there is no indicator, when a RAN notification area is not indicated to be used, or when a separate validity area is configured and is indicated, the UE may transition to the RRC inactive mode, may perform frequency measurement by considering the validity area, and may manage mobility of the RRC inactive mode according to the RAN notification area.

An embodiment of the disclosure may provide an efficient UE operation performed by a UE capable of measuring frequency measurement or configured to perform frequency measurement in an RRC inactive mode, in RAN notification area update procedures, e.g., first and second RAN notification area update procedures.

When a UE transmits the message 3 to perform a RAN notification area update procedure and receives an RRCRelease message in a first RAN notification area update procedure or a second RAN notification area update procedure Alternatively, when the UE receives an RRCRelease message 1. When the UE receives the RRCRelease message, frequency measurement configuration information is included, there is information about a frequency measurement duration, and there is no frequency measurement list information, A. the UE may configure the frequency measurement time as a timer value and may drive a timer.

B. The UE may perform a frequency measurement procedure based on information that is previously stored (information indicated in a previous RRCRelease message or information indicated in last received system information). In another method, the UE my determine that existing stored frequency measurement information is invalid information, may discard the existing stored frequency measurement information, may perform a cell reselection procedure, and may receive new frequency measurement information from system information. When the UE receives the frequency measurement information, the UE may start frequency measurement.

2. When the RRCRelease message is received, frequency measurement configuration information is included, and there is information about a frequency measurement duration and frequency information of frequencies to be measured, A. the UE may configure the frequency measurement duration as a timer value and may drive a timer.

B. The UE may determine that existing stored information is invalid information, may discard the existing stored information, may receive new frequency measurement information in the RRCRelease message, may store the new frequency measurement information, and may perform frequency measurement. When frequency measurement is stopped, the UE may resume the frequency measurement, and when frequency measurement is never stopped, the UE may newly start frequency measurement.

While the UE performs frequency measurement in an RRC inactive mode, when the UE transmits the message 3 and receives an RRCRelease message to perform a RAN notification area update procedure, that is, when the UE receives the RRCRelease message in a state where an RRC inactive mode is maintained and an RRC mode state transition does not occur Also, while the UE performs frequency measurement in an RRC inactive mode, when the UE transmits the message 3 and receives an RRCRelease message to perform a RAN notification area update procedure
1. When there is no new frequency measurement configuration information in the RRCRelease message,
  A. the UE may keep performing frequency measurement based on existing frequency configuration information.
2. When there is new frequency measurement configuration information in the RRCRelease message,
  A. the UE may discard or release existing frequency measurement configuration information or a frequency measurement result.
  B. The UE may configure a duration or a timer value included in the new frequency measurement configuration information, and may initialize and drive a timer again.
  C. When there is a frequency measurement list in the frequency measurement configuration information,
    i. the UE may perform frequency measurement on the frequency measurement list.
  D. When there is no frequency measurement list in the frequency measurement configuration information,
    i. The UE may perform a cell reselection procedure, and when there is the frequency measurement information in system information of a camped-on cell, the UE may receive and store the frequency measurement information and may perform frequency measurement.

In another method, while the UE performs frequency measurement in an RRC inactive mode, when the UE transmits the message 3 to perform a RAN notification area update procedure, the UE may stop frequency measurement and may receive an RRCRelease message, and when there is no new frequency measurement information, the UE may resume frequency measurement based on existing frequency measurement information. Also, when there is new frequency measurement information in the RRCRelease message, the UE may resume frequency measurement based on the new frequency measurement information.

In another method, when the RRCRelease message is received and fast frequency measurement configuration information is included, the UE may release or discard stored frequency measurement configuration information or a frequency measurement result, and may perform frequency measurement by storing, updating, and applying the new fast frequency measurement configuration information. In another method, when only a frequency measurement duration of a timer value is configured in the fast frequency measurement configuration information, the UE may restart a timer based on the value, and may continue a frequency measurement configuration while maintaining existing frequency configuration information. Alternatively, the UE may start the timer based on the value, may release the existing frequency configuration information, may receive system information in a camped-on cell through a cell reselection procedure, and when there is frequency configuration information, may perform frequency measurement by applying the frequency configuration information. In another method, the gNB may define a new indicator in the RRCRelease message, and may indicate whether to continue frequency measurement by using the existing frequency measurement configuration information, to stop the frequency measurement, or to release frequency measurement configuration information. In another method, only when frequency measurement configuration information is included in the RRCRelease message, the UE may release the existing frequency configuration information, and when there is no frequency configuration information, the UE may maintain and apply the existing frequency configuration information.

In another method, the following embodiments of the disclosure are possible.

When a UE transmits the message 3 to perform a RAN notification area update procedure, and receives an RRCRelease message in response to the message 3 in the first RAN notification area update procedure or the second RAN notification area update procedure Alternatively, when the UE receives an RRCRelease message
1. When the UE receives the RRCRelease message, frequency measurement configuration information is included, there is information about a frequency measurement duration and there is no frequency measurement list information, or when a new indicator to maintain frequency measurement information or a frequency measurement result and keep to perform frequency measurement is included,
  A. the UE may configure the frequency measurement duration as a timer value and may drive a timer again. Also, when the timer is running, the UE may stop the timer, may initialize the timer, may configure a value configured in the RRC message as a timer value, and may restart the timer again.
  B. The UE may perform a frequency measurement procedure based on information that is previously stored (information indicated in a previous RRCRelease message or information indicated in last received system information). In another method, the UE may determine that existing stored frequency measurement information or a frequency measurement result is invalid information, may discard the existing stored frequency measurement information or the frequency measurement result, may perform a cell reselection procedure, and may receive new frequency measurement information from system information. When the UE receives the frequency measurement information, the UE may start frequency measurement.
2. When an RRCRelease message is received, frequency measurement configuration information is included, and there is information about a frequency measurement duration and frequency information of frequencies to be measured, or when an indicator to maintain frequency measurement information or a frequency measurement result and to keep to perform frequency measurement is included,
  A. the UE may configure the frequency measurement duration as a timer value and may drive a timer. Also, when the timer is running, the UE may stop the timer, may initialize the timer, may configure a value configured in the RRC message as a timer value, and may restart the timer again.
  B. The UE may determine that existing stored frequency measurement information or a frequency measurement result is invalid information, may discard the existing stored frequency measurement information or the frequency measurement result, and may perform frequency measurement by receive and storing new frequency measurement information included in the RRCRelease message. When frequency measurement is stopped, the UE may resume the frequency measurement, and when frequency measurement is never stopped, the UE may newly start frequency measurement.

3. When the RRCRelease message is received and there is no frequency measurement configuration information, when a new indicator to maintain frequency measurement information or a frequency measurement result and keep to perform frequency measurement is not included, or when a new indicator to release or discard frequency measurement information or a frequency measurement result and stop frequency measurement is not included,
   A. the UE may determine that existing stored frequency measurement information or a frequency measurement result is invalid information and may discard the existing stored frequency measurement information or the frequency measurement result, and when a timer for frequency measurement is running, the UE may stop the timer.

An embodiment of the disclosure may provide a method of performing a frequency measurement operation, when an RRC inactive mode UE attempts to resume a connection to a network and falls back to an RRC idle mode due to an indication of a gNB.

Figure 1K:
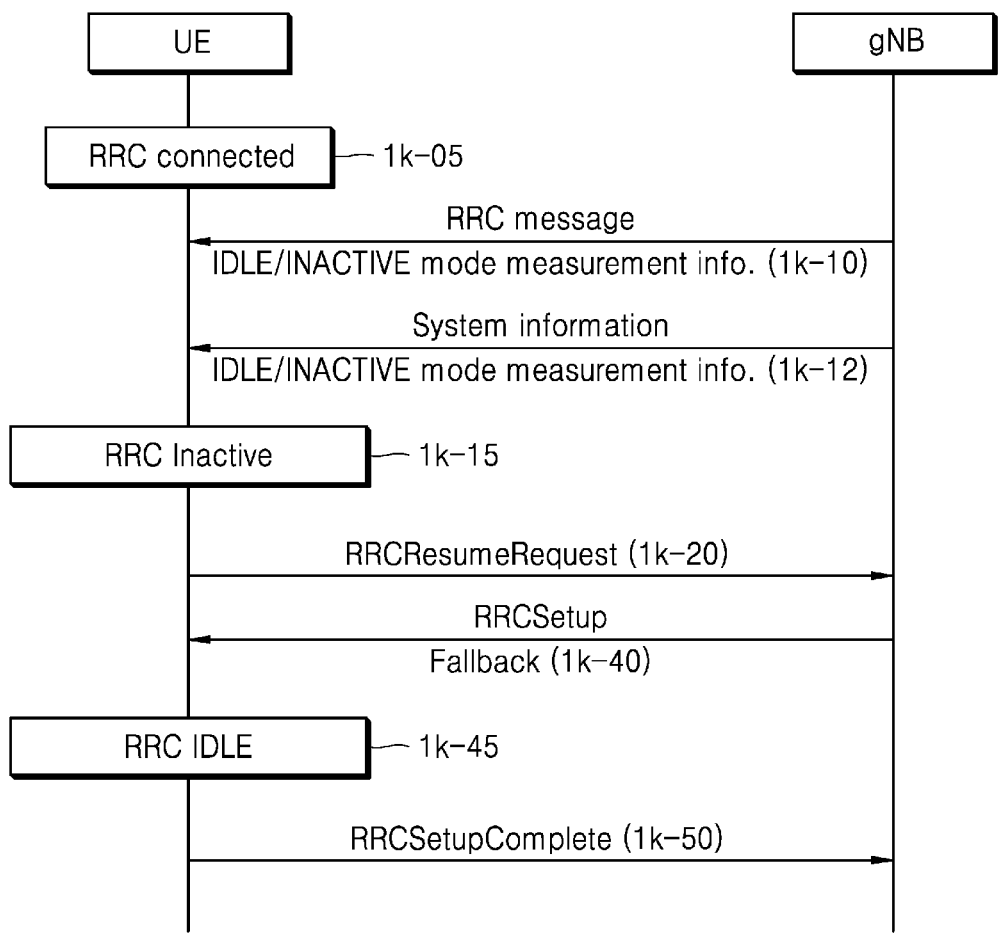
FIG. 1K is a diagram for describing a procedure in which a radio resource control (RRC) inactive UE falls back to an RRC idle mode due to an indication of a next generation Node B (gNB) according to an embodiment of the disclosure.

FIG. 1K is a diagram for describing a procedure in which an RRC inactive UE falls back to an RRC idle mode due to an indication of a gNB according to an embodiment of the disclosure. Referring to FIG. 1K, a first embodiment of performing a frequency measurement operation when an RRC inactive mode UE attempts to resume a connection to a network and falls back to an RRC idle mode due to an indication of a gNB is as follows.

A UE may transmit the message 3 to perform a RAN notification area update procedure while performing frequency measurement in an RRC inactive mode as in operation 1k-20, and a gNB may transmit an RRCSetup message as the message 4 as in operation 1k-40. When the UE may need to cancel a connection resume procedure or transition from the RRC inactive mode to an RRC idle mode as in operation 1k-45, 1. the UE may stop a timer for frequency measurement, may discard frequency measurement configuration information or a frequency measurement result, and may stop frequency measurement. Also, the UE may discard the frequency measurement result. That is, when an RRC inactive mode UE falls back, implementation of a UE and a gNB may be facilitated by a method in which the UE discards and releases all previously configured information.

A second embodiment of performing a frequency measurement operation when an RRC inactive mode UE attempts to resume a connection to a network and falls back to an RRC idle mode due to an indication of the gNB may be as follows.

A UE may transmit the message 3 to perform a RAN notification area update procedure while performing frequency measurement in an RRC inactive mode as in operation 1k-20. A gNB may transmit an RRCSetup message as the message 4 as in operation 1k-40. When the UE may need to cancel a connection resume procedure or transition from the RRC inactive mode to an RRC idle mode as in operation 1k-45, 1. the UE may indicate that there is a frequency measurement result and may report the frequency measurement result as in the above embodiments of the disclosure. That is, the UE may continue to usefully use measured results. Whether the frequency measurement result is valid may be determined by a gNB. For example, the gNB may operate as follows.
   A. When system information (e.g., SIB2) broadcasts or includes an indicator (IDLE or INACTIVE Mode Measurement) indicating that RRC idle mode or RRC inactive mode frequency measurement may be supported, and the UE has a frequency measurement result measured in the RRC idle mode or the RRC inactive mode,
   i. the UE may cause an indicator indicating that frequency measurement has been performed in an RRC idle mode or an RRC inactive mode and there is a frequency measurement result to be included in the message 5 (RRCSetupComplete) in operation k1-50. Accordingly, the UE may indicate that there is RRC idle mode or RRC inactive mode frequency measurement information to be reported to the gNB through the above message.
   ii. Because a frequency measurement result is to be reported, the UE may stop a timer (e.g., T331) for RRC idle mode or RRC inactive mode frequency measurement. The UE may stop frequency measurement and may discard frequency measurement configuration information or a frequency measurement result.

In the above embodiments of the disclosure, frequency measurement configuration information may be configured as different information elements (IEs) for an RRC idle mode and an RRC inactive mode. That is, according to an RRC mode to which a UE transitions, a gNB may cause different configuration information to be included and may indicate frequency measurement. Also, the UE may store results measured in the RRC idle mode and the RRC inactive mode in different variables and may differently report the results. Because the RRC idle mode and the RRC inactive mode are different from each other in a procedure of configuring a connection to a network and a specific operation, it may be more efficient to separately manage configuration information (a frequency measurement list, a timer value (duration), or a validity area) and configuration result report variables.

An embodiment of the disclosure may provide a fast frequency measurement operation and a method of efficiently processing frequency configuration information or a frequency measurement result, when a UE in an RRC inactive mode transitions to an RRC idle mode for a certain reason. An embodiment of the disclosure may provide certain reasons for causing a state transition of a UE and efficient methods corresponding to the certain reasons. Also, an embodiment of the disclosure may provide a method of performing a frequency measurement operation when an RRC idle mode UE accesses another radio access technology.

1. When an RRC inactive mode UE in which fast frequency measurement configuration information is configured receives a paging message, when a system architecture evolution (SAE)-temporary mobile subscriber identity (S-TMSI), a 5G-S-TMSI, or an international mobile subscriber identity (IMSI) instead of inactive-radio network temporary identifier (I-RNTI) is received in the paging message and RRC inactive mode UE may need to perform a state transition, that is, when the RRC inactive mode terminal may need to transition from an RRC inactive mode to an RRC idle mode A. Method 1: A UE may keep performing frequency measurement based on previously configured fast frequency measurement configuration information even after transitioning to an RRC idle mode. Accordingly, when a connection to a network is performed later, the UE may rapidly report a frequency measurement result. In this case, the previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the LIE may release or discard frequency measurement information or a frequency measurement result (the frequency measurement result may be discarded by a second timer). In another method, the LIE may keep performing a frequency measurement result by restarting the first timer (e.g., T331) based on a duration value configured in an RRCRelease message when transitioning from the RRC inactive mode to the RRC idle mode.

B. Method 2: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the LIE context is discarded, the LIE may determine that an existing configuration is not valid. In another method, the LIE may discard only the frequency measurement information, and may use the frequency measurement result to make a report later.

2. When an RRC inactive mode UE in which fast frequency measurement configuration information is configured may perform an RRC connection resume procedure to configure a connection to a network, may transmit an RRCResumeRequest message as the message 3, may receive an RRCSetup message in response to the message 3, and may need to perform a state transition, that is, when the RRC inactive mode UE falls back to an RRC idle mode A. Method 1: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later. In this case, previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

B. Method 2: A UE may discard UE context but may not discard a frequency measurement result while transitioning to an RRC idle mode, and may make a report to a gNB so that the gNB uses the frequency measurement result. For example, when the UE transmits an RRCSetupComplete as the message 5, the UE may define an indicator of the RRCSetupComplete message indicating that there is a measurement result, and may indicate that there is a measurement result to the gNB by using the indicator. The UE may release frequency measurement configuration information. Also, when a separate frequency measurement result request message (e.g., UEInformationRequest) is received from the gNB, the UE may cause a frequency measurement result (e.g., UEInformationResponse) to be included in a separate response message, may transmit the separate response message to the gNB, and may discard the stored frequency measurement result.

3. When a T319 timer that is running by an RRC inactive mode UE in which fast frequency measurement configuration information is configured expires, that is, when a UE has to transition to an RRC idle mode due to the expiration of the T319 timer (the T319 timer starts when the message 3 (e.g., RRCResumeRequest) is transmitted and stops when the message 4 (e.g., RRCResume or RRCSetup or RRCRelease) is received).

A. Method 1: A UE may keep performing frequency measurement based on previously configured fast frequency measurement configuration information even after transitioning to an RRC idle mode. Accordingly, when a connection to a network is performed later, the UE may rapidly report a frequency measurement result. The previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

B. Method 2: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later.

4. When an RRC inactive mode UE in which fast frequency measurement configuration information is configured fails to find a suitable cell while performing a cell reselection in an RRC inactive state, camps on an acceptable cell to provide only a limited service, and transitions to an RRC idle mode A. Method 1: A UE may keep performing frequency measurement based on previously configured fast frequency measurement configuration information even after transitioning to an RRC idle mode. Accordingly, when a connection to a network is performed later, the UE may rapidly report a frequency measurement result. The previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

B. Method 2: A UE may discard UE context while transitioning to an RRC idle mode, and may stop a timer for frequency measurement when the timer is running, and may determine that previously configured frequency measurement information or a frequency measurement result is no longer valid, may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later.

5. When an RRC inactive mode UE in which fast frequency measurement configuration information is configured performs an RRC connection resume procedure to configure a connection to a network, transmits an RRCResumeRequest message as the message 3, and receives an RRCResume message in response to the message 3, but the RRC inactive mode UE may not follow a configuration of the RRCResume message or may not apply the configuration information (e.g., UE context recovery is not normally performed in a gNB or a UE), and thus the RRC inactive mode UE may need to perform a state transition, that is, when the RRC inactive mode UE may need to transition to an RRC idle mode.

A. Method 1: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later. Previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive method to the RRC idle mode.

B. Method 2: A UE may discard UE context but may not discard a frequency measurement result while transitioning to an RRC idle mode, and may make a report to a gNB so that the gNB uses the measurement result. For example, when the UE transmits an RRCSetupComplete as the message 5, the UE may define an indicator of the RRCSetupComplete message indicating that there is a measurement result, and may indicate that there is a measurement result to the gNB by using the indicator. The UE may release frequency measurement configuration information. Also, when a separate frequency measurement result request message (e.g., UEInformationRequest) is received from the gNB, the UE may cause a frequency measurement result (e.g., UEInformationResponse) to be included in a separate response message, may transmit the separate response message to the gNB, and may discard a stored frequency measurement result.

6. When an RRC inactive mode UE in which fast frequency measurement configuration information is configured reselects a cell using another radio access technology while performing a cell reselection procedure, camps on the cell (in the case of Inter-RAT reselection), and may need to transition to an RRC idle mode A. Method 1: A UE may keep performing frequency measurement based on previously configured fast frequency measurement configuration information even after transitioning to an RRC idle mode. Accordingly, when a connection to a network is performed later, the UE may rapidly report a frequency measurement result. The previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

B. Method 2: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later.

C. Method 3:

i. When another radio access technology used by a cell selected or camped on by a UE through a cell reselection procedure and on which the UE camps is an LTE system connected to a 5G core network (CN) or an LTE system or an NR system connected to an evolved packet core (EPC), 1. the UE may keep performing frequency measurement based on previously configured fast frequency measurement configuration information even after transitioning to an RRC idle mode. Accordingly, when a connection to a network is performed later, the UE may rapidly report a frequency measurement result. The previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

ii. Otherwise, when another radio access technology used by a cell selected or camped on by a UE through a cell reselection procedure is a system (e.g., a universal mobile telecommunication system (UMTS) or a second generation (2G) system) other than an LTE system connected to a 5G CN or an LTE system or an NR system connected to an EPC, or when another radio access technology used by a cell selected or camped on by a UE through a cell reselection procedure is a UMTS (3G) or a global system for mobile communication (GSM) edge radio access network (GERAN) (2G), 1. the UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. Because the UE context is discarded, the UE may determine that an existing configuration is not valid. In another method, the UE may discard only the frequency measurement information, and may use the frequency measurement result to make a report later.

7. When an RRC inactive mode UE in which fast frequency measurement configuration information is configured performs an RRC connection resume procedure to configure a connection to a network, transmits an RRCResumeRequest message as the message 3, receives an RRCReject message or an RRCRelease message in response to the message 3, and needs to perform a state transition, that is, when the RRC inactive mode UE falls back to an RRC idle mode.

A. Method 1: A UE may discard UE context while transitioning to an RRC idle mode, may stop a timer for frequency measurement when the timer is running, and may determine that previously configured frequency measurement information or a frequency measurement result is no longer valid and may discard the previously configured frequency measurement information or the frequency measurement result. In this case, because the UE context is discarded, the UE may determine that an existing configuration is not valid. In another method, the UE may discard only the frequency measurement information, and may use the frequency measurement result to make a report later. Previously configured fast frequency measurement configuration information may include a value of a first timer indicating a time for which the UE is to perform frequency measurement, and the UE may not stop the first timer (e.g., T331) when transitioning from an RRC inactive mode to the RRC idle mode. That is, by continuously driving the first timer, the UE may keep performing frequency measurement even when a state transition occurs while the first timer is running. When the first timer expires, the UE may release or discard frequency measurement information or a frequency measurement result (the frequency measurement result may be discarded by a second timer). In another method, the UE may keep performing a frequency measurement result by restarting the first timer (e.g., T331) based on a duration value configured in an RRCRelease message when transitioning from the RRC inactive mode to the RRC idle mode.

B. Method 2: A UE may discard UE context while transitioning to an RRC idle mode, may stop a timer for frequency measurement (e.g., a first timer) when the timer is running, and may determine that previously configured frequency measurement information or a frequency measurement result is no longer valid and may discard the previously configured frequency measurement information or the frequency measurement result. In this case, because the UE context is discarded, the UE may determine that an existing configuration is not valid. In another method, the UE may discard only the frequency measurement information, and may use the frequency measurement result to make a report later.

The following embodiment of the disclosure provides a method of performing a fast frequency measurement operation, when an LTE or NR RRC idle mode UE connects to another radio access technology.

8. When another radio access technology (inter-RAT reselection) used by a cell selected or camped on by an RRC idle mode UE through a cell reselection procedure is a system (e.g., a UMTS or a 2G system) other than an LTE system connected to a 5G CN or an LTE system or an NR system connected to an EPC, or when another radio access technology used by a cell selected or camped on by an RRC idle mode UE is a UMTS (3G) or a GERAN (2G), A. the RRC idle mode UE may stop a timer (e.g., a first timer) for frequency measurement when the timer is running, and may determine that previously configured frequency measurement information or a frequency measurement result is no longer valid and may discard the previously configured frequency measurement information or the frequency measurement result.

Figure 1L:
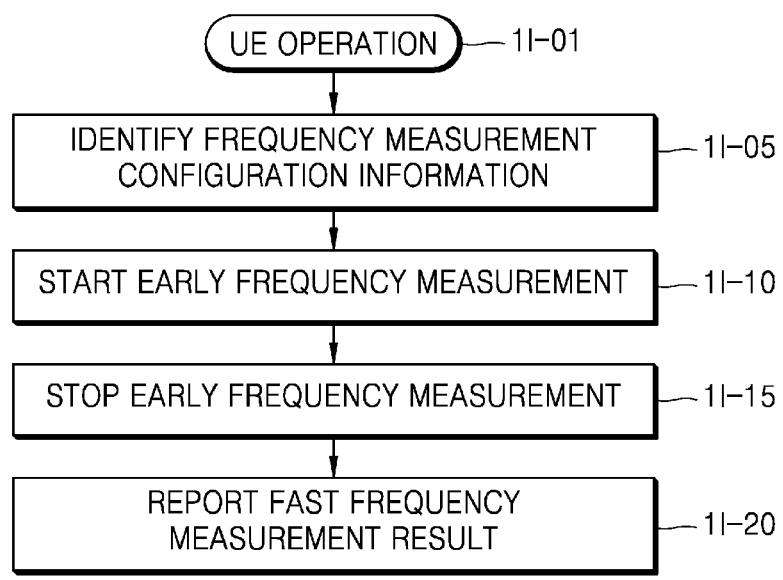
FIG. 1L is a diagram for describing an operation in which a terminal performs RRC idle mode or RRC inactive mode frequency measurement and reports a measurement result according to an embodiment of the disclosure.

FIG. 1L is a diagram for describing an operation in which a terminal performs RRC idle mode or RRC inactive mode frequency measurement and reports a measurement result according to an embodiment of the disclosure.

Referring to FIG. 1L, when a terminal receives an RRC message, the terminal may drive a timer for RRC idle mode or RRC inactive mode frequency measurement.

In operation 1*l*-05, the terminal may determine whether there is frequency measurement configuration information for RRC idle mode or RRC inactive mode frequency measurement in the RRC message.

In operation 1*l*-10, the terminal may perform RRC idle mode or RRC inactive mode frequency measurement based on the frequency measurement configuration information When there is no frequency measurement configuration information for RRC idle mode or RRC inactive mode frequency measurement in the RRC message, the terminal may receive frequency measurement information from system information and may perform RRC idle mode or RRC inactive mode frequency measurement. In the case of an RRC inactive mode terminal, the RRC message may be received in a RAN notification area update procedure, and frequency measurement may be continuously performed by newly configuring frequency measurement information whenever the RAN notification area update procedure is performed. When the terminal performs frequency measurement, the terminal may store a measurement result.

When there is an indicator indicating that RRC idle mode or RRC inactive mode frequency measurement may be supported in system information of a cell configuring a connection to a network, when a connection to a network is configured, the terminal may transmit the message 3. When a base station may cause an indicator to indicate a frequency measurement result to be included in the message 4 and may transmit the message 4, the terminal may stop a timer in operation 1*l*-15.

Also, in operation 1*l*-20, the terminal may cause an RRC idle mode or RRC inactive mode frequency measurement result to be included in the message 5 and may transmit the message 5. When the measurement result is successfully delivered to the base station, the terminal may discard the measurement result.

Figure 1M:
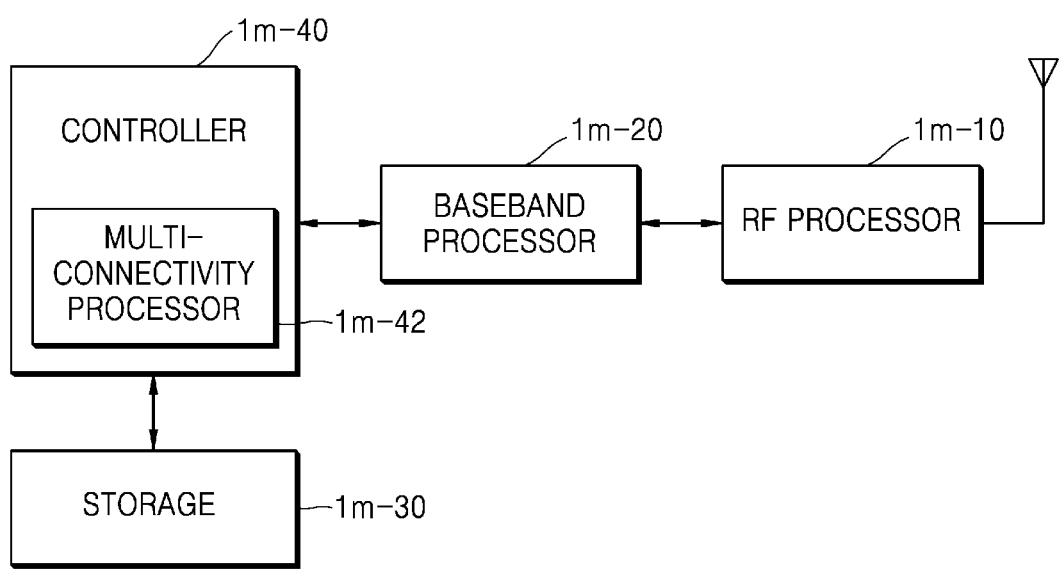
FIG. 1M is a block diagram illustrating a structure of a terminal according to an embodiment of the disclosure.

FIG. 1M is a block diagram illustrating a structure of a terminal according to an embodiment of the disclosure.

Referring to FIG. 1M, a terminal may include a radio frequency (RF) processor 1*m*-10, a baseband processor 1*m*-20, a storage 1*m*-30, and a controller 1*m*-40.

The RF processor 1*m*-10 may perform a function of transmitting/receiving a signal through a radio channel such as band conversion or amplification of a signal. That is, the RF processor 1*m*-10 may up-convert a baseband signal provided from the baseband processor 1*m*-20 into an RF band signal and then may transmit the RF band signal through an antenna, and may down-convert an RF band signal received through the antenna into a baseband signal. For example, the RF processor 1*m*-10 may include a transmission filter, a reception filter, an amplifier, a mixer, an oscillator, a digital-to-analog converter (DAC), and an analog-to-digital convertor (ADC). Although only one antenna is illustrated in FIG. 1M, the terminal may include a plurality of antennas. Also, the RF processor 1*m*-10 may include a plurality of RF chains. Furthermore, the RF processor 1*m*-10 may perform beamforming. For beamforming, the RF processor 1*m*-10 may adjust a phase and a size of each of signals transmitted/received through a plurality of antennas or antenna elements. Also, the RF processor 1*m*-10 may perform MIMO, and may receive a plurality of layers during a MIMO operation. The RF processor 1*m*-10 may perform received beam sweeping by appropriately configuring a plurality of antennas or antenna elements, or may adjust a direction and a beam width of a received beam so that the received beam is coordinated with a transmitted beam, under the control of the controller 1*m*-40.

The baseband processor 1*m*-20 may convert between a baseband signal and a bitstream according to physical layer specifications of a system. For example, during data transmission, the baseband processor 1*m*-20 may generate complex symbols by encoding and modulating a transmission bitstream. Also, during data reception, the baseband processor 1*m*-20 may reconstruct a reception bitstream by demodulating and decoding a baseband signal provided from the RF processor 1*m*-10. For example, according to an orthogonal frequency division multiplexing (OFDM) method, during data reception, the baseband processor 1*m*-20 may generate complex symbols by encoding and modulating a transmission bitstream, may map the complex symbols to subcarriers, and may configure OFDM symbols through inverse fast Fourier transformation (IFFT) and cyclic prefix (CP) insertion. Also, during data reception, the baseband processor 1*m*-20 may segment a baseband signal provided from the RF processor 1*m*-10 into OFDM symbols, may reconstruct signals mapped to subcarriers through fast Fourier transformation (FFT), and then may reconstruct a reception bitstream by demodulating and decoding the signals.

The baseband processor 1*m*-20 and the RF processor 1*m*-10 may transmit and receive a signal as described above. Accordingly, the baseband processor 1*m*-20 and the RF processor 1*m*-10 may be referred to as a transmitter, a receiver, a transceiver, or a communicator. Furthermore, at least one of the baseband processor 1*m*-20 or the RF processor 1*m*-10 may include a plurality of communication modules to support a plurality of different radio access technologies. Also, at least one of the baseband processor 1*m*-20 or the RF processor 1*m*-10 may include different communication modules to process signals of different frequency bands. For example, the different radio access technologies may include an LTE network and an NR network. Also, the different frequency bands may include a super-high frequency (SHF) (e.g., 2.5 GHz or 5 GHz) band, and a millimeter wave (mmWave) (e.g., 60 GHz) band.

The storage 1m-30 may store a basic program, an application program, and data such as configuration information for operating the terminal. The storage 1m-30 may provide stored data according to a request of the controller 1m-40.

The controller 1m-40 may control overall operations of the terminal. For example, the controller 1m-40 may transmit/receive a signal through the baseband processor 1m-20 and the RF processor 1m-10. Also, the controller 1m-40 may write and read data to and from the storage 1m-40. To this end, the controller 1m-40 may include at least one processor. For example, the controller 1m-40 may include a communication processor (CP) for controlling communication and an application processor (AP) for controlling an upper layer such as an application program.

Figure 1N:
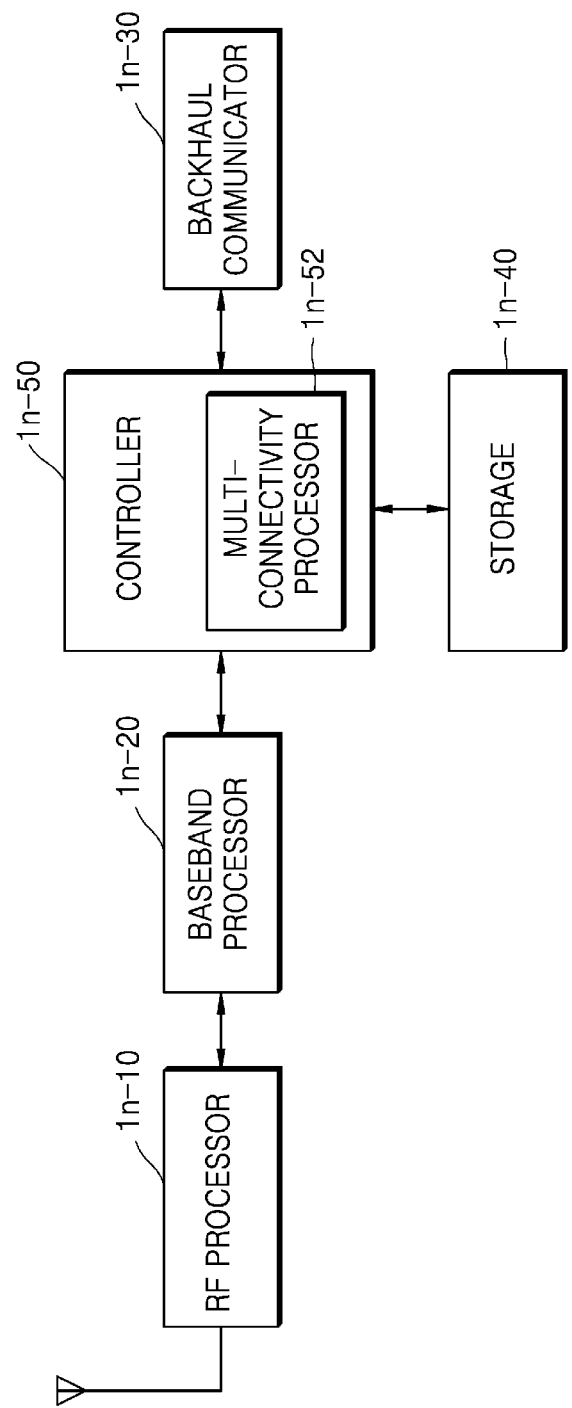
FIG. 1N is a block diagram illustrating a structure of a base station according to an embodiment of the disclosure.

FIG. 1N is a block diagram illustrating a structure of a base station, e.g., a transmission reception point (TRP), according to an embodiment of the disclosure.

As shown in FIG. 1N, a base station may include an RF processor 1n-10, a baseband processor 1n-20, a backhaul communicator 1n-30, a storage 1n-40, and a controller 1n-50.

The RF processor 1n-10 may perform a function of transmitting/receiving a signal through a radio channel such as band conversion or amplification of a signal. That is, the RF processor 1n-10 may up-convert a baseband signal provided from the baseband processor 1n-20 into an RF band signal and then may transmit the RF band signal through an antenna, and may down-convert an RF band signal received through the antenna into a baseband signal. For example, the RF processor 1n-10 may include a transmission filter, a reception filter, an amplifier, a mixer, an oscillator, a DAC, and an ADC. Although only one antenna is illustrated in FIG. 1N, a first connection node may include a plurality of antennas. Also, the RF processor 1n-10 may include a plurality of RF chains. Furthermore, the RF processor 1n-10 may perform beamforming. For beamforming, the RF processor 1n-10 may adjust a phase and a size of each of signals transmitted/received through a plurality of antennas or antenna elements. The RF processor 1n-10 may perform a downlink MIMO operation by transmitting one or more layers.

The baseband processor 1n-20 may convert between a baseband signal and a bitstream according to physical layer specifications of first radio access technology. For example, during data transmission, the baseband processor 1n-20 may generate complex symbols by encoding and modulating a transmission bitstream. Also, during data reception, the baseband processor 1n-20 may reconstruct a reception bitstream by demodulating and decoding a baseband signal provided from the RF processor 1n-10. For example, according to an OFDM method, during data transmission, the baseband processor 1n-20 may generate complex symbols by encoding and modulating a transmission bitstream, may map the complex symbols to subcarriers, and then may configure OFDM symbols through IFFT and CP insertion. Also, during data reception, the baseband processor 1n-20 may segment a baseband signal provided from the RF processor 1n-10 into OFDM symbols, may reconstruct signals mapped to subcarriers through FFT, and then may reconstruct a reception bitstream by demodulating and decoding the signals. The baseband processor 1n-20 and the RF processor 1n-10 may transmit and receive a signal as described above. Accordingly, the baseband processor 1n-20 and the RF processor 1n-10 may be referred to as a transmitter, a receiver, a transceiver, a communicator, or a wireless communicator.

The backhaul communicator 1n-30 may provide an interface for communicating with other nodes in a network.

The storage 1n-40 may store a basic program, an application program, and data such as configuration information for operating the base station. In particular, the storage 1n-40 may store information about a bearer allocated to a connected terminal, and a measurement result reported from the connected terminal. Also, the storage 1n-40 may store criterion information for determining whether to provide or stop multi-connectivity to the terminal. The storage 1n-40 may provide stored data according to a request of the controller 1n-50.

The controller 1n-50 may control overall operations of the base station. For example, the controller 1n-50 may transmit/receive a signal through the RF processor 1n-10 and the baseband processor 1n-20, or the backhaul communicator 1n-30. Also, the controller 1n-50 may write and read data to and from the storage 1n-40. To this end, the controller 1n-50 may include at least one processor.

In a wireless communication system, a high frequency band and a wide bandwidth are used for a downlink and thus a lot of transmission resources may be ensured. Also, because a large number of antennas may be physically installed and used for a base station, a beamforming gain and a high signal intensity may be achieved and thus more data may be transmitted to a terminal in a downlink by using the same frequency/time resources. However, because the terminal has a physically small size and a high frequency band and a wide bandwidth are not easily usable for an uplink, a bottleneck phenomenon may occur in uplink transmission resources compared to downlink transmission resources. Also, because a maximum transmit power level of the terminal is much less than a maximum transmit power level of the base station, reduction in coverage for uplink data transmission occurs. Accordingly, it is necessary to efficiently use transmission resources by compressing uplink data.

A method of compressing uplink data may be a method of performing data compression in series based on previous data. Accordingly, when one of a series of compressed data is missing or discarded, or undergoes a decompression failure, decompression may fail for all data after the data missing or discarded or undergoing a decompression failure.

A transmitting PDCP layer may drive a PDCP discard timer for each data whenever data is received from an upper layer, may perform an uplink compression procedure when the uplink compression procedure is configured, may configure an uplink data compression (UDC) header, may perform ciphering on data on which uplink data compression is performed, and may generate a PDCP packet data unit (PDU) by allocating a PDCP sequence number and configuring a PDCP header. When the PDCP discard timer expires, the transmitting PDCP layer may assume that data corresponding to the PDCP discard timer is no longer valid and may discard the data.

Accordingly, once the transmitting PDCP layer discards data (e.g., a PDCP PDU) that is previously generated due to the expiration of the PDCP discard timer, one of a series of compressed data is discarded, and thus successive data decompression failures may occur in a receiving PDCP layer due to the discarded or missing compressed data.

An embodiment of the disclosure may provide a procedure in which a transmitting PDCP layer (a terminal or a base station) in a wireless communication system compresses and transmits data in an uplink or a downlink, and a receiving PDCP layer (a base station or a terminal) receives and decompresses the data. Also, an embodiment of the disclosure may provide a method supporting a data transmitting/receiving procedure in which a transmitter end compresses and transmits data and a receiver end decompresses the data, such as a specific header format, a method of solving a decompression failure, and a method of solving a problem when a transmitting PDCP layer discards data due to a PDCP discard timer. Also, the method may be applied to a procedure in which a base station compresses downlink data and transmits the compressed downlink data to a terminal and the terminal receives and decompresses the compressed downlink data. According to an embodiment of the disclosure, because a transmitter end compresses and transmits data, more data may be transmitted and coverage may be improved.

Also, an embodiment of the disclosure may provide an efficient operation of a receiving PDCP layer according to an indicator of a user data compression header, when a data decompression error occurs in the receiving PDCP layer or received compressed data is processed.

The operation principle of the disclosure will be described in detail with reference to the attached drawings. While describing the disclosure, detailed descriptions about related well known functions or configurations that may blur the points of the disclosure are omitted. The terms used herein are those defined in consideration of functions in the disclosure, but the terms may vary according to the intention of users or operators, precedents, etc. Therefore, the terms used herein have to be defined based on the meaning of the terms together with the description throughout the specification.

Also, while describing the disclosure, detailed descriptions about related well known functions or configurations that may blur the points of the disclosure are omitted. Embodiments of the disclosure will now be described in detail with reference to the accompanying drawings.

Hereinafter, terms indicating a connection node, terms indicating network entities, terms indicating messages, terms indicating an interface between network entities, and terms indicating various pieces of identification information, as used in the following description, are exemplified for convenience of explanation. Accordingly, the disclosure is not limited to the terms to be described later, but other terms indicating objects having equal technical meanings may be used.

Hereinafter, for convenience of explanation, the disclosure uses terms and names defined in the 3rd generation partnership project long term evolution (3GPP LTE) standard. However, the disclosure is not limited to the above terms and names, and may also be applied to systems following other standards. In the disclosure, an eNB may be interchangeably used with a gNB for convenience of explanation. That is, a base station described as an eNB may refer to a gNB.

Figure 2A:
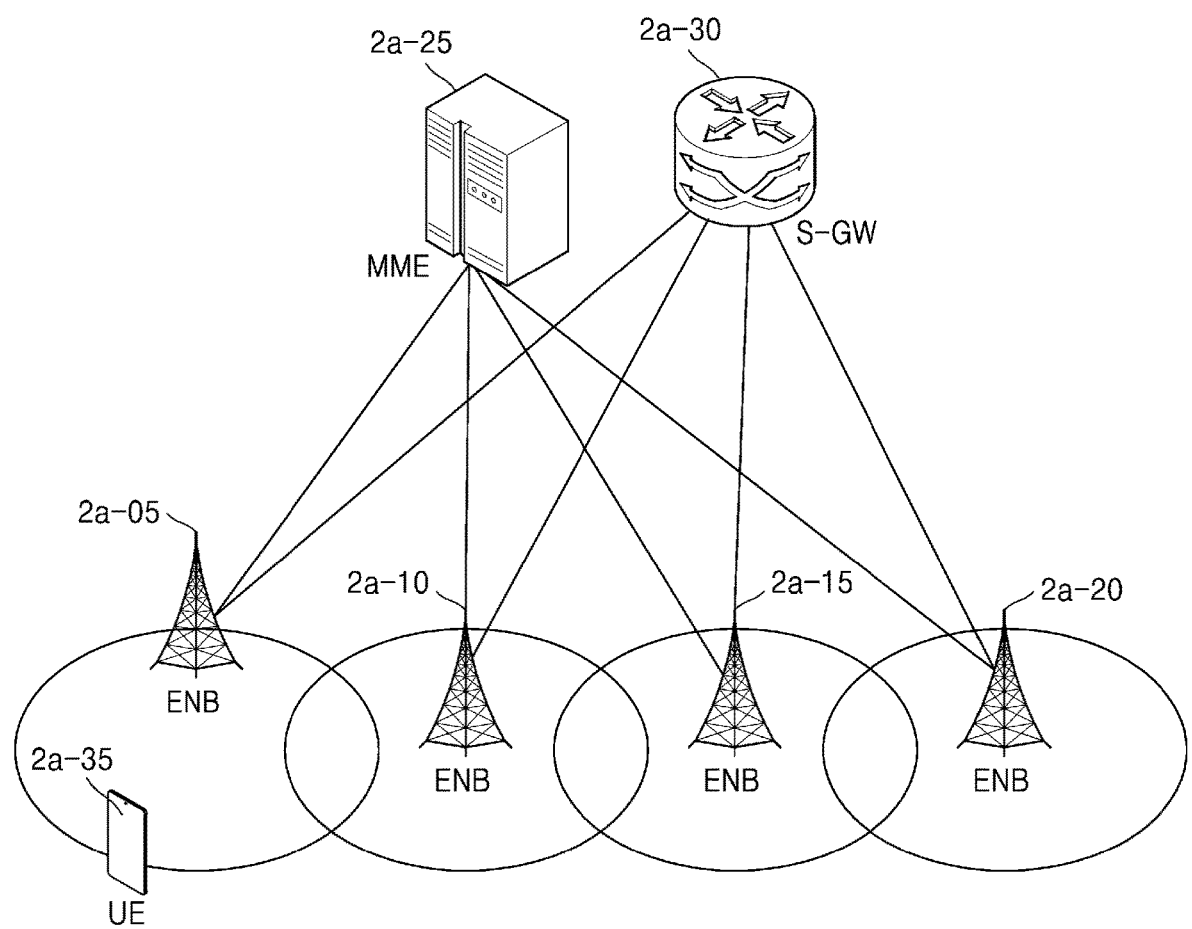
FIG. 2A is a diagram illustrating a structure of an LTE system according to an embodiment of the disclosure.

FIG. 2A is a diagram illustrating a structure of an LTE system according to an embodiment of the disclosure.

Referring to FIG. 2A, a radio access network of an LTE system may include evolved nodes B (ENBs) (nodes B or base stations) 2a-05, 2a-10, 2a-15, and 2a-20, a mobility management entity (MME) 2a-25, and a serving-gateway (S-GW) 2a-30. A user equipment (UE) 2a-35 may connect to an external network through the ENBs 2a-05, 2a-10, 2a-15, and 2a-20 and the S-GW 2a-30.

In FIG. 2A, the ENBs 2a-05, 2a-10, 2a-15, and 2a-20 may correspond to an existing node B of a UMTS. Each ENB may be connected through a radio channel to the UE 2a-35 and may perform a more complex function than the existing node B. Because all user traffic data including real-time services such as voice over IP (VoIP) through an Internet protocol are serviced through a shared channel in the LTE system, an entity for collecting and scheduling buffer state information of UEs, available transmission power state information, and channel state information may be required, and each of the ENBs 2a-05 through 2a-20 may serve as such an entity. One ENB may generally control a plurality of cells. For example, in order to achieve a data rate of 100 Mbps, the LTE system may use orthogonal frequency division multiplexing (OFDM) at a bandwidth of 20 MHz as radio access technology. Also, adaptive modulation and coding (AMC) for determining a modulation scheme and a channel coding rate in accordance with a channel state of the UE 2a-35 may be applied. The S-GW 2a-30 is an entity for providing a data bearer, and may generate or remove the data bearer under the control of the MME 2a-25. The MME 2a-25 that is an entity for performing various control functions as well as a mobility management function on the UE 2a-35 may be connected to a plurality of ENBs.

Figure 2B:
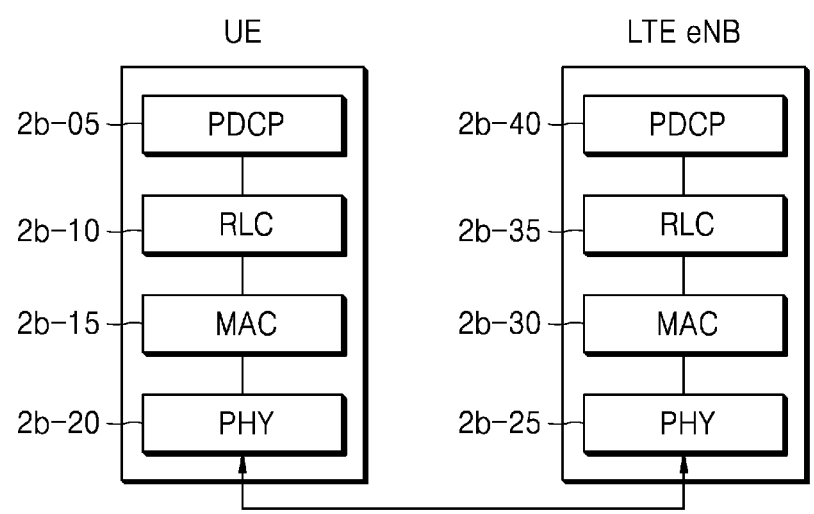
FIG. 2B is a diagram illustrating a radio protocol architecture in an LTE system according to an embodiment of the disclosure.

FIG. 2B is a diagram illustrating a radio protocol architecture in an LTE system according to an embodiment of the disclosure.

Referring to FIG. 2B, a radio protocol architecture of an LTE system includes packet data convergence protocol (PDCP) layers 2b-05 and 2b-40, radio link control (RLC) layers 2b-10 and 2b-35, and medium access control (MAC) layers 2b-15 and 2b-30 respectively for a UE and an ENB. The PDCP layers 2b-05 and 2b-40 may be in charge of, for example, IP header compression/decompression. Main functions of each PDCP layer may be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink Each of the RLC layers 2b-10 and 2b-35 may perform an ARQ operation by reconfiguring a PDCP packet data unit (PDU) to an appropriate size. Main functions of each RLC layer may be summarized as follows.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layers 2b-15 and 2b-30 are connected to various RLC layers configured in one UE, and may multiplex RLC PDUs into a MAC PDU and demultiplex the RLC PDUs from the MAC PDU. Main functions of each MAC layer may be summarized as follows.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through HARQ Priority handling between logical channels of one UE Priority handling between UEs by means of dynamic scheduling MBMS service identification Transport format selection Padding Each of physical (PHY) layers 2b-20 and 2b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 2C:
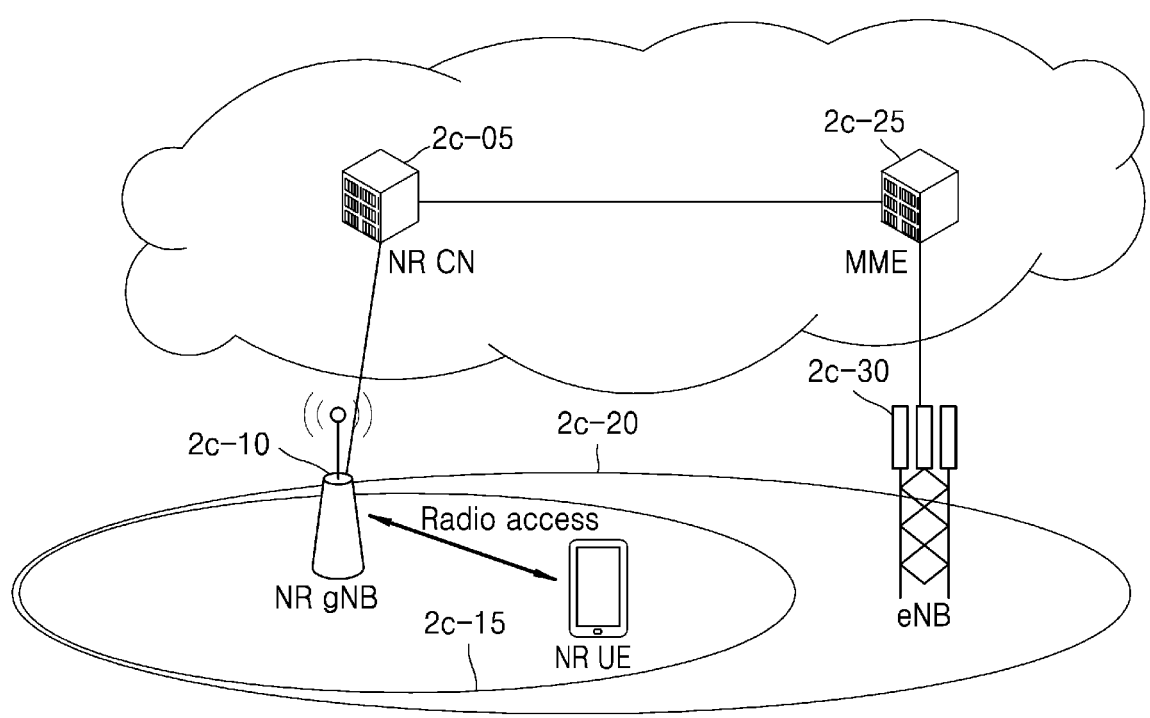
FIG. 2C is a diagram illustrating a structure of a next-generation mobile communication system according to an embodiment of the disclosure.

FIG. 2C is a diagram illustrating a structure of a next-generation mobile communication system according to an embodiment of the disclosure.

Referring to FIG. 2C, a radio access network of a next-generation mobile communication system (e.g., an NR or 5G system) may include a new radio node B (NR gNB or an NR base station) 2c-10 and a new radio core network (NR CN) 2c-05. A new radio user equipment (NR UE) 2c-15 may connect to an external network through the NR gNB 2c-10 and the NR CN 2c-05.

In FIG. 2C, the NR gNB 2c-10 corresponds to an evolved node B (eNB) of an existing LTE system. The NR gNB 2c-10 may be connected to the NR UE 2c-15 through a radio channel and may provide a better service than an existing node B. Because all user traffic data are serviced through a shared channel in a next-generation mobile communication system, an entity for collecting and scheduling buffer state information of UEs, available transmission power state information, and channel state information may be required, and the NR NB 2c-10 may serve as such an entity. One NR gNB 2c-10 may generally control a plurality of cells. The next-generation mobile communication system may currently have a bandwidth greater than a maximum bandwidth of existing LTE to achieve an ultrahigh data rate, may use orthogonal frequency division multiplexing (OFDM) as radio access technology, and may additionally use beam-forming technology. Also, adaptive modulation and coding (AMC) for determining a modulation scheme and a channel coding rate in accordance with a channel state of the NR UE 2c-15 may be applied. The NR CN 2c-05 may perform functions such as mobility support, bearer configuration, and QoS configuration. The NR CN 2c-05 that is an entity for performing various control functions as well as a mobility management function on the NR UE 2c-15 is connected to a plurality of base stations. Also, the next-generation mobile communication system may cooperate with the existing LTE system, and the NR CN 2c-05 may be connected through a network interface with an MME 2c-25. The MME 2c-25 may be connected to an eNB 2c-30 that is an existing base station.

Figure 2D:
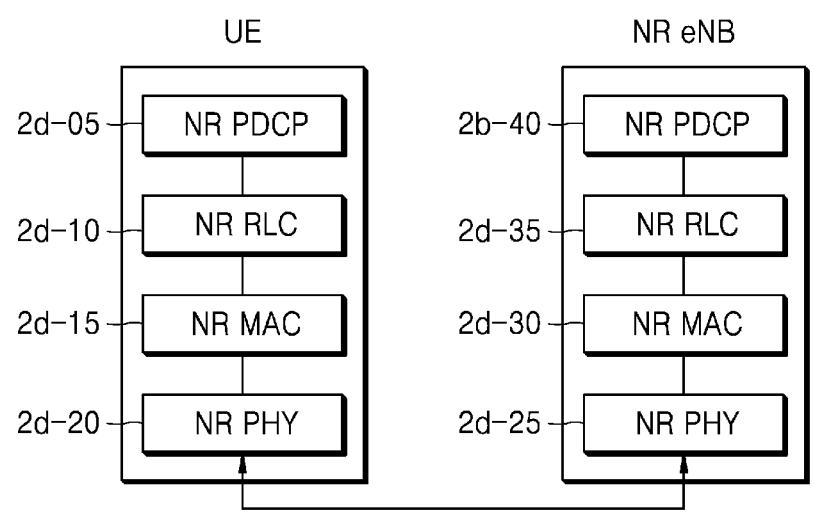
FIG. 2D is a diagram illustrating a radio protocol architecture of a next-generation mobile communication system according to an embodiment of the disclosure.

FIG. 2D is a diagram illustrating a radio protocol architecture of a next-generation mobile communication system according to an embodiment of the disclosure.

Referring to FIG. 2D, a radio protocol architecture of a next-generation mobile communication system may include NR PDCP layers 2d-05 and 2d-40, NR RLC layers 2d-10 and 2d-35, and NR MAC layers 2d-15 and 2d-30 in a UE and an NR gNB. Main functions of each of the NR PDCP layers 2d-05 and 2d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above description, a reordering function of the NR PDCP layer may refer to a function of reordering PDCP PDUs received from a lower layer based on PDCP sequence numbers (SNs), and may include a function of delivering the reordered data to an upper layer in order or out of order, a function of recording missing PDCP PDUs by reordering the received PDCP PDUs, a function of reporting state information of the missing PDCP PDUs to a transmitter, and a function of requesting to retransmit the missing PDCP PDUs.

Main functions of the NR RLC layers 2d-10 and 2d-35 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, an in-sequence delivery function of the NR RLC layer may refer to a function of sequentially delivering RLC SDUs received from a lower layer to an upper layer in order, and may include at least one of a function of reassembling a plurality of RLC SDUs segmented from one RLC SDU and delivering the reassembled RLC SDU when the segmented RLC SDUs are received, a function of reordering received RLC PDUs on a RLC SN or PDCP SN basis, a function of recording missing RLC PDUs by reordering the received RLC PDUs, a function of reporting state information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order although a missing RLC SDU exists when a certain timer expires. Also, the NR RLC layer may process RLC PDUs in order of reception (in order of arrival regardless of SNs) and deliver the RLC PDUs to a PDCP layer out of order (out of sequence delivery), or reassemble segmented RLC PDUs received or stored in a buffer into a whole RLC PDU and process and deliver the RLC PDU to the PDCP layer. The NR RLC layer may not have a concatenation function, and the concatenation function may be performed by an NR MAC layer or may be replaced with a multiplexing function of the NR MAC layer.

An out-of-sequence delivery function of the NR RLC layer refers to a function of directly delivering RLC SDUs received from a lower layer to an upper layer out of order, and may include a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

Each of the NR MAC layers 2d-15 and 2d-30 may be connected to a plurality of NR RLC layers configured for one UE, and main functions of each NR MAC layer may include some of the following functions.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding Each of NR PHY layers 2d-20 and 2d-25 may channel-code and modulate upper layer data into OFDM symbols and transmit the OFDM symbols through a radio channel, or may demodulate OFDM symbols received through a radio channel and channel-decode and deliver the OFDM symbols to an upper layer.

An embodiment of the disclosure may provide a procedure in which a terminal in a wireless communication system compresses and transmits data in an uplink and a base station decompresses the data. Also, an embodiment of the disclosure may provide a method of supporting a data transmitting/receiving procedure in which a transmitter end compresses and transmits data and a receiver end decompresses the data such as a specific header format or a method of solving a decompression failure. Also, the method according to an embodiment of the disclosure be applied to a procedure in which a base station compresses downlink and transmits the compressed downlink data to a terminal, and terminal receives and decompresses the compressed downlink data. According to an embodiment of the disclosure, because a transmitter end compresses and transmits data, more data may be transmitted and coverage may be improved.

Figure 2E:
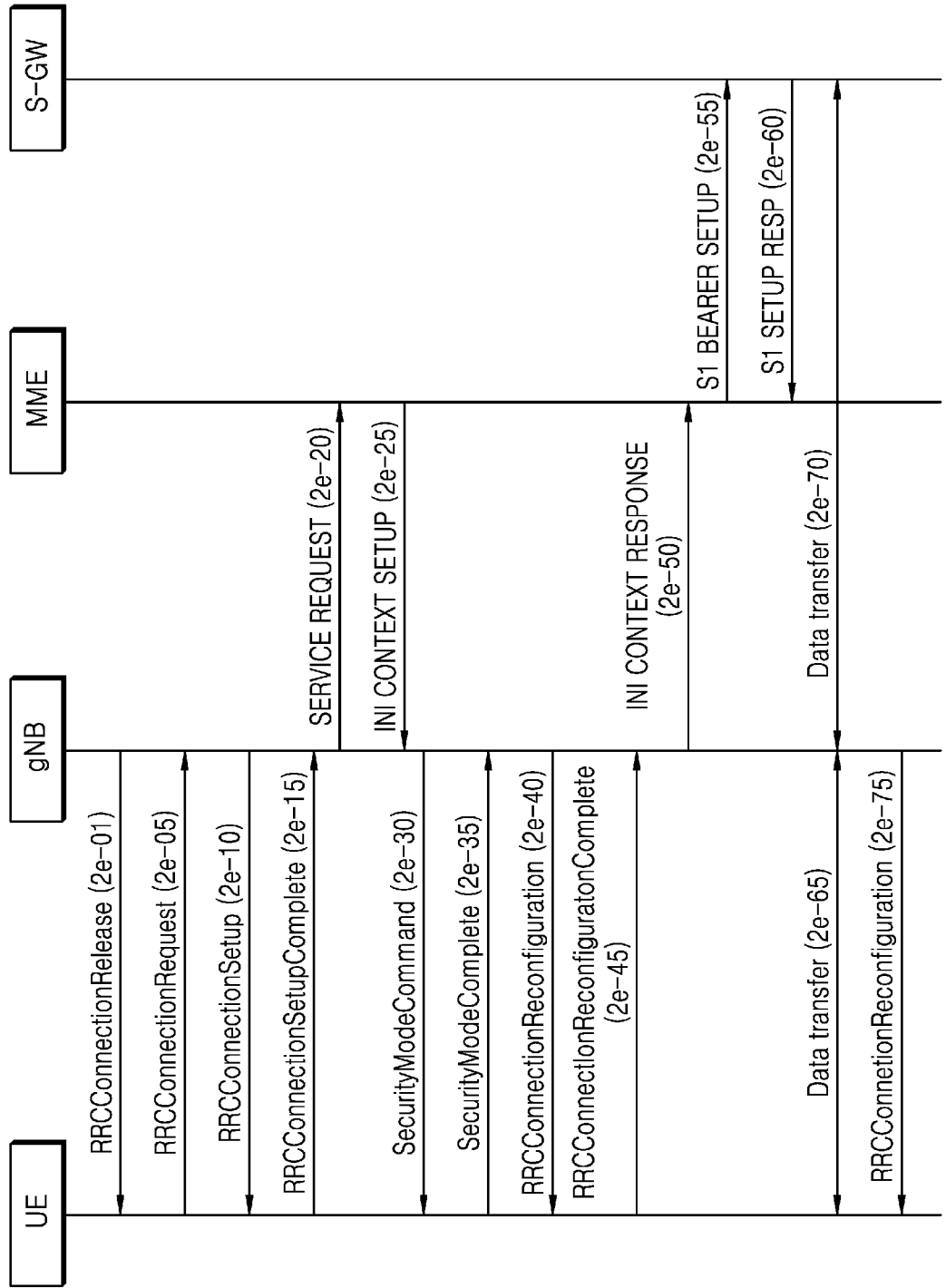
FIG. 2E is a diagram for describing a procedure in which when a UE configures a connection to a network, a gNB configures whether to perform uplink data compression according to an embodiment of the disclosure.

FIG. 2E is a diagram for describing a procedure in which when a UE configures a connection to a network, a gNB configures whether to perform uplink data compression according to an embodiment of the disclosure.

Referring to FIG. 2E, in the present embodiment of the disclosure, a procedure in which a UE switches from an RRC idle mode or an RRC inactive (lightly-connected) mode to an RRC connected mode and configures a connection to a network will be described. Also, a procedure of configuring whether to perform uplink data compression (UDC) will be described.

In operation 2e-01, when a UE that transmits/receives data in an RRC connected mode does not transmit/receive data for a certain period of time or for a certain reason, a gNB may transmit an RRCConnectionRelease message to the UE so that the UE switches to an RRC idle mode. When the UE that is not currently connected to a network (hereinafter referred to as an idle mode UE) has data to be transmitted, the UE may perform an RRC connection establishment procedure with the gNB.

In operation 2e-05, the UE may establish backward transmission synchronization with the gNB through a random access process and may transmit an RRCConnectionRequest message to the gNB. The RRCConnectionRequest message may include an identifier of the UE, an establishment cause, etc.

In operation 2e-10, the gNB may transmit an RRCConnectionSetup message so that the UE configures an RRC connection. The RRCConnectionSetup message may include information indicating whether to use an uplink data compression (UDC) method or a downlink data compression method for each logical channel (logicalchannelconfig), each bearer, or each PDCP entity (PDCP-config). Also, in more detail, the RRCConnectionSetup message may indicate whether to use an uplink data compression (UDC) method only for which IP flow or which QoS flow in each logical channel, each bearer, or each PDCP entity (or service data adaptation protocol (SDAP) entity) (e.g., information about IP flow or QoS flow to use or not to use an uplink data compression method may be configured in the SDAP entity so that the SDAP entity may indicate the PDCP entity whether to use or not to use the uplink data compression method for each QoS flow. Alternatively, the PDCP entity itself may check each QoS flow and may determine whether to apply the uplink data compression method). Also, when the gNB may indicate to use an uplink data compression method, the gNB may indicate an identifier of a pre-defined library or dictionary to be used in the uplink data compression method or a buffer size to be used in the uplink data compression method.

Also, the RRCConnectionSetup message may include an uplink decompression setup or release command. Also, when the gNB configures an uplink data compression method to be used, the gNB may always configure the uplink data compression method with an RLC AM bearer (a lossless mode because of an ARQ function and a retransmission function), and may not configure with a header compression protocol (e.g., an ROHC protocol). Also, the RRCConnectionSetup message may include RRC connection configuration information. An RRC connection may be referred to as a signaling radio bearer (SRB), and may be used to transmit/receive an RRC message that is a control message between the UE and the gNB.

In operation 2e-15, the UE that configures an RRC connection may transmit an RRCConnetionSetupComplete message to the gNB. When the gNB does not know or desires to check UE capability of the UE that configures a current connection, the gNB may transmit a UE capability inquiry message. The UE may transmit a UE capability report message. The UE capability report message may include an indicator indicating whether the UE is capable of using an uplink data compression (UDC) method or a downlink data compression method. The RRCConnetionSetupComplete message may include a SERVICE REQUEST message that is a control message for requesting an MME to configure a bearer for a certain service.

In operation 2e-20, the gNB may transmit the SERVICE REQUEST message included in the RRCConnetionSetupComplete message to the MME, and the MME may determine whether to provide the service requested by the UE.

When the MME determines to provide the service requested by the UE, in operation 2e-25, the MME may transmit an INITIAL CONTEXT SETUP REQUEST message to the gNB. The INITIAL CONTEXT SETUP REQUEST message may include QoS information to be applied to configure a data radio bearer (DRB) or security information (e.g., a security key or a security algorithm) to be applied to the DRB.

In operations 2e-01 and 2e-35, the gNB may exchange a SecurityModeCommand message and a SecurityModeComplete message in order to configure a security mode with the UE.

In operation 2e-40, when the security mode is completely configured, the gNB may transmit an RRCConnectionReconfiguration message to the UE. The RRCConnectionReconfiguration message may include information indicating whether to use an uplink data compression (UDC) method or a downlink data compression method for each logical channel (logicalchannelconfig), each bearer, or each PDCP entity (PDCP-config). Also, in more detail, the RRCConnection-Reconfiguration message may indicate whether to use an uplink data compression (UDC) method only for which IP flow or which QoS flow in each logical channel, each bearer, or each PDCP entity (or SDAP entity) (e.g., information about IP flow or QoS flow to use or not to use an uplink data compression method may be configured in the SDAP entity so that the SDAP entity may indicate the PDCP entity whether to use or not to use the uplink data compression method for each QoS flow. Alternatively, the PDCP entity itself may check each QoS flow and may determine whether to apply the uplink data compression method). Also, when the gNB may indicate to use an uplink data compression method, the gNB may indicate an identifier of a pre-defined library or dictionary to be used in the uplink data compression method or a buffer size to be used in the uplink data compression method. Also, the RRCConnectionReconfiguration message may include an uplink decompression setup or release command. Also, when the gNB configures an uplink data compression method to be used, the gNB may always configure the uplink data compression method with an RLC AM bearer (a lossless mode because of an ARQ function and a retransmission function), and may not configure with a header compression protocol (e.g., an ROHC protocol).

Also, the RRCConnectionReconfiguration message may include DRB configuration information for processing user data, and in operation 2e-45, the UE may configure a DRB by applying the DRB configuration information and may transmit an RRCConnectionReconfigurationComplete message to the gNB.

In operation 2e-50, the gNB having completely configured the DRB with the UE may transmit an INITIAL CONTEXT SETUP COMPLETE message to the MME.

In operations 2e-55 and 2e-60, the MME receiving the INITIAL CONTEXT SETUP COMPLETE message may exchange an Si BEARER SETUP message and an Si BEARER SETUP RESPONSE message with an S-GW to configure an Sl bearer. The Si bearer is a data transmission connection configured between the S-GW and the gNB and may correspond to the DRB in a one-to-one manner.

When the above process is completed, in operations 2e-65 and 2e-70, the UE may transmit/receive data through the S-GW to/from the gNB. A general data transmission process may include three steps of RRC connection configuration, security configuration, and DRB configuration.

Also, in operation 2e-75, the gNB may transmit an RRCConnectionReconfiguration message to the UE to renew, add, or change a configuration for a certain reason. The RRCConnectionReconfiguration message may include information indicating whether to use an uplink data compression (UDC) method or a downlink data compression method for each logical channel (logicalchannelconfig), each bearer, or each PDCP entity (PDCP-config). Also, in more detail, the RRCConnectionReconfiguration message may indicate whether to use an uplink data compression (UDC) method only for which IP flow or which QoS flow in each logical channel, each bearer, or each PDCP entity (or SDAP entity) (e.g., information about IP flow or QoS flow to use or not to use an uplink data compression method may be configured in the SDAP entity so that the SDAP entity may indicate the PDCP entity whether to use or not to use the uplink data compression method for each QoS flow. Alternatively, the PDCP entity itself may check each QoS flow and may determine whether to apply the uplink data compression method). Also, when the gNB may indicate to use an uplink data compression method, the gNB may indicate an identifier of a pre-defined library or dictionary to be used in the uplink data compression method or a buffer size to be used in the uplink data compression method. Also, the RRCConnectionReconfiguration message may include an uplink decompression setup or release command. Also, when the gNB configures an uplink data compression method to be used, the gNB may always configure the uplink data compression method with an RLC AM bearer (a lossless mode because of an ARQ function and a retransmission function), and may not configure with a header compression protocol (e.g., an ROHC protocol).

Figure 2F:
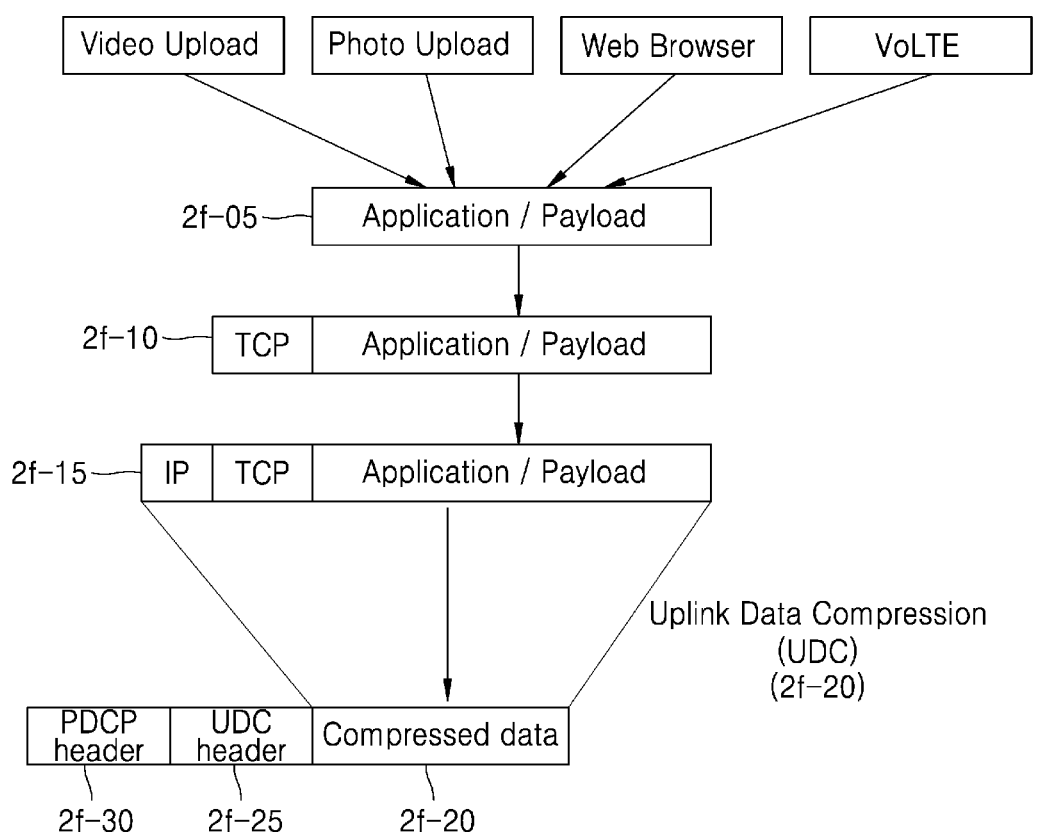
FIG. 2F is a diagram for describing a data structure and a procedure of performing uplink data compression according to an embodiment of the disclosure.

FIG. 2F is a diagram illustrating a data structure and a procedure of performing uplink or downlink data compression according to an embodiment of the disclosure.

Uplink data 2f-05 may be generated as data corresponding to services such as video upload, photo upload, web browser, and voice over LTE (VoLTE). Data generated in an application layer may be processed through a network data transmission layer such as a transmission control protocol and Internet protocol (TCP/IP) or a user datagram protocol (UDP), may configure headers 2f-10 and 2f-15, and may be delivered to a PDCP layer. When the PDCP layer receives data (PDCP SDU) from an upper layer, the PDCP layer may perform the following procedure.

When an uplink data compression method is configured to be used by the PDCP layer in an RRC message as in operation 2e-10, 2e-40, or 2e-75 of FIG. 2E, the PDCP layer may perform an uplink data compression method for the PDCP SDU denoted by 2f-20 and may compress uplink data. Also, the PDCP layer may configure a UDC header (a header for the compressed uplink data) 2f-25, may perform ciphering on compressed data except the UDC header, may perform integrity protection when configured, may configure a PDCP header 2f-30, and may configure a PDCP PDU. The PDCP layer according to an embodiment of the disclosure may include a UDC compression/decompression entity, may determine whether to perform a UDC procedure on each data as configured in the RRC message, and may use the UDC compression/decompression entity. In a transmitter end, a transmitting PDCP layer may perform data compression by using a UDC compression entity, and in a receiver end, a receiving PDCP layer may perform data decompression by using a UDC decompression entity.

The procedure of FIG. 2F may be applied when a terminal compresses downlink data as well as uplink data. Also, the description of uplink data may be applied to downlink data.

Figure 2G:
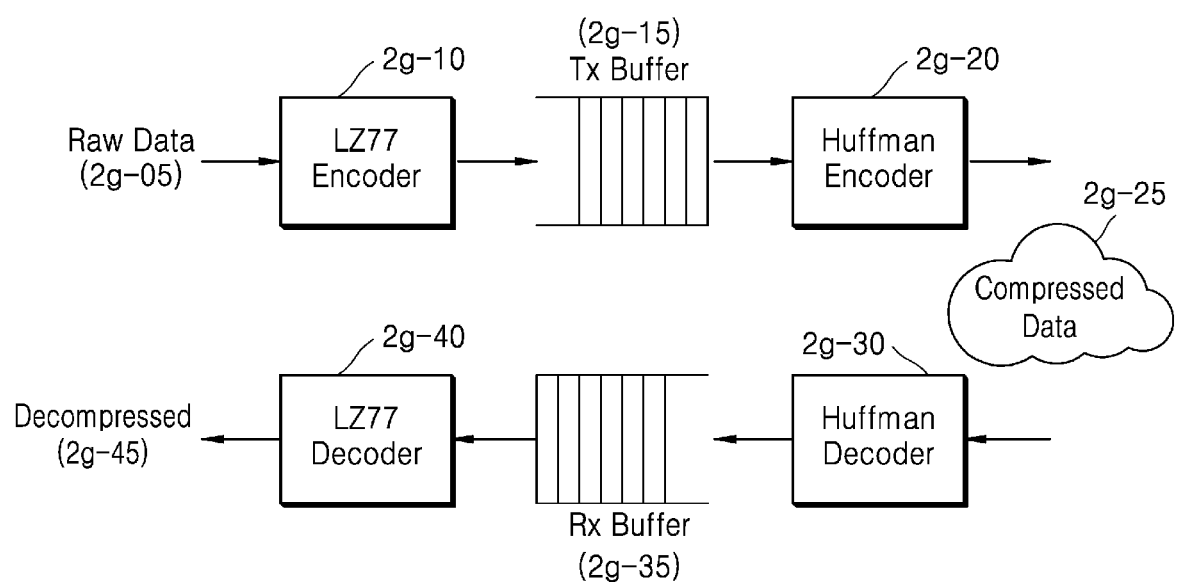
FIG. 2G is a diagram for describing an uplink data compression method according to an embodiment of the disclosure.

FIG. 2G is a diagram for describing an uplink data compression method according to an embodiment of the disclosure.

In more detail, FIG. 2G is a diagram for describing a DEFLATE-based uplink data compression algorithm. The DEFLATE-based uplink data compression algorithm is a lossless compression algorithm. The DEFLATE-based uplink data compression algorithm may basically compress uplink data by combining Huffman coding with an LZ77 algorithm. The LZ77 algorithm may involve performing an operation of searching for repeated occurrences of data within a sliding window, and when the repeated occurrences are found within the sliding window, performing data compression by expressing the repeated data within the sliding window as a location and a length. The sliding window is called a buffer in an uplink data compression (UDC) method, and may be set to 8 kilobytes or 32 kilobytes. That is, the sliding window or the buffer may record 8192 or 32768 characters, may find repeated occurrences of data, and may perform data compression by expressing the repeated data as a location and a length. Accordingly, because the LZ77 algorithm is a sliding window method, that is, because previously coded data is updated in a buffer and then immediately coding is performed on next data, successive pieces of data may have a correlation therebetween. Accordingly, only when previously coded data is normally decoded, next data may be normally decoded. Codes expressed as a location and a length and compressed by using the LZ77 algorithm may be further compressed through Huffman coding. The Huffman coding may involve searching for repeated characters and performing compression once again by assigning a short code to a more frequent character and a long code for a less frequent character. The Huffman coding is prefix coding, and is an optimal coding method by which all codes are uniquely decodable.

Referring to FIG. 2G, a transmitter end may encode raw data 2g-05 by using an LZ77 algorithm (2g-10) may update a buffer (2g-15), and may configure a UDC header by generating checksum bits for content (or data) of the buffer. The checksum bits may be used by a receiver end to determine whether a buffer state is valid.

Codes encoded by using the LZ77 algorithm may be compressed by using Huffman coding once again and may be transmitted as uplink data (2g-25). The receiver end may perform a decompression procedure on the compressed data received from the transmitter end in an inverse manner to that of the transmitter end. That is, the receiver end may perform Huffman decoding (2g-30), may update a buffer (2g-35), and may determine whether the updated buffer is valid by using the checksum bits of the UDC header. When it is determined that the checksum bits have no error, the receiver end may decompress the data by performing decoding by using the LZ77 algorithm (2g-40), may reconstruct the raw data, and may deliver the decompressed data to an upper layer (2g-45).

Because the LZ77 algorithm is a sliding window method, that is, because previously coded data is updated in a buffer and then immediately coding is performed on next data as described above, successive pieces of data may have a correlation therebetween. Accordingly, only when previously coded data is normally decoded, next data may be normally decoded. Accordingly, a receiving PDCP layer may check PDCP sequence numbers of a PDCP header, may check a UDC header (e.g., check an indicator indicating whether data compression is or is not performed), and may perform a data decompression procedure on compressed data in an ascending order of the PDCP sequence numbers.

A procedure in which a gNB configures uplink data compression (UDC) for a UE and a procedure in which the UE performs uplink data compression according to an embodiment of the disclosure may be as follows.

Referring to FIG. 2E, a gNB may configure or release uplink data compression for a logical channel or a bearer which configures an RLC AM mode in a UE through an RRC message as in operation 2e-10, 2e-40, or 2e-75. Also, the gNB may reset a UDC entity (or a protocol) of a PDCP layer of the UE by using the RRC message. When the gNB may reset the UDC entity (or the protocol), it may mean that the gNB may reset a UDC buffer for uplink data compression of the UE, in order to achieve synchronization between the UDC buffer of the UE and a UDC buffer for uplink data decompression of the gNB. In an operation of resetting a buffer of the UDC entity, a new PDCP control PDU may be defined, and a transmitter end (gNB) may reset a UDC buffer of a receiver end (UE) through a PDCP control PDU instead of the RRC message to achieve synchronization for user data compression and decompression between the transmitter end and the receiver end. Also, whether to perform uplink data compression may be determined for each bearer, each logical channel, or each PDCP layer by using the RRC message. In more detail, whether to perform or not to perform uplink data decompression may be configured for each IP flow (or QoS flow) in one bearer, logical channel, or PDCP layer by using the above message.

Also, by using the RRC message, the gNB may configure a PDCP discard timer value in the UE. The PDCP discard timer value for data on which uplink data compassion is not performed and the PDCP discard timer value for data to which uplink data compression is applied may be separately configured.

When the UE is configured to perform uplink data compression for a certain bearer, logical channel, or PDCP layer (or for QoS flows of the certain bearer, logical channel, or PDCP layer) by using the RRC message, the UE may reset a buffer in a UDC entity of the PDCP layer in accordance of the configuration and may prepare an uplink data compression procedure. When data (PDCP SDU) is received from an upper layer, when the UE is configured to perform uplink data compression for the PDCP layer, the UE may perform uplink data compression on the received data. When the UE is configured to perform uplink data compression for specific QoS flows of the PDCP layer, the UE may determine whether to perform uplink data compression by checking an indication of an upper SDAP layer or a QoS flow identifier, and may perform uplink data compression. When uplink data compression (UDC) is performed and the buffer is updated in accordance with the uplink data compression, the UE may configure a UDC buffer. When the uplink data compression (UDC) is performed, a PDCP SDU received from an upper layer may be compressed into UDC data (a UDC block) having a smaller size. The UE may configure a UDC header for the compressed UDC data. The UDC header may include an indicator indicating whether uplink data compression is performed or is not performed (e.g., it is indicated that UDC is applied when a 1-bit indicator of the UDC header is 0 and UDC is not applied when a 1-bit indicator is 1).

A case where uplink data compression is not applied may include a case where a PDCP SDU data structure received from an upper layer is not a repeated data structure and thus data compression may not be performed by using a UDC method (e.g., a DEFLATE algorithm).

When the UE performs uplink data compression (UDC) on data (PDCP SDU) received from an upper layer, and a UDC buffer is updated, a PDCP layer of a receiver end may calculate checksum bits to check validity of the updated UDC buffer and may cause the calculated checksum bits to be included in the UDC buffer (the checksum bits may have a certain length, e.g., 4 bits).

A transmitting PDCP layer may reset a transmitting UDC buffer, and may define and configure 1 bit in a UDC header 2i-02 of first data to which UDC compression is newly applied after the transmitting UDC buffer is reset, to indicate a receiving PDCP layer to reset a receiving UDC buffer and newly perform UDC decompression with the reset receiving UDC buffer from data in which the UDC header 2i-02 is configured. For example, a PDCP layer may define an FR field such as 2i-05 of FIG. 2I. Also, a transmitting PDCP layer in which a UDC compression procedure is configured may indicate whether a UDC compression procedure is applied or is not applied to data received from an upper layer by defining a 1-bit indicator, e.g., an FU field 2i-10, of the UDC header 2i-02.

A UE may perform ciphering on data to which uplink data decompression is applied or not applied, may perform integrity protection when configured, and may transfer the data to a lower layer.

Figure 2H:
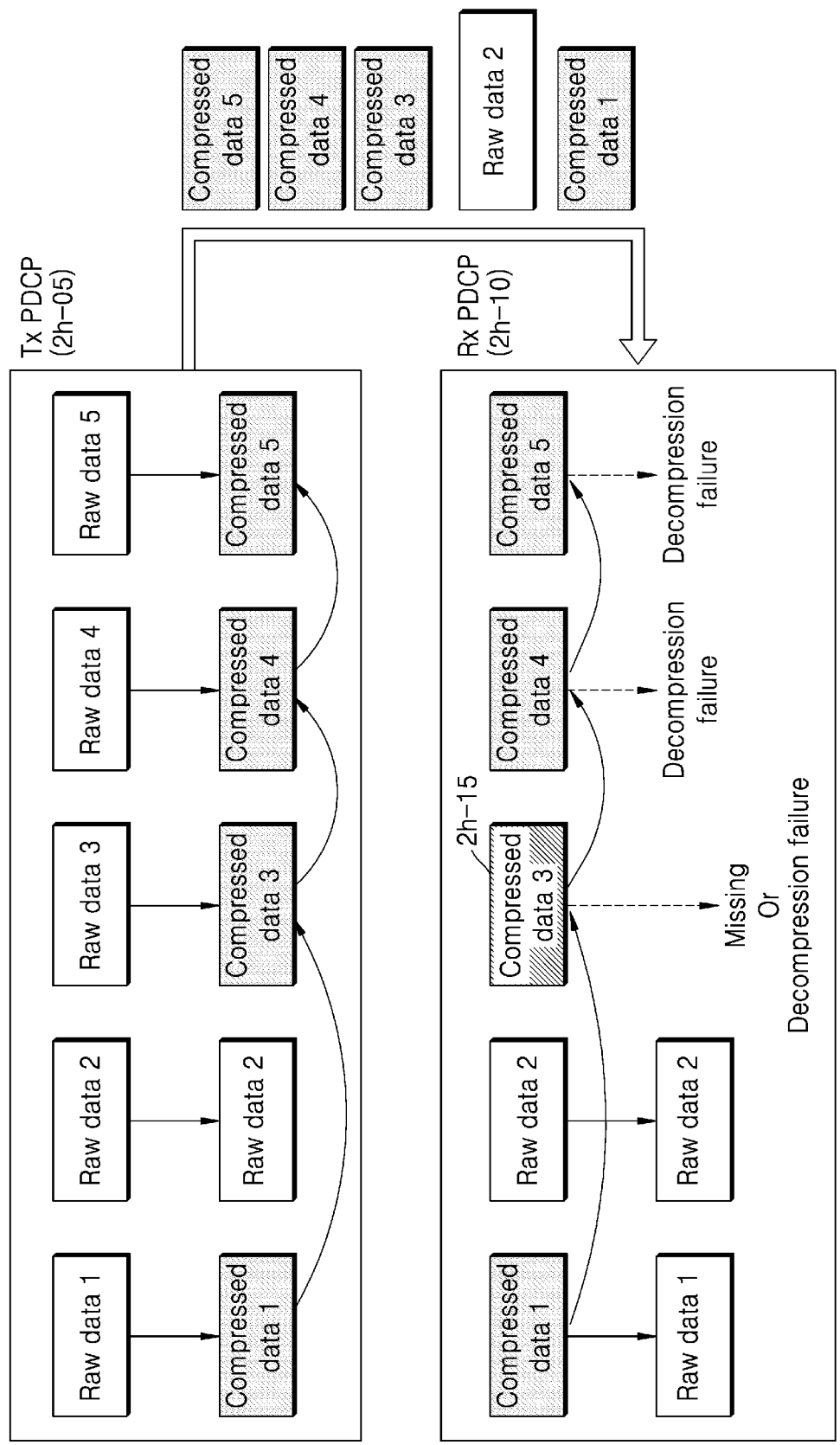
FIG. 2H is a diagram for describing a decompression failure occurring in an uplink data compression method according to an embodiment of the disclosure.

FIG. 2H is a diagram for describing a decompression failure occurring in an uplink or downlink data compression method according to an embodiment of the disclosure.

As described with reference to FIG. 2G, an uplink data compression (UDC) algorithm (e.g., a DEFLATE algorithm (for performing an LZ77 algorithm and then performing Huffman coding)) may be a method of updating previously compressed data in a buffer when a transmitter end performs data compression, comparing the data with data to be subsequently compressed based on the buffer, searching for a repeated structure, and compressing the repeated structure into a location and a length.

Accordingly, even when a receiver end performs decompression, the receiver end may have to perform the decompression in the same order of compression as performed by the transmitter end so as to succeed in the decompression. For example, when the transmitter end has performed UDC compression on data of PDCP sequence numbers 1, 3, 4, and 5 and has not performed UDC compression on data of PDCP sequence number 2 (2h-05), the receiver end may have to perform decompression on received data in an order of PDCP sequence numbers 1, 3, 4, and 5 in a PDCP layer so as to succeed in the decompression.

When the transmitter end performs UDC compression, because a UDC header indicates the UDC compression, the receiver end may determine whether the UDC compression has been applied by checking the UDC header. When the data of PDCP sequence number 3 (2h-15) is missing in a process of performing a series of UDC decompression operations, all subsequent UDC decompression operations fail. That is, UDC decompression may not be performed on the data of PDCP sequence numbers 4 and 5 (2h-10). Accordingly, missing data (packet) should not be generated in an uplink decompression procedure, and the receiver end may have to perform decompression in the same order of UDC compression as performed by the transmitter end. Accordingly, an RLC AM mode having no loss and a retransmission function may have to be used.

However, missing data may also be generated due to a PDCP discard timer of a PDCP layer. That is, the PDCP layer may drive a timer by using a PDCP discard timer value configured in an RRC message for each data (packet or PDCP SDU) received from an upper layer. When the timer expires, data corresponding to the timer is discarded. Accordingly, when a timer for data on which UDC compression is performed expires, the data may be discarded, and thus UDC decompression performed by the receiver end on subsequent pieces of UDC compressed data may fail.

As described with reference to FIG. 2G, according to an uplink data compression (UDC) algorithm (e.g., a DEFLATE algorithm (for performing an LZ77 algorithm and then performing Huffman coding)), the transmitter end may perform uplink data compression, and then may generate checksum bits by using current contents of a buffer and may configure a UDC header. The transmitter end may update the buffer by using raw data of the compressed data, may compare the data with data to be subsequently compressed based on the buffer, may search for a repeated structure, and may compress the repeated structure into a location and a length. Checksum bits in the UDC header are used to determine validity of a current buffer state before a UDC entity (or function) of a PDCP layer of the receiver end performs data decompression. That is, the receiver end checks validity of a current UDC buffer of the receiver end by using the checksum bits of the UDC header before the receiver end performs data decompression, and when there is no checksum error, the receiver end may perform data decompression, and when a checksum failure occurs, the receiver end may not perform data decompression and may report the checksum failure to the transmitter end to recover data.

In an embodiment of the disclosure, even when the receiver end performs decompression, the receiver end may have to perform decompression in the same order of compression as performed by the transmitter end so as to succeed in the decompression. For example, when the transmitter end has performed UDC compression on data of PDCP sequence numbers 1, 3, 4, and 5 and has not performed UDC compression on data of PDCP sequence number 2, the receiver end may have to perform decompression on received data in an order of PDCP sequence numbers 1, 3, 4, and 5 in a PDCP layer so as to succeed in the decompression. When the transmitter end performs UDC compression, because a UDC header indicates the UDC compression, the receiver end may determine whether the UDC compression has been applied by checking the UDC header. When a checksum failure of the data of PDCP sequence number 3 occurs in a process of performing a series of UDC decompression operations, all subsequent UDC decompression operations may fail. That is, UDC decompression may not be successfully performed on the data of PDCP sequence numbers 4 and 5.

An embodiment of the disclosure may provide a checksum failure processing method of solving a checksum failure as follows.

Figure 2I:
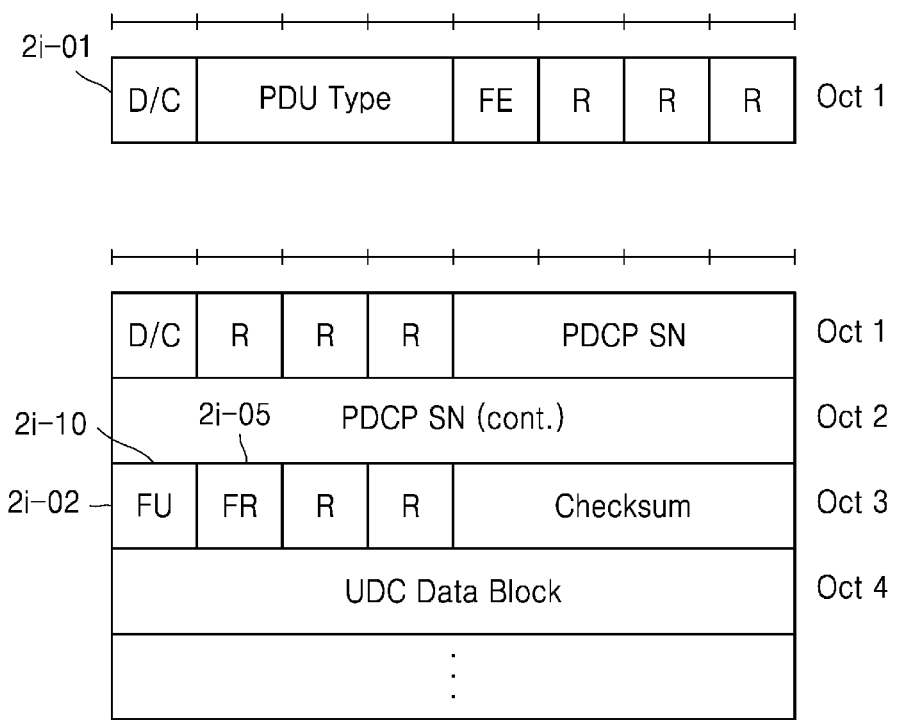
FIG. 2I is a diagram for describing a packet data convergence protocol (PDCP) control packet data unit (PDU) format that is applicable to a checksum failure processing method according to an embodiment of the disclosure.

FIG. 2I is a diagram for describing a PDCP control PDU format that is applicable to a checksum failure processing method according to an embodiment of the disclosure.

In FIG. 2I, a D/C field may be a field for identifying general data or PDCP layer control information (PDCP control PDU) in a PDCP layer, and a PDU Type field may be a field for indicating a type of the PDCP layer control information. According to the checksum failure processing method according to an embodiment of the disclosure, a 1-bit indicator (FE field) indicating whether a checksum failure occurs may be defined and used in a PDCP control PDU format for feedback such as 2i-01. When a value of the 1-bit indicator is 0, it may be indicated that UDC decompression is normally performed, and when a value of the 1-bit indicator is 1, it may be indicated that a checksum failure occurs during UDC decompression, and a UDC buffer of a transmitting PDCP layer is to be reset.

In an embodiment of the disclosure, a new PDCP control PDU may be defined by allocating reserved values (e.g., 011 or a reserved value between 100 and 111) to a PDU type to define a 2i-01 format, and the PDCP control PDU having the defined PDU type may function as a feedback for indicating a checksum failure.

TABLE 1

| Bit | Description |
| --- | --- |
| 000 | PDCP status report |
| 001 | Interspersed ROHC feedback packet |
| 010 | LWA status report |
| 011 | UDC checksum failure feedback |
| 100-111 | reserved |

An embodiment of a checksum failure processing method using a PDCP control PDU of FIG. 2I is as follows.

When a receiver end (e.g., a base station) checks a checksum failure of a receiving UDC buffer for data on which uplink data decompression is to be performed, the receiver end may indicate that the checksum failure has occurred by transmitting a PDCP control PDU to a terminal. A new PDCP control PDU may be defined and used as the PDCP control PDU, or an existing PDCP control PDU may be altered and used as the PDCP control PDU by defining a new indicator in the altered existing PDCP control PDU. In another method, an indicator to reset a UDC buffer because a checksum failure has occurred, instead of a PDCP sequence number, may be defined to indicate the checksum failure.

Operation of Receiver End: When a checksum failure occurs, a receiver end may directly reset a receiving UDC buffer. The receiver end may reorder pieces of data that are newly received based on PDCP sequence numbers, and then may check UDC headers of the pieces of data in an ascending order of the PDCP sequence numbers. In this case, the receiver end may discard pieces of data that does not include an indication to reset a receiving UDC buffer and whose UDC compression has been performed because it is indicated that a transmitting UDC buffer has been reset due to a UDC checksum failure, and may process pieces of data whose UDC header does not include an indicator indicating that a transmitting UDC buffer has been reset due to a UDC checksum failure and whose UDC compression has not been performed, when receiving all of the plurality of pieces of data in an order of PDCP sequence numbers with no gap, in an ascending order of the PCP sequence numbers and may deliver the processed pieces of data to an upper layer. From data whose UDC header includes an indicator indicating that a transmitting UDC buffer has been reset due to a UDC checksum failure and a receiving UDC buffer is to be reset, the receiver end may reset a receiving UDC buffer and may restart decompression on pieces of data that have been UDC compressed in an ascending order of PDCP sequence numbers.

Operation of Transmitter End: When a transmitter end (terminal) receives a PDCP control PDU, the transmitter end may reset a transmitting UDC buffer, may discard pieces of data (e.g., PDCP PDU) that are not transmitted yet among pieces of data whose UDC compression has been performed before the transmitting UDC buffer is reset, may perform uplink data compression (UDC) again on pieces of raw data (e.g., PDCP SDU) of the pieces of data that are not transmitted yet based on the reset transmitting UDC buffer, may update the UDC buffer, may cause checksum bits to be included in a UDC header, perform ciphering on the UDC header and data part, may generate a PDCP header, may configure a PDCP PDU, and may transfer the PDCP PDU to a lower layer.

Also, the transmitter end may cause an indicator indicating that a transmitting buffer has been reset or an indicator to reset a receiving buffer to be included in a UDC header or a PDCP header of the newly configured PDCP PDU and may transfer the PDCP PDU, and may newly allocate PDCP sequence numbers that are not transmitted yet in an ascending order (that is, when data that was ciphered using a PDCP count value and a security key and then transmitted is ciphered again using the same PDCP count value and security key and then retransmitted, a risk of hacking is increased, and thus the transmitter end may comply with a rule that ciphering and transmission are performed once with respect to one PDCP count value). In another method, when the transmitter end receives an indication indicating that a checksum failure has occurred, the transmitter end may reset a transmitting UDC buffer, may perform new UDC compression only on a PDCP PDU to be newly configured or data whose PDCP sequence number is equal to or greater than a PDCP sequence number of data that is not transferred yet to a lower layer, and may transfer the data to a lower layer. Also, the transmitter end may cause an indicator indicating that a transmitting UDC buffer has been reset (or an indicator to reset a receiving UDC buffer) to be included in a PDCP header or a UDC header of the newly configured PDCP PDU and may transfer the data (that is, when data that was ciphered using a PDCP count value and a security key and then transmitted is ciphered again using the same PDCP count value and security key and then retransmitted, a risk of hacking is increased, and thus the transmitter end may comply with a rule that ciphering and transmission are performed once with respect to one PDCP count value).

However, a checksum failure may occur due to a PDCP discard timer of a PDCP layer. That is, the PDCP layer may drive a timer by using a PDCP discard timer value configured in an RRC message for each data (packet or PDCP SDU) received from an upper layer. When the timer expires, data corresponding to the timer may be discarded. Accordingly, when a timer for data on which UDC compression is performed expires, part of the UDC compressed data may be discarded, and thus UDC decompression performed by a receiver end on subsequent pieces of UDC compressed data may fail.

A first embodiment for preventing data loss when data on which UDC compression has been performed is discarded due to a PDCP discard timer in a transmitting PDCP layer, and reducing data with a checksum failure in a receiver end may be provided as follows.

Operation of Transmitter End: When an uplink data compression procedure is configured and data that has not been transmitted yet and whose UDC compression has been performed is discarded due to the expiration of a PDCP discard timer, a transmitting PDCP layer may transmit data whose PDCP sequence number is greater than that of the discarded data and whose UDC compression has been performed, and may discard all of remaining data (e.g., data whose PDCP sequence number is greater than a next PDCP sequence number of the discarded data, whose user data compression has been performed, and that is stored without being transmitted yet). Also, when the data has already been transferred to a lower layer, the transmitting PDCP layer may send, to the lower layer, an indicator to discard the data. The transmitting PDCP layer may stop data transmission until a PDCP control PDU indicating that a checksum failure has occurred is received. This is because it is obvious that because part or data corresponding to a middle sequence number of sequential sequence numbers from among UDC compressed data is discarded, for data (e.g., PDCP PDU) whose user data compression has been performed and whose PDCP sequence number is greater than that of the discarded data, a checksum failure may occur in a receiving PDCP layer. Accordingly, it may be expected that when data corresponding to a next PDCP sequence number of the discarded data is transmitted, the receiving PDCP layer checks a checksum failure and transmits a PDCP control PDU.

Accordingly, a transmitting PDCP layer may reset a transmitting UDC buffer for user data compression when or before a PDCP control PDU indicating that a checksum failure has occurred is received (or may not reset the transmitting UDC buffer when the transmitting UDC buffer has already been reset), may apply, when necessary, a user data compression procedure again from raw data (e.g., PDCP SDU) of data whose PDCP discard timer has not expired and that has not been transmitted yet or from raw data (e.g., PDCP SDU) of data whose PDCP discard timer has not expired yet and that has been transmitted last (transmitted data corresponding to a next PDCP sequence number of discarded data), and may cipher, generate, and prepare data (e.g., PDCP PDU) in an ascending order from a new PDCP sequence number or a first PDCP sequence number that has not been transmitted yet. The transmitting PDCP layer may restart transmission of the newly generated and prepared data (e.g., PDCP PDU) after the PDCP control PDU indicating that a checksum failure has occurred is received. That is, the transmitting PDCP layer may transfer the data to a lower layer.

In an embodiment of the disclosure, a PDCP SDU may indicate raw data received by a transmitting PDCP layer from an upper layer, and a PDCP PDU may indicate data to be transmitted to a lower layer after being data processed by the transmitting PDCP layer. Data processing may include header compression, user layer data compression, ciphering, or integrity protection and verification configured in a PDCP layer. Also, a PDCP PDU generated by data processing a PDCP SDU may be data different from the PDCP SDU, the PDCP SDU may be stored even when the PDCP PDU is discarded, and the PDCP SDU may be discarded only by a PDCP data discard timer.

Accordingly, when a user data compression procedure is configured, when part of data that has been previously generated and whose user data compression has been performed is discarded due to a PDCP discard timer, a checksum failure that may occur in data whose PDCP sequence number is greater than that of the discarded data may be reduced, and data loss may be prevented because data is re-generated from data that has not been transmitted yet or from data that has been transmitted last (transmitted data corresponding to a next PDCP sequence number of the discarded data).

When a receiver end (base station) checks a checksum failure of a receiving UDC buffer for data on which uplink data decompression is to be performed, the receiver end may indicate that the checksum failure has occurred by transmitting a PDCP control PDU to a terminal. A new PDCP control PDU may be defined and used as the PDCP control PDU, or an existing PDCP control PDU may be altered and used as the PDCP control PDU by defining a new indicator in the altered existing PDCP control PDU. In another method, an indicator to reset a UDC buffer because a checksum failure has occurred, instead of a PDCP sequence number, may be defined to indicate the checksum failure.

Operation of Receiver End: When a checksum failure occurs, a receiver end may directly reset a UDC buffer. The receiver end may reorder pieces of data that are newly received based on PDCP sequence numbers, and then may check UDC headers of the pieces of data in an ascending order of the PDCP sequence numbers. In this case, the receiver end may discard pieces of data that does not include an indication to reset a receiving UDC buffer and whose UDC compression has been performed because it is indicated that a transmitting UDC buffer has been reset due to a UDC checksum failure, and may process pieces of data whose UDC header does not include an indicator indicating that a transmitting UDC buffer has been reset due to a UDC checksum failure and whose UDC compression has not been performed, when receiving all of the plurality of pieces of data in an order of PDCP sequence numbers with no gap, in an ascending order of the PCP sequence numbers and may deliver the processed pieces of data to an upper layer. From data whose UDC header includes an indicator indicating that a transmitting UDC buffer has been reset due to a UDC checksum failure and a receiving UDC buffer is to be reset, the receiver end may reset a receiving UDC buffer and may restart decompression on pieces of data that have been UDC compressed in an ascending order of PDCP sequence numbers.

A second embodiment for preventing data loss when data on which UDC compression has been performed is discarded due to a PDCP discard timer in a transmitting PDCP layer, and reducing data with a checksum failure in a receiver end may be provided as follows.

In order to solve the problems, in the second embodiment, when first data that has not been transmitted yet and whose UDC compression has been performed is discarded due to the expiration of a PDCP discard timer, a transmitting PDCP layer in which a UDC compression procedure is configured may discard the first data, and may discard all of second data (e.g., PDCP PDU) whose PDCP sequence number is greater than that of the first data and that has not been transmitted, has been UDC compressed, and is stored. This is because when one of data to which UDC compression is continuously applied is missing, a UDC decompression failure may occur for data to which UDC compression is applied after the discarded data in a receiving PDCP layer and all of data may be discarded.

After discarding the first data, the transmitting PDCP layer may prepare a new UDC compression procedure by resetting a transmitting UDC buffer. When a UDC buffer may be reset, it may be indicated that values of the UDC buffer are all reset to 0. In another method, when predefined information (predefined dictionary) is configured in an RRC message, it may be indicated that the predefined information is input and reset to values of the UDC buffer.

Because the transmitting PDCP layer has not transmitted yet raw data (e.g., PDCP SDU) of the second data (e.g., PDCP PDU) after the transmitting UDC buffer is reset, the transmitting PDCP layer may newly apply a UDC compression procedure by using the reset transmitting UDC buffer to the raw data (e.g., PDCP SDU, or raw data received from an upper layer to which data processing is not applied in a PDCP layer) of the second data, may generate and configure each UDC header, and then may perform data transmission by applying ciphering or integrity protection.

Also, the transmitting PDCP layer may indicate to reset a receiving UDC buffer of the receiving PDCP layer by using a 1-bit indicator in a UDC header of first data (PDCP PDU)

on which data processing is performed by first applying a UDC compression procedure after the transmitting UDC buffer is reset. This is because the receiving PDCP layer may not know data on which UDC compression is newly performed after the transmitting UDC is reset, and thus the transmitting PDCP layer may indicate the data by using the 1-bit indicator of the UDC buffer so that the receiving PDCP layer checks the 1-bit indicator, resets the receiving UDC buffer, and performs a UDC decompression procedure by using the reset receiving UDC buffer from the data. Accordingly, when a 1-bit indicator in a UDC header of received data (e.g., PDCP PDU) may indicate to reset the receiving UDC buffer, the receiving PDCP layer may know that the transmitting UDC buffer has already been reset and new UDC compression has been applied to the data. Accordingly, the receiving PDCP layer may reset the receiving UDC buffer and may apply a UDC decompression procedure by using the reset receiving UDC buffer from the data.

According to the second embodiment of the disclosure, when a user data compression procedure is configured, when part of data that has been previously generated and whose user data compression has been performed is discarded due to a PDCP discard timer, because data whose PDCP sequence number is greater than that of the discarded data and to which UDC compression is applied is not transmitted, a decompression failure or a checksum failure which may occur in a receiving PDCP layer may be reduced and a waste of transmission resources may be reduced. Also, because data is re-generated from data that is not transmitted or from data that is transmitted last (transmitted data corresponding to a next PDCP sequence number of discarded data), data loss may be prevented.

Also, because a transmitting PDCP layer may immediately reset a transmitting UDC buffer and may newly start UDC compression without needing to wait for PDCP control data (PDCP control PDU) for resetting the transmitting UDC buffer transmitted due to a checksum failure from a receiving PDCP layer, transmission latency may be reduced. Because a checksum failure or a decompression failure does not occur in the receiving PDCP layer, the receiving PDCP layer may not need to generate and transmit PDCP control data, and may reset a receiving UDC buffer and newly start UDC decompression according to a 1-bit indicator of a UDC header indicated in the transmitting PDCP layer. Accordingly, the second embodiment of the disclosure may be a terminal-based transmitting/receiving UDC buffer resetting method using a 1-bit indicator of a UDC header.

A detailed operation of the second embodiment of the disclosure are as follows.

Operation of Transmitter End: When an uplink data compression procedure is configured and data that has not been transmitted yet and whose UDC compression has been performed is discarded due to the expiration of a PDCP discard timer, a transmitting PDCP layer may discard all of data (e.g., PDCP PDU) whose PDCP sequence number is greater than that of the discarded data, or that has been generated as a PDCP PDU to which user data compression is applied and is stored without being transmitted yet. Also, when the data has been already been transferred to a lower layer, the transmitting PDCP layer may send, to the lower layer, an indicator to discard the data. The transmitting PDCP layer may reset a buffer (UDC buffer) for user data compression, may allocate PDCP sequence numbers to data, from raw data (e.g., PDCP SDU) of first data that has not been transmitted yet, in an ascending order from a new PDCP sequence number or a PDCP sequence number that has not been transmitted yet, may perform user data compression again, and may perform ciphering. Also, in order to indicate that the transmitting buffer for user data compression has been reset when a UDC header of first data to which UDC compression is first applied after a transmitting UDC buffer is reset is generated, or in order to indicate to reset a receiving UDC buffer of a receiver end, the transmitting PDCP layer may define and indicate a new 1-bit indicator (e.g., 2i-05 of FIG. 2i). When the receiver end checks the 1-bit indictor of the UDC header, the receiver end may know that a receiving buffer for user data decompression may have to be reset. In another method, it may be indicated that the transmitting buffer for user data compression has been reset by using an FR bit, and the receiver end may indicate that the receiving buffer for user data decompression may have to be reset. That is, a terminal may reset transmitting and receiving UDC buffers.

The transmitting PDCP layer may immediately start transmission of the newly generated and prepared data, from data whose UDC header indicates that a transmitting buffer for user data compression has been reset and that is indicated by the receiver end to reset a receiving buffer for data decompression, sequentially or an ascending order of PDCP sequence numbers. That is, the transmitting PDCP layer may transfer the data to a lower layer.

According to the second embodiment, a terminal itself may trigger a procedure of resetting transmitting and receiving UDC buffers by using a 1-bit indicator of a UDC header before a checksum failure. Accordingly, when a user data compression procedure is configured, when part of data that has been previously generated and whose user data compression has been performed is discarded due to a PDCP discard timer, a checksum failure that may occur in data whose PDCP sequence number is greater than that of the discarded data may be reduced, and data loss may be prevented because data is re-generated from data that has not been transmitted yet.

Operation of Receiver End: When a UDC header of received data indicates that a transmitting buffer for user data compression has been reset and even a receiving side indicates that a receiving buffer for user data decompression may have to be reset, a receiver end may reset a receiving UDC buffer, may perform deciphering and user data decompression on the received data in an ascending order of PDCP sequence numbers, and may deliver the data to an upper layer.

An embodiment of the disclosure may provide efficient detailed operations of transmitting and receiving PDCP layers for a bearer in which a user data compression procedure (uplink data compression or downlink data compression) is configured.

A first embodiment of efficient operations of transmitting and receiving PDCP layers for a bearer in which a user data compression procedure is configured is as follows. For example, an operation of a transmitting PDCP layer of a terminal or a base station according to an embodiment of the disclosure is as follows.

A transmitting PDCP layer may use a first count variable maintaining a count value to be allocated to data that is transmitted next during data processing, and the first count variable may be referred to as TX_NEXT.

An operation of a transmitting PDCP layer of the disclosure is as follows.

A transmitting PDCP layer may operate a PDCP data discard timer upon receiving data (e.g., PDCP SDU) from an upper layer and may discard the data when the PDCP data discard timer expires.

The transmitting PDCP layer may allocate a count value corresponding to TX_NEXT to the data received from the upper layer. An initial value of TX_NEXT may be set to 0, and TX_NEXT may maintain a count value of data (PDCP SDU) to be transmitted next.

When a header compression protocol (ROHC) is configured in the transmitting PDCP layer, the transmitting PDCP layer may perform header compression on the data.

When a user data compression protocol (uplink data compression/downlink data compression (UDC/DDC)) is configured in the transmitting PDCP layer 1. When user data compression may be applied to the data received from the upper layer, the transmitting PDCP layer may generate a user data compression header (UDC header or DDC header) and may configure, in the user data compression header, a 1-bit indicator indicating that user data compression has been applied to the data, and when user data compression is not applied to the data, the transmitting PDCP layer may generate a user data compression header and may configure, in the user data compression header, a 1-bit indicator indicating that user data compression has not been applied. When user data compression is applied, the transmitting PDCP layer may apply compression to the data.
2. When an error indicating that a checksum failure has occurred is received from a receiving PDCP layer of a receiver end, a transmitting PDCP layer may reset a transmitting user data compression buffer (UDC/DDC buffer) of a user data compression protocol, and may indicate data that is first compressed after the transmitting user data compression buffer is reset by using a 1-bit indicator in a user data compression header of first data to which user data compression is newly applied.
3. When a transmitting user data compression buffer needs to be reset due to a PDCP discard timer or a protocol error, a transmitting PDCP layer of a transmitter end may reset the transmitting user data compression buffer, and may indicate data that is first compressed after the transmitting user data compression buffer is reset by using a 1-bit indicator in a user data compression header of first data to which user data compression is newly applied. Also, the transmitting PDCP layer may indicate to reset a receiving user data compression buffer of a receiving PDCP layer of a receiver end by using the indicator.

When integrity protection is configured in the transmitting PDCP layer, the transmitting PDCP layer may generate a PDCP header, and may perform integrity protection on the PDCP header and the data by using a count value of TX_NEXT allocated to the data and a security key.

The transmitting PDCP layer may perform a ciphering procedure on the data by using the count value of TX_NEXT allocated to the data and the security key.

The transmitting PDCP layer may configure, as a PDCP sequence number, lower least significant bits (LSBs) of a PDCP sequence number length from the count value of TX_NEXT. The transmitting PDCP layer may also cipher a user data compression header (UDC header/DDC header) in the ciphering procedure.

The transmitting PDCP layer may increase the count value of TX_NEXT by 1, may combine the processed data with the PDCP header, and may transfer the data along with the PDCP header to a lower layer.

An operation of a receiving PDCP layer of a terminal or a base station according to an embodiment of the disclosure is as follows.

A receiving PDCP layer may use a PDCP sequence number length (e.g., 12 bits or 18 bits) configured by a base station in RRC, may check a PDCP sequence number of received data (e.g., PDCP PDU), and may drive a reception window. The reception window is set to half a size (e.g., 2^(PDCP SN length-l) of a PDCP sequence number space, and is used to identify valid data. That is, the receiving PDCP layer may determine data received outside the reception window as invalid data and may discard the data. The reason why data arrives outside the reception window is that data arrives very late due to retransmission of an RLC layer from a lower layer or HARQ retransmission of a MAC layer. Also, the receiving PDCP layer may drive a PDCP t-reordering timer along with the reception window.

The PDCP t-reordering timer may be triggered when a PDCP sequence number gap occurs based on the PDCP sequence number in the receiving PDCP layer. When data corresponding to the PDCP sequence number gap does not arrive until the PDCP t-reordering timer expires, the receiving PDCP layer may deliver data to an upper layer in an ascending order of count values or the PDCP sequence number and may move the reception window. Accordingly, when the data corresponding to the PDCP sequence number gap arrives after the PDCP t-reordering timer expires, the data is not data within the reception window, and thus the receiving PDCP layer may discard the data.

A specific procedure of the receiving PDCP layer is as follows. That is, an operation of a receiving PDCP layer of a terminal or a base station according to the disclosure is as follows.

A receiving PDCP layer may maintain and manage three count variables when processing received data. The receiving PDCP layer may use a second count value maintaining a count value of data (e.g., PDCP SDU) expected to be received next when processing the received data, and the second count variable may be referred to as RX_NEXT. The receiving PDCP layer may use a third count value maintaining a count value of first data (e.g., PDCP SDU) that is not delivered to an upper layer when processing the received data, and the third count variable may be referred to as RX_DELIV. The receiving PDCP layer may use a fourth count variable maintaining a count value of data (e.g., PDCP SDU) that triggered a PDCP t-reordering timer when processing the received data, and the fourth count variable may be referred to as RX_REORD. The receiving PDCP layer may use a fifth count variable maintaining a count value of data (e.g., PDCP SDU) that is currently received when processing the received data, and the fifth count variable may be referred to as RCVD_COUNT. The PDCP t-reordering timer may use a timer value or interval configured in an RRC message as described with reference to FIG. 1E in an upper layer (RRC layer), the PDCP t-reordering timer may be used to detect a missing PDCP PDU, and only one timer may run at a time.

Also, a terminal in an operation of a receiving PDCP layer may define and use the following variables.

HFN: indicates a hyper frame number (HFN) of a window state variable.

SN: indicates a sequence number (SN) of a window state variable.

RCVD_SN: indicates a PDCP sequence number included in a header of a received PDCP PDU.

RCVD_HFN: indicates an HFN value of a received PDCP PDU calculated by a receiving PDCP layer.

An operation of a receiving PDCP layer of a terminal or a base station according to an embodiment of the disclosure is as follows.

A receiving PDCP layer may determine a count value of a received PDCP PDU as follows when the PDCP PDU is received from a lower layer.

When received RCVD_SN<=SN(RX_DELIV)–Window_Size, Equation 1 may result in:

1. RCVD_HFN=HFN(RX_DELIV)+1    (Equation 1).

On the other hand, when RCVD_SN is RCVD_SN>SN(RX_DELIV)+Window_Size, Equation 2 may result in:

1. RCVD_HFN=HFN(RX_DELIV)–1    (Equation 2).

In other cases, Equation 3 may result in:

1. RCVD_HFN=HFN(RX_DELIV)    (Equation 3).

RCVD_COUNT may be determined to be RCVD_COUNT=[RCVD_HFN, RCVD_SN].

After determining the count value of the received PDCP PDU, the receiving PDCP layer may update window state variables as follows and may process the PDCP PDU.

The receiving PDCP layer may perform deciphering on the PDCP PDU by using the RCVD_COUNT value, and may perform integrity verification.
1. When the integrity verification fails, the receiving PDCP layer may indicate an integrity verification failure to an upper layer, and may discard received DPCP data PDU (data part of the PDCP PDU).

When RCVD_COUNT<RX_DELIV, or a PDCP PDU having a value of RCVD_COUNT has been received previously (in the case of a packet that is outdated, overdue, or outside a window, or in the case of a duplicate packet) (when integrity protection is configured, and a PDCP PDU having a value of RCVD_COUNT succeeds in previous integrity protection), 1. the receiving PDCP layer may discard the received PDCP data PDU (data part of PDCP PDU).

When the received PDCP PDU is not discarded, the receiving PDCP layer may operate as follows.

The receiving PDCP layer may store the processed PDCP SDU in a receiving buffer.
When RCVD_COUNT>=RX_NEXT,
1. RX_NEXT may be updated to RCVD_COUNT+1.

When an out-of-order delivery indicator (outOfOrderDelivery) is configured (an out-of-order delivery operation is indicated),
1. the receiving PDCP layer may deliver the PDCP SDU to an upper layer.

When RCVD_COUNT is the same as RX_DELIV
1. —(Although a user data compression protocol (UDC/DDC) or a header compression protocol (e.g., ROHC) is configured) when a header decompression procedure has not been applied previously (i.e., when compression has not been performed yet on an upper layer header or data)
A. When a user data compression protocol is configured, and user data has been compressed (when an indicator of a user data compression header is checked and it is indicated that user data has been compressed)
i. When a user data compression header may indicate that a transmitting UDC buffer has been reset and may indicate first data to which user data compression is newly applied (by checking an FR bit), A) the receiving PDCP layer may reset a receiving user data compression protocol buffer.
B) When a checksum field of a user data compression header is checked, a checksum checking procedure is performed, and a checksum error does not occur,
①  the receiving PDCP layer may perform decompression on the data.
C) Otherwise, when a checksum field of a user data compression header is checked, a checksum checking procedure is performed, and a checksum error occurs,
① the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
② The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
ii. On the other hand, when a user data compression header does not indicate that a transmitting UDC buffer has been reset and does not indicate first data to which user data compression is newly applied (by checking FR bit)
A) When a checksum field of a user data compression header is checked, a checksum checking procedure is performed, and a checksum error does not occur,
① the receiving PDCP layer may perform decompression on the data.
B) Otherwise, when a checksum field of a user data compression header is checked, a checksum checking procedure is performed, and a checksum error occurs,
① the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
② The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
B. When a user data compression protocol is configured, and user data is not compressed (when an indicator of a user data compression header may be checked and it may be indicated that user data is not compressed),
  i. the receiving PDCP layer may not perform decompression on the data, and may remove a user data compression header.
C. On the other hand, when a user data compression protocol is not configured and a header compression protocol (e.g., ROHC) is configured,
  i. the receiving PDCP layer may perform decompression on an upper layer header (TCP/IP or UDP header) of the data.
2. The receiving PDCP layer may deliver data to an upper layer in an order of count values.
A. The receiving PDCP layer may deliver all of consecutive PDCP SDUs to an upper layer from COUNT=RX_DELIV.
3. The receiving PDCP layer may update RX_DELIV to a count value of a first PDCP SDU that is not transmitted to an upper layer, wherein the count value is equal to or greater than current RX_DELIV.
When a t-reordering timer runs and RX_DELIV is equal to or greater than RX_REORD,
1. the receiving PDCP layer may stop and reset the t-reordering timer.
When the t-reordering timer does not run (including a case where the t-reordering timer is stopped in the above condition) and RX_DELIV is less than RX_NEXT,
1. the receiving PDCP layer may update RX_REORD to RX_NEXT.
2. The receiving PDCP layer may start the t-reordering timer.
When a PDCP t-reordering timer expires, a receiving PDCP layer may operate as follows.
 (Although a user data compression protocol (UDC/DDC) or a header compression protocol (e.g., ROHC) is configured), when a header decompression procedure has not been applied before (i.e., when compression has not been performed yet on an upper layer header or data)
1. When a user data compression protocol is configured, and user data has been compressed (when an indicator of a user data compression header is checked and it is indicated that user data has been compressed)
A. When a checksum field of a user data compression header is checked, a checksum checking procedure is performed, and a checksum error does not occur,
  i. the receiving PDCP layer may perform decompression on the data.
B. Otherwise, when a checksum field of a user data compression header is checked, a checksum checking procedure is performed, and a checksum error occurs,
  i. the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
  ii. The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
2. When a user data compression protocol is configured, and user data is not compressed (when an indicator of a user data compression header may be checked and it may be indicated that user data is not compressed),
A. the receiving PDCP layer may not perform decompression on the data, and may remove a user data compression header.
3. On the other hand, when a user data compression protocol is not configured and a header compression protocol (e.g., ROHC) is configured,
A. the receiving PDCP layer may perform decompression on an upper layer header (TCP/IP or UDP header) of the data.
The receiving PDCP layer mat deliver data to an upper layer in an order of count values.
1. The receiving PDCP layer may deliver all PDCP SDUs whose count values are less than RX_REORD.
2. The receiving PDCP layer may deliver all PDCP SDUs having consecutive count values from RX_REORD.
The receiving PDCP layer may update RX_DELIV to a count value of a first PDCP SDU that is not transmitted to an upper layer, wherein the count value is equal to or greater than RX_REORD.
When RX_DELIV is less than RX_NEXT,
1. the receiving PDCP layer may update RX_REORD to RX_NEXT.
2. The receiving PDCP layer may start a t-reordering timer.
When a PDCP t-reordering timer expires, another receiving PDCP layer according to an embodiment of the disclosure may operate as follows.
 (Although a user data compression protocol (UDC/DDC) or a header compression protocol (e.g., ROHC) is configured), when a header decompression procedure has not been applied before (i.e., when compression has not been performed yet on an upper layer header or data)
1. When a user data compression protocol is configured, and user data has been compressed (when an indicator of a user data compression header is checked and it is indicated that user data has been compressed),
A. the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.

B. The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.

2. When a user data compression protocol is configured, and user data is not compressed (when an indicator of a user data compression header may be checked and it may be indicated that user data is not compressed), A. the receiving PDCP layer may not perform decompression on the data, and may remove a user data compression header.

3. On the other hand, when a user data compression protocol is not configured and a header compression protocol (e.g., ROHC) is configured, A. the receiving PDCP layer may perform decompression on an upper layer header (TCP/IP or UDP header) of the data.

The receiving PDCP layer mat deliver data to an upper layer in an order of count values.

1. The receiving PDCP layer may deliver all PDCP SDUs whose count values are less than RX_REORD.
2. The receiving PDCP layer may deliver all PDCP SDUs having consecutive count values from RX_REORD.

The receiving PDCP layer may update RX_DELIV to a count value of a first PDCP SDU that is not transmitted to an upper layer, wherein the count value is equal to or greater than RX_REORD.

When RX_DELIV is less than RX_NEXT,
1. the receiving PDCP layer may update RX_REORD to RX_NEXT.
2. The receiving PDCP layer may start a t-reordering timer.

When a PDCP t-reordering timer expires, another receiving PDCP layer according to an embodiment of the disclosure may operate as follows.

(Although a user data compression protocol (UDC/DDC) or a header compression protocol (e.g., ROHC) is configured), when a header decompression procedure has not been applied before (i.e., when compression has not been performed yet on an upper layer header or data)

1. When a user data compression protocol is configured, and user data has been compressed (when an indicator of a user data compression header is checked and it is indicated that user data has been compressed), A. the receiving PDCP layer may discard the data.

2. When a user data compression protocol is configured, and user data has not been compressed (when an indicator of a user data compression header is checked and it is indicated that user data has not been compressed)

A. the receiving PDCP layer may not perform decompression on the data, and may remove a user data compression header.

3. On the other hand, when a user data compression protocol is not configured and a header compression protocol (e.g., ROHC) is configured, A. the receiving PDCP layer may perform decompression on an upper layer header (TCP/IP or UDP header) of the data.

The receiving PDCP layer may deliver data to an upper layer in an order of count values.

1. The receiving PDCP layer may deliver all PDCP SDUs whose count values are less than RX_REORD.
2. The receiving PDCP layer may deliver all PDCP SDUs having consecutive count values from RX_REORD.

The receiving PDCP layer may update RX_DELIV to a count value of a first PDCP SDU that is not transmitted to an upper layer, wherein the count value is equal to or greater than RX_REORD.

When RX_DELIV is less than RX_NEXT,
1. the receiving PDCP layer may update RX_REORD to RX_NEXT.
2. The receiving PDCP layer may start a t-reordering timer.

An embodiment of the disclosure may provide efficient detailed operations of transmitting and receiving PDCP layers for a bearer in which a user data compression procedure (Uplink data compression or downlink data compression) is configured.

A second embodiment of efficient operations of transmitting and receiving PDCP layers for a bearer in which a user data compression procedure is configured is as follows. That is, an operation of a transmitting PDCP layer of a terminal or a base station according to an embodiment of the disclosure is as follows.

A transmitting PDCP layer may use a first count variable maintaining a count value to be allocated to data that is transmitted next during data processing, and the first count variable may be referred to as TX_NEXT.

An operation of a transmitting PDCP layer of the disclosure is as follows.

A transmitting PDCP layer may operate a PDCP data discard timer upon receiving data (e.g., PDCP SDU) from an upper layer and may discard the data when the PDCP data discard timer expires.

The transmitting PDCP layer may allocate a count value corresponding to TX_NEXT to the data received from the upper layer. An initial value of TX_NEXT may be set to 0, and TX_NEXT may maintain a count value of data (PDCP SDU) to be transmitted next.

When a header compression protocol (ROHC) is configured in the transmitting PDCP layer, the transmitting PDCP layer may perform header compression on the data.

When a user data compression protocol (uplink data compression/downlink data compression (UDC/DDC)) is configured in the transmitting PDCP layer 1. When user data compression may be applied to the data received from the upper layer, the transmitting PDCP layer may generate a user data compression header (UDC header or DDC header) and may configure, in the user data compression header, a 1-bit indicator indicating that user data compression has been applied to the data, and when user data compression is not applied to the data, the transmitting PDCP layer may generate a user data compression header and may configure, in the user data compression header, a 1-bit indicator indicating that user data compression has not been applied. When user data compression is applied, the transmitting PDCP layer may apply compression to the data.

2. When an error indicating that a checksum failure has occurred is received from a receiving PDCP layer of a receiver end, a transmitting PDCP layer may reset a transmitting user data compression buffer (UDC/DDC buffer) of a user data compression protocol, and may indicate data that is first compressed after the transmitting user data compression buffer is reset by using a 1-bit indicator in a user data compression header of first data to which user data compression is newly applied.

3. When a transmitting user data compression buffer needs to be reset due to a PDCP discard timer or a protocol error, a transmitting PDCP layer of a transmitter end may reset the transmitting user data compression buffer, and may indicate data that is first compressed after the transmitting user data compression buffer is reset by using a 1-bit indicator in a user data compression header of first data to which user data compression is newly applied. Also, the transmitting PDCP layer may indicate to reset a receiving user data compression buffer of a receiving PDCP layer of a receiver end by using the indicator.

When integrity protection is configured in the transmitting PDCP layer, the transmitting PDCP layer may generate a PDCP header, and may perform integrity protection on the PDCP header and the data by using a count value of TX_NEXT allocated to the data and a security key.

The transmitting PDCP layer may perform a ciphering procedure on the data by using the count value of TX_NEXT allocated to the data and the security key. The transmitting PDCP layer may configure, as a PDCP sequence number, lower least significant bits (LSBs) of a PDCP sequence number length from the count value of TX_NEXT. The transmitting PDCP layer may also cipher a user data compression header (UDC header/DDC header) in the ciphering procedure.

The transmitting PDCP layer may increase the count value of TX_NEXT by 1, may combine the processed data with the PDCP header, and may transfer the data along with the PDCP header to a lower layer.

An operation of a receiving PDCP layer of a terminal or a base station according to an embodiment of the disclosure is as follows.

A receiving PDCP layer may use a PDCP sequence number length (e.g., 12 bits or 18 bits) configured by a base station in RRC, may check a PDCP sequence number of received data (e.g., PDCP PDU), and may drive a reception window. The reception window may be set to half a size (e.g., $2^{\wedge}$(PDCP SN length-l) of a PDCP sequence number space, and may be used to identify valid data. That is, the receiving PDCP layer may determine data received outside the reception window as invalid data and may discard the data. The reason why data arrives outside the reception window is that data arrives very late due to retransmission of an RLC layer from a lower layer or HARQ retransmission of a MAC layer. Also, the receiving PDCP layer may drive a PDCP t-reordering timer along with the reception window.

The PDCP reordering timer may be triggered when a PDCP sequence number gap occurs based on the PDCP sequence number in the receiving PDCP layer. When data corresponding to the PDCP sequence number gap does not arrive until the PDCP t-reordering timer expires, the receiving PDCP layer may deliver data to an upper layer in an ascending order of count values or the PDCP sequence number and may move the reception window. Accordingly, when the data corresponding to the PDCP sequence number gap arrives after the PDCP t-reordering timer expires, the data is not data within the reception window, and thus the receiving PDCP layer may discard the data.

A specific procedure of a receiving PDCP layer according to an embodiment of the disclosure is as follows. That is, an operation of a receiving PDCP layer of a terminal or a base station according to an embodiment of the disclosure is as follows.

A receiving PDCP layer may maintain and manage three count variables when processing received data. The receiving PDCP layer may use a second count value maintaining a count value of data (e.g., PDCP SDU) expected to be received next when processing the received data, and the second count variable may be referred to as RX_NEXT. The receiving PDCP layer may use a third count value maintaining a count value of first data (e.g., PDCP SDU) that is not delivered to an upper layer when processing the received data, and the third count variable may be referred to as RX_DELIV. The receiving PDCP layer may use a fourth count variable maintaining a count value of data (e.g., PDCP SDU) that triggered a PDCP t-reordering timer when processing the received data, and the fourth count variable may be referred to as RX_REORD. The receiving PDCP layer may use a fifth count variable maintaining a count value of data (e.g., PDCP SDU) that is currently received when processing the received data, and the fifth count variable may be referred to as RCVD_COUNT. The PDCP reordering timer may use a timer value or interval configured in an RRC message as described with reference to FIG. 1E in an upper layer (RRC layer), the PDCP t-reordering timer may be used to detect a missing PDCP PDU, and only one timer may run only one time.

Also, a terminal in an operation of a receiving PDCP layer may define and use the following variables.

HFN: indicates a hyper frame number (HFN) of a window state variable.

SN: indicates a sequence number (SN) of a window state variable.

RCVD_SN: indicates a PDCP sequence number included in a header of a received PDCP PDU.

RCVD_HFN: indicates an HFN value of a received PDCP PDU calculated by a receiving PDCP layer.

An operation of a receiving PDCP layer of a terminal or a base station according to an embodiment of the disclosure is as follows. A receiving PDCP layer may determine a count value of a received PDCP PDU as follows when the PDCP PDU is received from a lower layer.

When received RCVD_SN<=SN(RX_DELIV)−Window_Size, Equation 1 may result in:

1. RCVD_HFN=HFN(RX_DELIV)+1          (Equation 1).

On the other hand, when RCVD_SN>SN(RX_DELIV)+Window_Size, Equation 2 may result in:

1. RCVD_HFN=HFN(RX_DELIV)−1          (Equation 2).

In other cases, Equation 3 may result in:

1. RCVD_HFN=HFN(RX_DELIV)          (Equation 3).

RCVD_COUNT may be determined to be RCVD_COUNT=[RCVD_HFN, RCVD_SN].

After determining the count value of the received PDCP PDU, the receiving PDCP layer may update window state variables as follows and may process the PDCP PDU.

The receiving PDCP layer may perform deciphering on the PDCP PDU by using the RCVD_COUNT value, and may perform integrity verification.

1. When the integrity verification fails,
   the receiving PDCP layer may indicate an integrity verification failure to an upper layer, and may discard received DPCP data PDU (data part of the PDCP PDU).
   When RCVD_COUNT<RX_DELIV, or a PDCP PDU having a value of RCVD_COUNT has been received previously (in the case of a packet that is outdated, overdue, or outside a window, or in the case of a duplicate packet) (when integrity protection is configured, and a PDCP PDU having a value of RCVD_COUNT succeeds in previous integrity protection),
   1. the receiving PDCP layer may discard the received PDCP data PDU (data part of PDCP PDU).
   When the received PDCP PDU is not discarded, the receiving PDCP layer may operate as follows.
   The receiving PDCP layer may store the processed PDCP SDU in a receiving buffer.
   When RCVD_COUNT>=RX_NEXT,
   1. RX_NEXT may be updated to RCVD_COUNT+1.
   When an out-of-order delivery indicator (outOfOrderDelivery) is configured (an out-of-order delivery operation is indicated),
   1. the receiving PDCP layer may deliver the PDCP SDU to an upper layer.
   When RCVD_COUNT is the same as RX_DELIV
   1.—(Although a user data compression protocol (UDC/DDC) or a header compression protocol (e.g., ROHC) is configured) when a header decompression procedure has not been applied previously (i.e., when compression has not been performed yet on an upper layer header or data)
   A. When a user data compression protocol is configured, and user data has been compressed (when an indicator of a user data compression header is checked and it is indicated that user data has been compressed)
   i. When a user data compression header may indicate that a transmitting UDC buffer has been reset and may indicate first data to which user data compression is newly applied (by checking an FR bit),
   A) the receiving PDCP layer may reset a receiving user data compression protocol buffer.
   B) When a checksum field of a user data compression header is checked, a checksum checking procedure is performed, and a checksum error does not occur,
   ① the receiving PDCP layer may perform decompression on the data.
   C) Otherwise, when a checksum field of a user data compression header is checked, a checksum checking procedure is performed, and a checksum error occurs,
   ① the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
   ② The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
   ii. On the other hand, when a user data compression header does not indicate that a transmitting UDC buffer has been reset and does not indicate first data to which user data compression is newly applied (by checking FR bit)
   A) When a checksum field of a user data compression header is checked, a checksum checking procedure is performed, and a checksum error does not occur,
   ① the receiving PDCP layer may perform decompression on the data.
   B) Otherwise, when a checksum field of a user data compression header is checked, a checksum checking procedure is performed, and a checksum error occurs,
   ① the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
   ② The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
   B. When a user data compression protocol is configured, and user data is not compressed (when an indicator of a user data compression header may be checked and it may be indicated that user data is not compressed),
   i. the receiving PDCP layer may not perform decompression on the data, and may remove a user data compression header.
   C. On the other hand, when a user data compression protocol is not configured and a header compression protocol (e.g., ROHC) is configured,
   i. the receiving PDCP layer may perform decompression on an upper layer header (TCP/IP or UDP header) of the data.
   2. The receiving PDCP layer may deliver data to an upper layer in an order of count values.
   A. The receiving PDCP layer may deliver all of consecutive PDCP SDUs to an upper layer from COUNT=RX_DELIV.
   3. The receiving PDCP layer may update RX_DELIV to a count value of a first PDCP SDU that is not transmitted to an upper layer, wherein the count value is equal to or greater than current RX_DELIV.

When a t-reordering timer runs and RX_DELIV is equal to or greater than RX_REORD,
1. the receiving PDCP layer may stop and reset the t-reordering timer.

When the t-reordering timer does not run (including a case where the t-reordering timer is stopped in the above condition) and RX_DELIV is less than RX_NEXT,
1. the receiving PDCP layer may update RX_REORD to RX_NEXT.
2. The receiving PDCP layer may start the t-reordering timer.

When a PDCP t-reordering timer expires, a receiving PDCP layer may operate as follows.
(Although a user data compression protocol (UDC/DDC) or a header compression protocol (e.g., ROHC) is configured), when a header decompression procedure has not been applied before (i.e., when compression has not been performed yet on an upper layer header or data)
1. When a user data compression protocol is configured, and user data has been compressed (when an indicator of a user data compression header is checked and it is indicated that user data has been compressed)
A. When a user data compression header may indicate that a transmitting UDC buffer has been reset and may indicate first data to which user data compression is newly applied (by checking an FR bit),
i. the receiving PDCP layer may reset a receiving user data compression protocol buffer.
ii. When a checksum field of a user data compression header is checked, a checksum checking procedure is performed, and a checksum error does not occur,
the receiving PDCP layer may perform decompression on the data.
iii. Otherwise, when a checksum field of a user data compression header is checked, a checksum checking procedure is performed, and a checksum error occurs,
A) the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
B) The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
B. On the other hand, when a user data compression header does not indicate that a transmitting UDC buffer has been reset and does not indicate first data to which user data compression is newly applied (by checking FR bit)
i. When a checksum field of a user data compression header is checked, a checksum checking procedure is performed, and a checksum error does not occur,
A) the receiving PDCP layer may perform decompression on the data.
ii. Otherwise, when a checksum field of a user data compression header is checked, a checksum checking procedure is performed, and a checksum error occurs,
A) the receiving PDCP layer may discard the data and may generate a PDCP control PDU and transmit the PDCP control PDU to a transmitting PDCP layer of a transmitter end in order to indicate that a checksum error has occurred. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented.
B) The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.
2. When a user data compression protocol is configured, and user data is not compressed (when an indicator of a user data compression header may be checked and it may be indicated that user data is not compressed),
A. the receiving PDCP layer may not perform decompression on the data, and may remove a user data compression header.
3. On the other hand, when a user data compression protocol is not configured and a header compression protocol (e.g., ROHC) is configured,
A. the receiving PDCP layer may perform decompression on an upper layer header (TCP/IP or UDP header) of the data.

The receiving PDCP layer may deliver data to an upper layer in an order of count values.
1. The receiving PDCP layer may deliver all PDCP SDUs whose count values are less than RX_REORD.
2. The receiving PDCP layer may deliver all PDCP SDUs having consecutive count values from RX_REORD.

The receiving PDCP layer may update RX_DELIV to a count value of a first PDCP SDU that is not transmitted to an upper layer, wherein the count value is equal to or greater than RX_REORD.

When RX_DELIV is less than RX_NEXT,
1. the receiving PDCP layer may update RX_REORD to RX_NEXT.
2. The receiving PDCP layer may start a t-reordering timer.

Figure 2J:
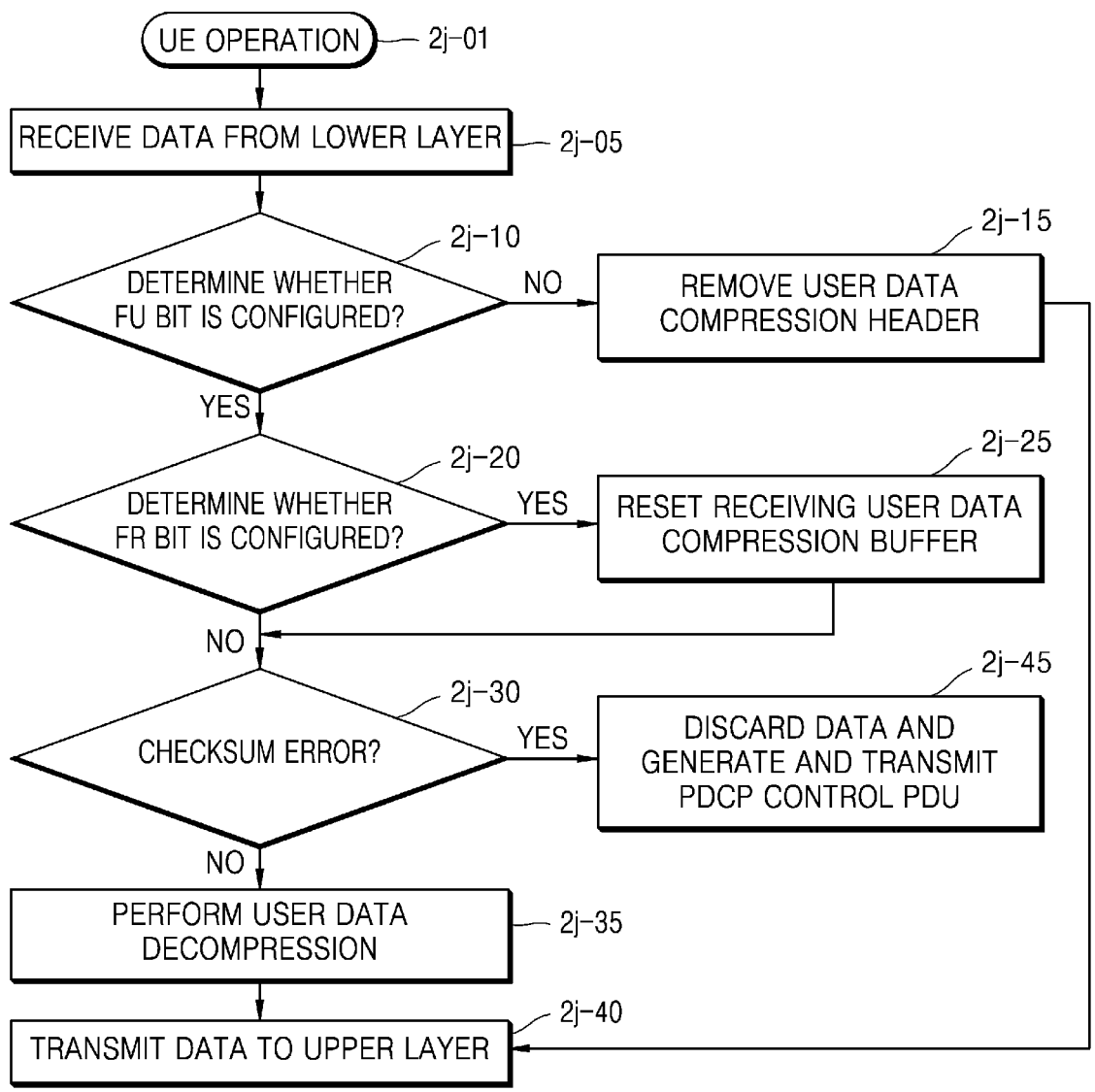
FIG. 2J is a diagram for describing a terminal operation of a receiving PDCP layer according to an embodiment of the disclosure.

FIG. 2J is a diagram for describing a terminal operation of a receiving PDCP layer according to an embodiment of the disclosure.

In operation 2j-05, a receiving PDCP layer of a terminal may receive data from a lower layer.

When a user data compression protocol (UDC/DDC) is configured, and user data has been compressed (when an indicator of a user data compression header is checked and it is indicated that user data has been compressed), and when a user data compression header may indicate that a transmitting UDC buffer has been reset and may indicate first data to which user data compression is newly applied (by checking an FR bit) in operations 2j-10 and 2j-20, the receiving PDCP layer may reset a receiving user data compression protocol buffer in operation 2j-25. When a checksum field of a user data compression header is checked, a checksum checking procedure is performed, and a checksum error does not occur in operation 2j-30, the receiving PDCP layer may perform decompression on the data in operation 2j-35. Otherwise, when a checksum field of a user data compression header is checked, a checksum checking procedure is performed, and a checksum error occurs, the receiving PDCP layer may discard the data and may generate a PDCP control PDU and transmit the PDCP control PDU to a transmitting PDCP layer of a transmitter end in order to indicate that a checksum error has occurred in operation 2j-45. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented. The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.

Otherwise, when a user data compression header does not indicate that a transmitting UDC buffer has been reset and does not indicate first data to which user data compression is newly applied (by checking an FR bit), and when a checksum file of a user data compression header is checked, a checksum checking procedure is performed, and a checksum error does not occur in operations 2j-20 through 2j-30, the receiving PDCP layer may perform decompression on the data in operation 2j-35. Otherwise, when a checksum field of a user data compression header is checked, a checksum checking procedure is performed, and a checksum error occurs in operation 2j-30, the receiving PDCP layer may discard the data and may generate a PDCP control PDU and transmit the PDCP control PDU to a transmitting PDCP layer of a transmitter end in order to indicate that a checksum error has occurred in operation 2j-45. The receiving PDCP layer may indicate a lower layer to discard data (e.g., PDCP PDU) that has been previously generated and transferred to the lower layer, and the lower layer may discard data that has not been transmitted yet. The receiving PDCP layer may not generate an additional PDCP control PDU until receiving data, from among subsequently received data, indicating that a transmitting user data compression buffer has been reset and indicating first data to which user data compression is newly applied by using a 1-bit indicator of a user data compression header, and thus unnecessary PDCP control PDU transmission may be prevented. The receiving PDCP layer may discard all of data to which a user data compression procedure is applied from among data whose count value or PDCP sequence number is less than that of data indicating that a transmitting user data compression buffer has been rest and indicating first data to which user data compression is newly applied by using a 1-bit indicator of a user data compression header among subsequently received data.

When a user data compression protocol is configured, and user data is not compressed (when an indicator of a user data compression header may be checked and it may be indicated that user data is not compressed) in operation 2j-10, the receiving PDCP layer may not perform decompression on the data, and may remove a user data compression header in operation 2j-15. The receiving PDCP layer may deliver the data to an upper layer in operation 2j-40.

Figure 2K:
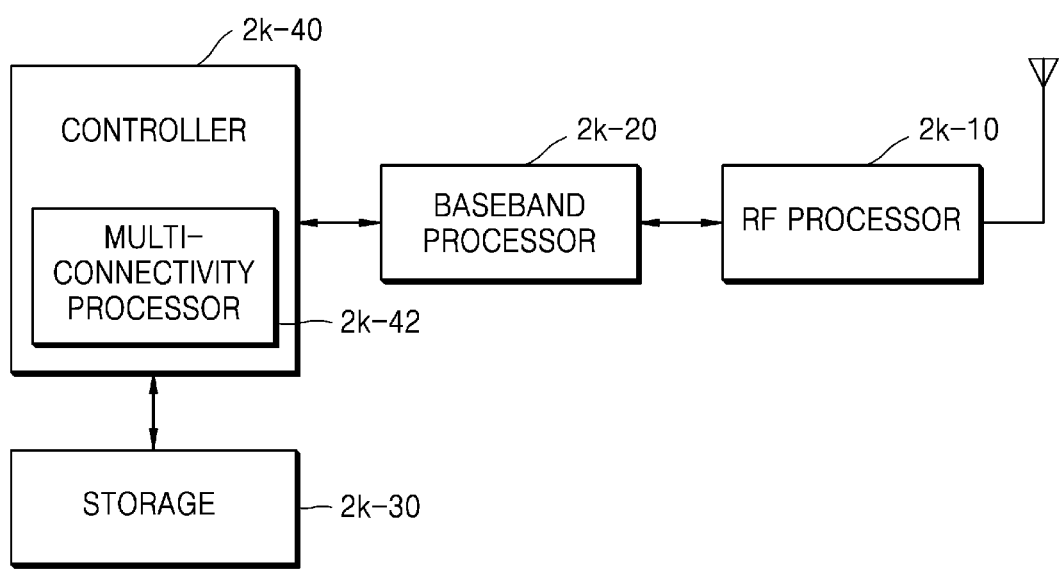
FIG. 2K is a block diagram illustrating a structure of a terminal according to an embodiment of the disclosure.

FIG. 2K is a block diagram illustrating a structure of a terminal according to an embodiment of the disclosure.

Referring to FIG. 2K, a terminal may include a radio frequency (RF) processor 2k-10, a baseband processor 2k-20, a storage 2k-30, and a controller 2k-40.

The RF processor 2k-10 may perform a function of transmitting/receiving a signal through a radio channel such as band conversion or amplification of a signal. That is, the RF processor 2k-10 may up-convert a baseband signal provided from the baseband processor 2k-20 into an RF band signal and then may transmit the RF band signal through an antenna, and may down-convert an RF band signal received through the antenna into a baseband signal. For example, the RF processor 2k-10 may include a transmission filter, a reception filter, an amplifier, a mixer, an oscillator, a digital-to-analog converter (DAC), and an analog-to-digital convertor (ADC). Although only one antenna is illustrated in FIG. 2K, the terminal may include a plurality of antennas. Also, the RF processor 2k-10 may include a plurality of RF chains. Furthermore, the RF processor 2k-10 may perform beamforming. For beamforming, the RF processor 2k-10 may adjust a phase and a size of each of signals transmitted/received through a plurality of antennas or antenna elements. Also, the RF processor 2k-10 may perform MIMO, and may receive a plurality of layers during a MIMO operation. The RF processor 2k-10 may perform received beam sweeping by appropriately configuring a plurality of antennas or antenna elements, or may adjust a direction and a beam width of a received beam so that the received beam is coordinated with a transmitted beam, under the control of the controller 2k-40.

The baseband processor 2k-20 may convert between a baseband signal and a bitstream according to physical layer specifications of a system. For example, during data transmission, the baseband processor 2k-20 may generate complex symbols by encoding and modulating a transmission bitstream. Also, during data reception, the baseband processor 2k-20 may reconstruct a reception bitstream by demodulating and decoding a baseband signal provided from the RF processor 2k-10. For example, according to an orthogonal frequency division multiplexing (OFDM) method, during data reception, the baseband processor 2k-20 may generate complex symbols by encoding and modulating a transmission bitstream, may map the complex symbols top subcarriers, and may configure OFDM symbols through inverse fast Fourier transform (IFFT) and cyclic prefix (CP) insertion. Also, during data reception, the baseband processor 2k-20 may segment a baseband signal provided from the RF processor 2k-10 into OFDM symbols, may reconstruct signals mapped to subcarriers through fast Fourier transform (FFT), and then may reconstruct a reception bitstream by demodulating and decoding the signals.

The baseband processor 2k-20 and the RF processor 2k-10 may transmit and receive a signal as described above. Accordingly, the baseband processor 2k-20 and the RF processor 2k-10 may be referred to as a transmitter, a receiver, a transceiver, or a communicator. Furthermore, at least one of the baseband processor 2k-20 or the RF processor 2k-10 may include a plurality of communication modules to support a plurality of different radio access technologies. Also, at least one of the baseband processor 2k-20 or the RF processor 2k-10 may include different communication modules to process signals of different frequency bands. For example, the different radio access technologies may include an LTE network and an NR network. Also, the different frequency bands may include a super-high frequency (SHF) (e.g., 2.5 giga-Hertz (GHz) or 5 GHz) band, and a millimeter wave (mmWave) (e.g., 60 GHz) band.

The storage 2k-30 may a basic program, an application program, and data such as configuration information for operating the terminal. The storage 2k-30 may provide stored data according to a request of the controller 2k-40.

The controller 2k-40 may control overall operations of the terminal. For example, the controller 2k-40 may transmit/receive a signal through the baseband processor 2k-20 and the RF processor 2k-10. Also, the controller 2k-40 may write and read data to and from the storage 2k-40. To this end, the controller 2k-40 may include at least one processor. For example, the controller 2k-40 may include a communication processor (CP) for controlling communication and an application processor (AP) for controlling an upper layer such as an application program.

Figure 2L:
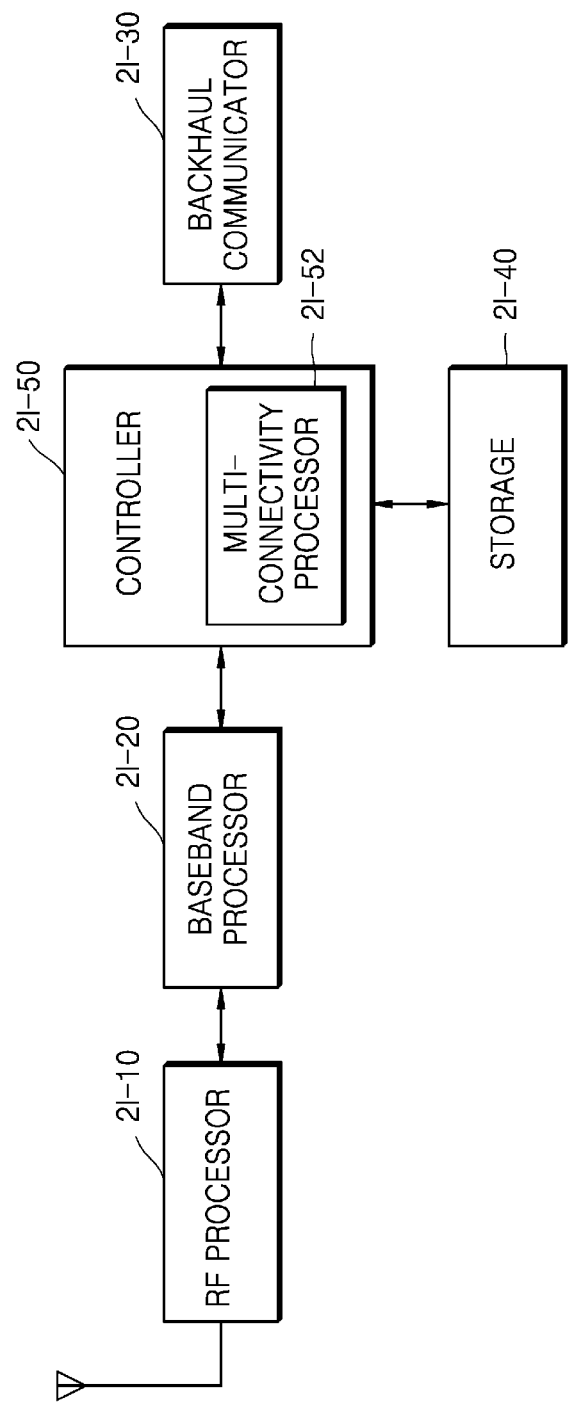
FIG. 2L is a block diagram illustrating a structure of a base station according to an embodiment of the disclosure.

FIG. 2L is a block diagram illustrating a structure of a base station, e.g., a TRP, according to an embodiment of the disclosure.

Referring to FIG. 2L, a base station may include an RF processor 2l-10, a baseband processor 2l-20, a backhaul communicator 2l-30, a storage 2l-40, and a controller 2l-50.

The RF processor 2l-10 may perform a function of transmitting/receiving a signal through a radio channel such as band conversion or amplification of a signal. That is, the RF processor 2l-10 may up-convert a baseband signal provided from the baseband processor 2l-20 into an RF band signal and then may transmit the RF band signal through an antenna, and may down-convert an RF band signal received through the antenna into a baseband signal. For example, the RF processor 2l-10 may include a transmission filter, a reception filter, an amplifier, a mixer, an oscillator, a DAC, and an ADC. Although one antenna is illustrated in FIG. 2L, a first connection node may include a plurality of antennas. Also, the RF processor 2l-10 may include a plurality of RF chains. Furthermore, the RF processor 2l-10 may perform beamforming. For beamforming, the RF processor 2l-10 may adjust a phase and a size of each of signals transmitted/received through a plurality of antennas or antenna elements. The RF processor 2l-10 may perform a downlink MIMO operation by transmitting one or more layers.

The baseband processor 2l-20 may convert between a baseband signal and a bitstream according to physical layer specifications of first radio access technology. For example, during data transmission, the baseband processor 2l-20 may generate complex symbols by encoding and modulating a transmission bitstream. Also, during data reception, the baseband processor 2l-20 may reconstruct a reception bitstream by demodulating and decoding a baseband signal provided from the RF processor 2l-10. For example, according to an OFDM method, during data transmission, the baseband processor 2l-20 may generate complex symbols by encoding and modulating a transmission bitstream, may map the complex symbols to subcarriers, and then may configure OFDM symbols through IFFT and CP insertion. Also, during data reception, the baseband processor 2l-20 may segment a baseband signal provided from the RF processor 2l-10 into OFDM symbols, may reconstruct signals mapped to subcarriers through FFT, and then may reconstruct a reception bitstream by demodulating and decoding the signals. The baseband processor 2l-20 and the RF processor 2l-10 may transmit and receive a signal as described above. Accordingly, the baseband processor 2l-20 and the RF processor 2l-10 may be referred to as a transmitter, a receiver, a transceiver, a communicator, or a wireless communicator.

The communicator 2l-30 may provide an interface for communicating with other nodes in a network.

The storage 2l-40 may store a basic program, an application program, and data such as configuration information for operating the base station. In particular, the storage 2l-40 may store information about a bearer allocated to a connected terminal, and a measurement result reported from the connected terminal. Also, the storage 2l-40 may store criterion information for determining whether to provide or stop multi-connectivity to the terminal. The storage 2l-40 may provide stored data according to a request of the controller 2l-50.

The controller 2l-50 may control overall operations of the base station. For example, the controller 2l-50 may transmit/receive a signal through the RF processor 2l-10 and the baseband processor 2l-20, or the backhaul communicator 2l-30. Also, the controller 2l-50 may write and read data to and from the storage 2l-40. To this end, the controller 2l-50 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a user equipment (UE), of performing measurement, the method comprising:
receiving, from a base station (BS), system information including a first indicator indicating support for measurement in new radio (NR) and a second indicator indicating support for measurement in long term evolution (LTE);
transmitting, to the BS, a radio resource control (RRC) resume request message in an inactive mode;
receiving, from the BS, an RRC Setup message in response to the RRC resume request message;
in response to identifying that a first timer for a duration to perform a measurement in at least one of an idle mode or the inactive mode is running, stopping the first timer and releasing preset measurement configuration information; and
transmitting, to the BS, an RRC setup complete message in response to the RRC Setup message,
wherein, in response to the system information including the first indicator indicating support for the measurement in NR and the UE having first measurement information for the NR according to the measurement in at least one of the idle mode or the inactive mode, the RRC setup complete message includes information indicating that the UE has a report of the measurement, and wherein, in response to the system information including the second indicator indicating support for the measurement in LTE and the UE having second measurement information for the LTE according to the measurement in at least one of the idle mode or the inactive mode, the RRC setup complete message includes the information indicating that the UE has the report of the measurement.

2. The method of claim 1, wherein the method further comprises:
receiving, from the BS, a RRC release message;
in case that the RRC release message includes measurement configuration information for the measurement in at least one of the idle mode or the inactive mode, starting the first timer based on the measurement configuration information; and
based on receiving a paging message including identification information of the UE, maintaining the running of the first timer and transitioning from the inactive mode to the idle mode.

3. The method of claim 1, wherein the method further comprises:
starting a second timer upon transmitting the RRC resume request message; and
stopping the second timer based on receiving the RRC setup message.

4. The method of claim 1, wherein the method further comprises:
receiving, from the BS, a RRC release message;
in case that the RRC release message includes measurement configuration information for the measurement in at least one of the idle mode or the inactive mode, starting the first timer based on the measurement configuration information; and
in case that a cell using a different radio access technology (RAT) is selected in a cell reselection procedure, stopping the first timer and releasing the measurement configuration information.

5. The method of claim 1, wherein the method further comprises:
receiving, from the BS, a RRC release message;
in case that the RRC release message includes measurement configuration information for the measurement in at least one of the idle mode or the inactive mode, starting the first timer based on the measurement configuration information; and
in case that a cell selected based on a cell reselection procedure is out of a validity area, stopping the first timer and releasing the measurement configuration information.

6. The method of claim 1, wherein the method further comprises:
storing configuration information about a master cell group (MCG) secondary cell (SCell) or a secondary cell group (SCG), based on receiving a RRC release message, and
releasing or restoring the configuration information about the MCG SCell or the SCG based on whether an RRC resume message includes information indicating to restore the configuration information about the MCG SCell or the SCG.

7. The method of claim 6, wherein the method further comprises:

based on receiving the RRC setup message, discarding the configuration information about the MCG SCell or the SCG.

8. The method of claim 1, wherein the report of the measurement includes at least one of the first measurement information or the second measurement information.

9. A user equipment (UE) for performing measurement, the UE comprising:
a transceiver; and
at least one processor combined with the transceiver and configured to:
receive, from a base station (BS), system information including a first indicator indicating support for measurement in new radio (NR) and a second indicator indicating support for measurement in long term evolution (LTE),
transmit, to the BS, a radio resource control (RRC) resume request message in an inactive mode,
receive, from the BS, an RRC Setup message in response to the RRC resume request message,
in response to identifying that a first timer for a duration to perform a measurement in at least one of an idle mode or the inactive mode is running, stop the first timer and release preset measurement configuration information, and
transmit, to the BS, an RRC setup complete message in response to the RRC Setup message,
wherein, in response to the system information including the first indicator indicating support for the measurement in NR and the UE having first measurement information for the NR according to the measurement in at least one of the idle mode or the inactive mode, the RRC setup complete message includes information indicating that the UE has a report of the measurement, and
wherein, in response to the system information including a second indicator indicating support for the measurement in a long term evolution LTE and the UE having second measurement information for the LTE according to the measurement in at least one of the idle mode or the inactive mode, the RRC setup complete message includes the information indicating that the UE has the report of the measurement.

10. The UE of claim 9, wherein the at least one processor is further configured to:
receive, from the BS, a RRC release message,
in case that the RRC release message includes measurement configuration information for the measurement in at least one of the idle mode or the inactive mode, start the first timer based on the measurement configuration information, and
based on receiving a paging message including identification information of the UE, maintain the running of the first timer and transition from the inactive mode to the idle mode.

11. The UE of claim 9, wherein the at least one processor is further configured to:
start a second timer upon transmitting the RRC resume request message, and
stop the second timer based on receiving the RRC setup message.

12. The UE of claim 9, wherein the at least one processor is further configured to:
receive, from the BS, a RRC release message;
in case that the RRC release message includes measurement configuration information for the measurement in at least one of the idle mode or the inactive mode, start the first timer based on the measurement configuration information; and in case that a cell using a different radio access technology (RAT) is selected in a cell reselection procedure, stop the first timer and release the measurement configuration information.

13. The UE of claim 9, wherein the at least one processor is further configured to:

receiving, from the BS, a RRC release message;

in case that the RRC release message includes measurement configuration information for the measurement in at least one of the idle mode or the inactive mode, start the first timer based on the measurement configuration information; and in case that a cell selected based on a cell reselection procedure is out of a validity area, stop the first timer and release the measurement configuration information.

14. The UE of claim 9, wherein the at least one processor is further configured to:

store configuration information about a master cell group (MCG) secondary cell (SCell) or a secondary cell group (SCG), based on receiving a RRC release message, and release or restore the configuration information about the MCG SCell or the SCG, based on whether an RRC resume message includes information indicating to restore the configuration information about the MCG SCell or the SCG.

15. The UE of claim 14, wherein the at least one processor is further configured to:

based on receiving the RRC setup message, discard the configuration information about the MCG SCell or the SCG.

16. The UE of claim 9, wherein the report of the measurement includes at least one of the first measurement information or the second measurement information.

* * * * *